United States Patent
Foody et al.

(10) Patent No.: US 6,349,343 B1
(45) Date of Patent: *Feb. 19, 2002

(54) SYSTEM AND METHOD FOR PROVIDING INTEROPERABILITY AMONG HETEROGENEOUS OBJECT SYSTEMS

(75) Inventors: Daniel M. Foody, Montreal; Michael A. Foody, Nunn's Island, both of (CA)

(73) Assignee: Visual Edge Software Limited, Ville St. Laurent (CA)

(*) Notice: Subject to any disclaimer, the term of this patent is extended or adjusted under 35 U.S.C. 154(b) by 0 days.

This patent is subject to a terminal disclaimer.

(21) Appl. No.: 08/972,776

(22) Filed: Nov. 18, 1997

Related U.S. Application Data

(63) Continuation of application No. 08/306,481, filed on Sep. 15, 1994, now Pat. No. 5,732,270.

(51) Int. Cl.[7] ............................................. G06F 9/44
(52) U.S. Cl. ................................... 709/316; 709/318
(58) Field of Search ........................... 709/310–332; 707/101, 103; 712/200; 717/5, 8

(56) References Cited

U.S. PATENT DOCUMENTS

| | | | | |
|---|---|---|---|---|
| 4,736,321 A | * | 4/1988 | Brown et al. | 709/313 |
| 4,924,384 A | * | 5/1990 | Hao et al. | 712/200 |
| 5,097,533 A | * | 3/1992 | Burger et al. | 709/328 |
| 5,146,593 A | * | 9/1992 | Brandle et al. | 709/328 |
| 5,187,787 A | * | 2/1993 | Skeen et al. | 709/314 |
| 5,210,876 A | * | 5/1993 | Uchida | 717/5 |
| 5,274,821 A | * | 12/1993 | Rouquie | 717/5 |
| 5,278,978 A | * | 1/1994 | Demers et al. | 707/101 |
| 5,428,792 A | * | 6/1995 | Conner et al. | 717/8 |
| 5,432,925 A | * | 7/1995 | Abraham et al. | 709/316 |
| 5,437,025 A | * | 7/1995 | Bale et al. | 707/103 |
| 5,475,845 A | * | 12/1995 | Orton et al. | 709/328 |
| 5,481,721 A | * | 1/1996 | Serlet et al. | 709/315 |
| 5,511,197 A | * | 4/1996 | Hill et al. | 709/328 |

FOREIGN PATENT DOCUMENTS

| | | | | |
|---|---|---|---|---|
| EP | 0495279 | * | 4/1996 | G06F/9/44 |

OTHER PUBLICATIONS

Orfali et al., "Client/Server Survival Guide", Thompson Publishing Co., pp. 785–812, 1994.*

OLE 2 Programmers Reference, vol. 1, Microsoft Press, 1994 pp. 3–95.*

OLE 2 Programmers Reference, vol. 1, Microsoft Press, 1994, pp. 1–76.*

(List continued on next page.)

*Primary Examiner*—St. John Courtenay, III
(74) *Attorney, Agent, or Firm*—Fitzpatrick, Cella, Harper & Scinto

(57) ABSTRACT

A system and method in accordance with a preferred embodiment enable objects from two or more heterogeneous object systems in a digital computer to interoperate and be combined in the creation of a larger object-oriented software project, as well as uses of such system and method. Objects from a foreign object system are unmodified, yet appear to be native to the object system in which they are used or accessed. A native proxy object (indistinguishable from other native objects) is constructed for the real foreign object. The proxy object contains an identifier to the real object, as well as a pointer to a software description of how to access and manipulate the object—e.g. how to call its methods, set its properties, and handle exceptions. When the proxy object is manipulated, it follows the instructions in the software description which, in turn, results in the corresponding manipulation of the foreign object.

41 Claims, 17 Drawing Sheets

OTHER PUBLICATIONS

Apple's Inside Macintosh: Interapplication Communication, 1993, Chapter 8.*

The Common Object Request Broker: Architecture and Specification, OMG, 1991, Chapter 6.*

IBM SOMobjects Developer Toolkit V2.0, Programmers Reference Manual, 1992, pp. 131–133, 154–274.*

IBM Technical Disclosure Bulletin, vol. 36, No. 8, August 1993, pp. 457–458.*

Lotus Notes Programmers Reference Manual, 1992, Chapters 5–6, 13–14.*

Hewlett Packard SoftBench BMS, Programmers Reference Manual, 1992, Chapters 4–5.*

Proceedings of the Second International Workshop on Object Orientation in Operating Systems, "Proxies, Application Interfaces, and Distributed Systems", Dave, et al., Dourdan, France, Sep. 1992.*

Acrobat Exchange 3.0, Acrobat Viewer Plug–in API Overview, http://betal.adobe.com/ada/acrosdk/DOCS/VWRPIO-VR.pdf, Dec. 2, 1996. (192 pages).

Active Directory Service Interfaces Design Specification, Version 1.0, http://mssjus1.www.conxion.com/msdownload/platformsdk/i386/iACTIVEDS.exe, Feb. 6, 1997. (115 pages).

BEA Jolt User's Guide, http://beademol.beasys.com/jolt/joltdoc/userman/, May 29, 1997. (116 pages).

U. Black, "Network Management Standards", Second Edition, pp. 1–34, 119–154, 169–207, 267–286.

R.G.G. Cattell, "The Object Database Standard: ODMG—93, Release 1.2", 1993.

The Common Object Request Broker: Architecture and Specification, OMG, 1991, Chapter 6.

Dave, et al., "Proxies, Application Interfaces, and Distributed Systems", Proceedings of the Second International Workshop on Object Orientation in Operating Systems, Dourdan, France, Sep. 1992, pp. 212–220.

Developing DataBlade Modules for INFORMIX–Universal Server, http://www.informix.com/informix/corpinfo/zines/whitpprs/databld/21360fO.htm. (8 pages).

Hewlett Packard SoftBench BMS, Programmers Reference Manual, 1992, Chapters 4–5.

IBM SOMobjects Developer Toolkit V2.0, Programmers Reference Manual, 1992, pp. 131–133, 154–274.

Illustra, C++ Interface Programmer's Guide, Release 1.1., Aug. 1995.

Internet Activities Board (IAB) RFC 1157, "A Simple Network Management Protocol", http://sunsite.auc.dk/RFC/rfc/fc1157.html, May 27, 1997, pp. 1–32.

ISO/IEC 9594–1, "The Directory: Overview of Concepts, Models, and Services", 1993. (164 pages).

ISO/IEC 9594–7 "The Directory: Selected Object Classes", 1993.

Java Beans 1.0 API Specification, Version 1.00–A, http://java.sun.com/beans/spec.html, Dec. 4, 1996, pp. 1–106.

P.E. Kimball, "Chapter 3—Introducing The X Toolkit Intrinsics", The X Toolkit Cookbook. (17 pages).

Lotus Notes Programmer's Reference Manual, 1992, Chapters 5–6, 13–14.

Microsoft Visual Basic Programming System For Windows, Version 2.0, Professional Edition, 1992.

Novell Visual AppBuilder Programmer's Reference Manual, 1994.

OLE 2 Programmer's Reference, vol. 1, Microsoft Press, 1994, pp. 3–95.

OLE 2 Programmer's Reference, vol. 2, Microsoft Press, 1994, pp. 1–76.

OSF/Motif Programmer's Reference, Revision 1.1, 1990.

R/3 System SAP Business Objects, http://www.sap.com/products/imple/media/pdf/50014335.pdf, 1996. (16 pages).

The SAP R/3 Business Object Repository, vol. 1, Issue 1, http://www.sap.com/bfw/media/pdf/benchm e.pdf, Feb. 27, 1996. (22 pages).

M. Shapiro, et al., "SSP Chains; Robust, Distributed Reference Supporting Acyclic Garbage Collection", Symposium on Principles of Distributed Computing, Oct. 1992.

Firmage, J., "Novell's AppWare Distributed Bus", Dr. Dobb's Special Report, No. 225 (Winter 1994/1995), pp. 50–56.*

Microsoft Visual Basic 3.0 Professional Features Book 1, Control Development Guide, 1993, Chapters 1–3.*

Iona ORBIX, Advanced Programmers Guide, 1994, pp. 1–15.*

Borland C ++ V4.0 User's Guide, 1993, Chapters 3–15.*

SSP Chains; Robust, Distributed Reference Supporting Acyclic Garbage Collection, Shapiro, Dickman, and PlainFosse, Symposium on Principles of Distributed Computing, Aug. 1992.*

Visual Edge Software Ltd. Class Registry Functional Specification, Apr. 1994.*

Intel 486 Microprocessor Family Programmer's Reference Manual 1992, Chapter 1–3.*

* cited by examiner void Classname_Methodname (object, pEnv, X, Y)

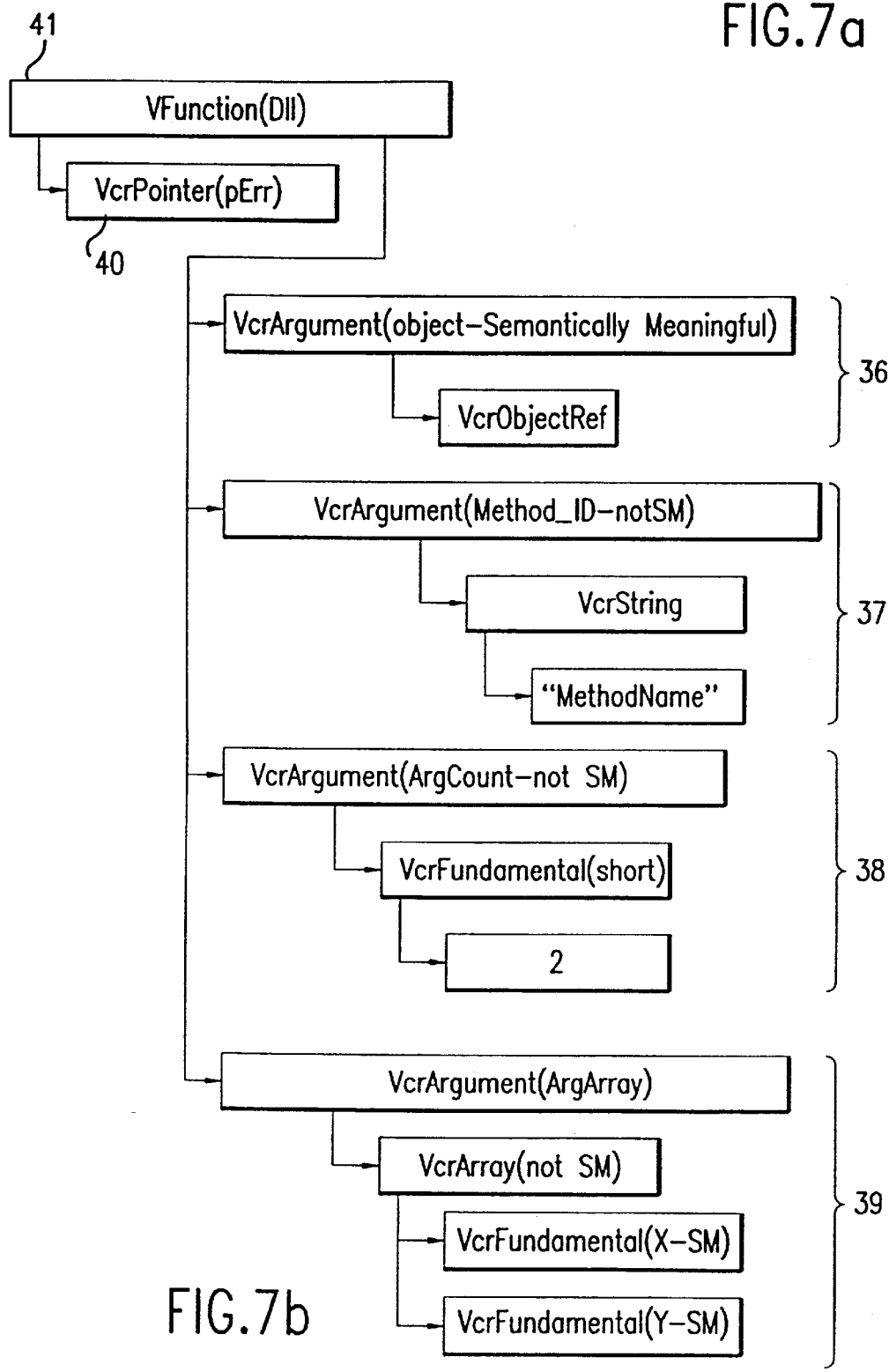

| Usage Code | C | F | M | P | E | T | I | N | A | L | B | V |
|---|---|---|---|---|---|---|---|---|---|---|---|---|
| kVUsageReadOnly |  |  |  | • |  |  |  |  |  | • | • |  |
| kVUsageWriteOnly |  |  |  | • |  |  |  |  |  | • | • |  |
| kVUsageDefaultProperty |  |  |  | • |  |  |  |  |  | • | • |  |
| kVUsageProtected |  | • | • | • | • | • |  |  |  | • |  |  |
| kVUsageThreadSafe | • | • | • | • |  | • |  |  |  | • |  |  |
| kVUsageStrict |  | • | • | • |  |  |  |  | • | • |  |  |
| kVUsageVarArg |  |  | • |  |  |  |  |  | • | • |  |  |
| kVUsageCallerIsOwner |  | • | • |  |  |  |  |  | • | • |  |  |
| kVUsageByRef |  | • | • |  |  |  |  |  | • | • |  |  |
| kVUsageHidden |  | • | • |  |  |  |  |  | • | • | • |  |
| kVUsageOptional |  |  |  |  |  |  |  |  | • | • |  |  |
| kVUsageHasDefault |  |  |  |  |  |  |  |  | • | • |  |  |
| kVUsageValue |  |  |  |  |  |  |  |  | • | • |  |  |
| kVUsageOut |  |  |  |  |  |  |  |  | • | • |  |  |
| kVUsageInOut |  |  |  |  |  |  |  |  | • | • |  |  |
| kVUsageDynamic | • |  |  |  |  |  |  |  |  | • |  |  |
| kVUsageDeleteNotify | • |  |  |  |  |  |  |  |  |  |  |  |
| kVUsageCannotSubclass | • |  |  |  |  |  |  |  |  | • |  |  |
| kVUsageDoNotCache | • | • |  |  |  |  | • |  |  | • | • | • |

Legend
C  VClassData        F  VFunctionData      M  VFunctionData (method)
P  VPropData         E  VExceptionData     T  VTypeData
I  VInstanceData     N  VAdapterNameSpace  A  VcrArgument
L  Used by a language B  Used by a property browser  V  Used by a view or adapter

FIG. 15

SYSTEM AND METHOD FOR PROVIDING INTEROPERABILITY AMONG HETEROGENEOUS OBJECT SYSTEMS

This application is a continuation of application Ser. No. 08/306,481 filed Sep. 15, 1994, now U.S. Pat. No. 5,732,270.

TECHNICAL FIELD

The present invention relates to object-oriented software systems and related methods for digital computers.

BACKGROUND ART

Using object-oriented software techniques, software applications for digital computers are created by combining software objects. To facilitate this process, object-oriented software systems typically provide an architecture specification, called the object model, which enables all objects developed to the specification to work together seamlessly in an application. Examples of object models would include the Object Management Group's Common Object Request Broker Architecture (CORBA), and Microsoft's Common Object Model (COM.) Such systems also typically provide software, called the object system, which implements the basic features provided for in the object model.

There are numerous object systems, some very general in nature such as Microsoft's Object Linking and Embedding (OLE) (which follows the COM object model), or IBM's Distributed System Object Model (DSOM), and Iona's ORBIX, (which both follow the CORBA object model). See for example: the OLE 2 Programmers Reference, Volume 1 and 2, Microsoft Press, 1994; the IBM SOMobjects Developer Toolkit V2.0, Programmers Reference Manual, 1993; Iona ORBIX, Advanced Programmers Guide, 1994; and The Common Object Request Broker: Architecture and Specification Ch. 6., OMG, 1991; these references are hereby incorporated herein by reference.

Other object systems are designed to provide specific functionality, for example, in areas such as groupware or relational database—e.g. Lotus Notes. Still other object systems are specific to particular to applications—e.g. Novell's AppWare Bus, Hewlett Packard's Broadcast Message Server, and Microsoft Visual Basic's VBX object mechanism. See for example: the Lotus Notes Programmers Reference Manual, 1993; the Novell Visual AppBuilder Programmers Reference Manual, 1994; the Hewlett Packard Softbench BMS, Programmers Reference Manual, 1992; Microsoft Visual Basic 3.0 Professional Features Book 1, Control Development Guide, 1993; these references are also hereby incorporated herein by reference.

In creating a software application it is desirable to combine objects from various object systems, because different object systems are best suited to different tasks, and because the best solution is usually built from the best parts (i.e. objects.) However, objects from various object systems don't naturally work together for a number of reasons.

Object systems are rendered incompatible due to differences in the means by which objects are created, methods are called and properties are set in each object system, including differences in the fundamental mechanisms used as well differences in low-level calling conventions such as the physical layout of types and classes. For example at the fundamental level, some object systems, such as COM, use direct C++ calling mechanisms. Others such as DSOM pre-process source code so that in place of a direct call, a function from the object system is called which, in turn, returns a pointer to the real method. This pointer is dereferenced to actually call the method. Still other object systems such as OLE Automation provide specialized functions developers must use to call methods (this is often referred to as a Dynamic Invocation Interface or DII). These functions take the method to be called as an argument, as well as the method's arguments (usually packed into a particular format), and they call the method for the developer. There are numerous other broad differences and variants in fundamental calling mechanisms. Each of these fundamental mechanisms also differ in detail. For example, CORBA requires an environment pointer argument (and has an optional context argument), while other object systems do not.

In addition to the vast differences in fundamental calling mechanisms, there are many differences in low-level calling conventions, sometimes referred to as procedure calling conventions. For example, different object systems handle the return value from methods differently when the type of the return value is a float or a structure. In one case the value may be returned on the processor stack, while in another the value may be placed in a register. Thus, using the return value of a method from a different object system would result in an error. Other examples of differences in procedure calling conventions would include how structures are packed into memory, and how arguments are placed on the stack.

Various object systems also support various types which may not be compatible with other object systems. Simple examples of types include language types such as integers, floats, etc. More complex language types include arrays, strings, and objects. There are also semantic types such as "variable types" like the CORBA Any, and the COM VARIANT. Semantic types differ from language types in that they have a particular semantic meaning to the system. While certain semantic types may conceptually mean the same thing among various object systems, their corresponding language representation and implementation may be entirely different. A common example is strings. In COM, strings are represented using a "BSTR" (a non-NULL terminated string which contains length information), while in CORBA, strings are the traditional C language byte array (NULL terminated with no length information). As a result, a COM object couldn't pass a BSTR to a CORBA object because any functions that operate on strings, such as copying and comparison, used in the CORBA object would fail. Likewise, while "variable types" such as the CORBA Any and the COM VARIANT "mean" the same thing, they aren't compatible.

In addition, object systems have various rules about lifecycle management which may be incompatible. The term lifecycle management refers to the process required when creating, storing, and deleting objects. For example, COM requires developers to perform reference counting so objects can be automatically deleted. Relational databases have much more sophisticated lifecycle management, while CORBA has only very simple lifecycle management with no reference counting.

The above issue of lifecycle management is challenging because often, objects are passed as arguments to methods. Consider the case where an object in one object system calls a method of an object in a foreign object system and passes an object (from its object system) in as an argument to the method. Since the foreign object system only understands its own objects, the object argument must be dynamically converted to a corresponding object in the foreign object system. In other words, a new object must be created in the foreign object system to match the original object passed in as an argument. All such dynamic lifecycle management—object creation, with its corresponding object destruction—must be handled properly if object system interoperability is to work.

Another aspect of object system interoperability is differences in exception and error handling among object systems. Errors or exceptions encountered within the code for an object typically must also be dealt with in the object which called the code. If the two objects are from different object systems, and the error handling mechanisms are incompatible, software failure may result.

Various object systems provide different ways to dynamically query for information about objects. This functionality is required for object systems that provide a general macro script recording facility as well as for object systems that provide distributed computing capabilities. See for example Ch. 1–3 of Microsoft's OLE 2 Programmers Reference Volume 2, Apple's Inside Macintosh: Interapplication Communication Ch. 8 (hereby incorporated herein by reference), or the Object Management Group's The Common Object Request Broker: Architecture and Specification Ch. 6. Thus, incompatibilities in the mechanisms to query for information about objects results in significant restrictions in the ways that objects may be used in other object systems.

As mentioned previously, object systems each have different design goals. As a result, each typically has functionality that isn't available in other object systems. Two examples of this are: CORBA namespaces (which COM doesn't have); and COM objects supporting multiple interfaces (which CORBA doesn't have). Software errors can result if an object is asked to perform some action that is only available in another object system.

In summary then, a sought after goal has been to provide interoperability among various object systems. Different object systems place different requirements on objects, so specialized software systems are required to enable interoperability. The prior art includes approaches to providing interoperability between object systems. Three solutions are of interest: stub function wrappers; a common wire protocol; and dynamic converters.

With the stub function wrapper method, an automated tool is used to generate stub functions which "wrap" objects in code that follows the specification of another object model. That is, the tool creates an object class in the foreign object system that contains only the code necessary to forward requests to the native object. This "stub" code is then compiled and linked into an application. The stub function method is exemplified by the COM interoperability provided with IBM's DSOM for Windows. Using it, developers who have DSOM objects and want to use them from within COM use an automatic tool to generate source code for corresponding COM objects. The source code for the COM objects is simply a set of stub functions which forward calls to DSOM. For example, when the COM application calls a method of the COM object, the method simply re-calls the DSOM version of the method.

One automated tool to create a set of stub function wrappers provides one-way interoperability between two object systems. To provide two-way interoperability—as is required for dynamic lifecycle management, a second tool has to be written. If an additional object system is to be supported, and full interoperability among all three systems is required, an additional four automated tools must be written. In fact, the number of such tools required for interoperability among N object systems is $N^2$-N. In addition, for each object class, $N^2$-N versions of stub wrapper functions must be generated, managed and supported. Given that any particular application will have hundreds of classes, this is a significant disadvantage. Furthermore, this method provides no support for the remainder of interoperability issues such as dealing with type conversions, low level calling convention differences, lifecycle management differences, differences in error and exception handling, querying, or functionality differences. As a result, users of the object must code such conversions into their software manually, making it apparent that the object is from another object system (i.e. the object is clearly not indistinguishable from native object.) Finally, support for new object systems is not dynamic, so code must be recompiled and relinked.

Dynamic converters are designed to provide interoperability between two object systems that both support a dynamic invocation interface (DII). A DII "dynamically invokes" methods. That is, a DII is a set of functions that will call an object's methods for the developer dynamically, and pass arguments to the methods using a pre-defined convention, rather than requiring that the call be compiled into the application. A dynamic converter is a hard-coded map between two DIIs. When a method is called, the converter code packages the information into a format suitable for the DII of the second object system, then calls the method.

As with the stub wrapper mechanism, this approach requires $N^2$-N converters in order to support N object systems. Furthermore, dynamic converters only work with object systems that support a DII. Moreover because they use a DII their performance suffers. And, as with the stub wrapper method, this method provides no general support for the remainder of interoperability issues such as dealing with type conversions, differences in error and exception handling, querying, or functionality differences—thereby being unable to provide foreign objects which are indistinguishable from native objects.

The common wire protocol method is designed to work with distributed object systems, that is, object systems whose objects may be located on different computers having different machine architectures. With the common wire protocol method, object systems which share a common underlying distributed computing system (DCS)—the "common wire"—can interoperate. The common distributed computing system enables object systems to transfer language data types, because a non $N^2$-N language data type transfer mechanism is provided by the DCS.

This approach addresses the issue of low level calling conventions and provides mapping of low level data types. The complexity of supporting N object systems depends directly upon whether the object systems share the same object model. If so, there is no need to provide interoperability between fundamental calling convention differences, semantic type differences, lifecycle management differences, differences in error and exception handling, or functionality differences, and each object system requires only to support the DCS. This case would be exemplified by interoperability among various CORBA object systems such as IBM's DSOM, Iona's Orbix, Hewlett Packard's DOMF, etc. which can each use the Open Software Foundation's Distributed Computing Environment (DCE).

If interoperability is among object systems that don't share a common object model, the approach requires $N^2$-N converters to deal with the remaining issues. Furthermore, this method doesn't work at all if the object systems which must interoperate are not built on top of a shared distributed computing system. And the approach is very resource intensive due to the reliance on a DCS. While it handles transfer of simple data types, it provides no general mechanism to handle more complex type conversions, lifecycle management differences, differences in error and exception handling, querying, or functionality differences—resulting in similar deficiencies to other prior art.

Along with the above prior art directly addressing the issue of object system interoperability, there is other prior art addressing various elements of the problem, each in a different context.

There have been a number of systems that have dealt with the issue of mapping between different low-level calling conventions. In U.S. Pat. No. 4,736,321, a method was described wherein an interactive language workspace, APL, was able to call external language procedures. In it, FORTRAN functions were declared to the APL environment, and the APL environment mapped the APL calls and arguments into FORTRAN calling conventions. The method in this patent is specific to the interactive APL language environment and provides unidirectional access from APL to multiple languages (FORTRAN and Assembler). The method doesn't support bi-directional access among any number of languages, and doesn't work among compiled language code systems.

A similar mechanism was described for Prolog in U.S. Pat. No. 5,274,821 wherein a Prolog language procedure could call external language functions and vice versa. In this patent, the mapping was accomplished using a table driven approach. That is, mapping of Prolog to multiple languages, and mapping multiple languages to Prolog was accomplished by describing the low level calling convention to the system in a table. This information was used at execution time to dynamically perform the mapping. As with the method in U.S. Pat. No. 4,736,321, this method is specific to an interactive language environment, in this case, Prolog. It provides bi-directional mapping from Prolog to N languages, but not among N languages. The method doesn't work among compiled language code systems, and in any case would require $N^2$-N conversion tables.

A mechanism was described in U.S. Pat. No. 5,210,876 wherein an interpreter is able to call a compiled procedure, which in turn, calls an interpreted procedure. The means was to generate a new intermediate compiled procedure which is called by the original compiled procedure. The new compiled procedure was then dynamically linked with the original compiled procedure. The new generated procedure converted arguments to the format required by the interpreter, then called the interpreted procedure. Finally, the results were converted back to those required by the compiled language. As with other prior art, this patent facilitates an interpreted environment calling compiled language code. And as with other prior art, $N^2$-N code generators would be required to support procedure calling convention conversion among N systems.

U.S. Pat. No. 5,097,533 describes a method for interfacing various pre-determined computer languages to a single software system. In it, code is written for each language to map from the API in the language to a single API for the underlying software system. This patent maps procedure calling conventions from N languages to one by writing code to perform the mapping for each. The method does not work for conversion among N language conventions, and in any case would require $N^2$-N code blocks to be written.

In U.S. Pat. No. 5,146,593, a method is described wherein a single software interface is used to call a plurality of procedures. In fact, this is but one example of a DII—a DII designed for mapping to different programming languages. In it, the method uses tables to describe the low level calling conventions of the particular language. The user (i.e. the software developer wishing to make the calls) links the DII interface with their application and uses it to make all their calls by passing it a procedure identifier, and data structures in a predefined format. The method doesn't support interoperability among N language calling conventions, and would also require $N^2$-N tables should the approach attempt to be extended for that purpose.

The above patents share the fact that they are designed to provide a mechanism to deal with the differences between low-level calling conventions of various languages. With the exception of U.S. Pat. No. 5,210,876 they each provide a means of converting various language types as well. However, they don't address the issue of differences between high level calling conventions. In fact, they each a provide a different high level calling convention, so they have no need to. Nor do they provide any support for mapping between semantic types.

Other patents, for example U.S. Pat. No. 5,187,787 have dealt with the issue of mapping between semantic types. In this patent, mapping between semantic types was but one element of a larger system used to provide a communications interface which decoupled two software applications. In it, the semantic types used in the communication were designed by to be self-describing. The patent teaches that the semantic description must be separated from the data representation for interoperability. Further, developers use a system API to access data, which may be located elsewhere, and in another semantic form. Thus, the mechanism requires explicit knowledge on the part of the developer to use the decoupled data, and is analogous to a single DII, with the same consequent limitations.

In U.S. Pat. No. 5,278,978, a method was described to transfer information between two databases. As a part of the system, a mechanism was described to map between both language types and semantic types. Each language type was tagged with a canonical identifier called a marker descriptor. Likewise, separately, each semantic type was tagged with a canonical identifier called a type definition. When data was received from another database, the descriptions were used to perform a conversion. Each database was required to have predefined descriptions of all other machine environments and semantic types, i.e. $N^2$-N conversion descriptions, because conversion was performed at the receiving database.

SUMMARY OF THE INVENTION

This invention provides in some embodiments a single system in a digital computer enabling software objects from multiple heterogeneous object systems to interoperate bi-directionally and to be combined in the creation of a larger software system. Objects from a foreign object system are unmodified, yet appear to be native to the object system in which they are used or accessed. Support for additional object systems may be added dynamically while the system is executing, thereby adding bi-directional interoperability with all other supported object systems. A mechanism is also provided whereby features in one object system may be supported in other object systems without the necessity of modifying objects.

For a foreign object to be used in another object system, the system of these embodiments constructs a native proxy object (indistinguishable from other native objects) for the real foreign object. The proxy object contains an identifier to the real object, as well as a pointer to a software description of how to access and manipulate the object—e.g. how to call its methods, set its properties, and handle exceptions. When the proxy object is manipulated, it follows the instructions in the software description which, in turn, results in the corresponding manipulation of the foreign object.

The system of these embodiments provides a number of object-oriented frameworks with default implementations. There are frameworks to: dynamically locate objects in an object system-specific or uniform namespace; describe the characteristics of an object class or instance; describe both semantic and language types; "execute" the software descriptions to forward manipulations of the proxy object to the real foreign object; handle errors and exceptions; create, copy, destroy, and manage the lifecycle of objects; and a framework to "export" object definitions—i.e. to make objects in one object system appear as object classes indistinguishable from native object classes temporarily or permanently in other object systems.

In addition, there is a framework to add extra information to the description of any object class. Such added information is called a "mixin". When an object is manipulated in a way it doesn't support, for example if it is asked to return the middle element of a collection but it doesn't support such a method, the system asks the mixins associated with the object if they can support the request. If so, they take over and perform the request. In this way, a general mechanism is provided to extend the capabilities of objects in an object system with features of other object systems that they wouldn't naturally support.

Extensions to the default implementations of each of the above frameworks are grouped by object system, and packaged into libraries called Object System Adapters (OSAs). OSAs can be dynamically loaded into the OSA Registry framework of the system, thus adding everything necessary to dynamically support new object systems and provide full interoperability with other object systems.

It will be obvious to those skilled in the art that the system may be used stand-alone, or embedded as an element of a larger software system.

Further embodiments of the invention are also provided:
(A) a system and method to enable the creation of a "universal object", i.e. a single object which appears to be implemented in a plurality of object systems simultaneously, and which can dynamically change which object systems it supports. Said system also enables the creation of objects in individual, application, and server configurations. Further, such objects may be based upon interpreted or compiled language technology;
(B) a system and method—either library-based or interactive—to enable the construction of object classes including the aforementioned "universal object", where such system in the creation of said object classes, may constitute a subclass of, incorporate, or embed instances of, objects from a plurality of object systems;
(C) a system and method to enable object classes and objects to be relocated among applications and servers in one or more object systems while the applications and servers are executing, and without disruption of software utilizing said object classes and objects, even if it too is executing.

BRIEF DESCRIPTION OF THE DRAWINGS

The foregoing aspects of the invention may be more readily understood by reference to the following detailed description, furnished in connection with the following drawings, in which:

FIGS. 7a, 7b, 7c show the description of a similar method which is called using a Dynamic Invocation Interface;

FIG. 15 shows a table summarizing which usage codes apply to which classes and also which users are most likely to refer to a usage code.

DETAILED DESCRIPTION OF SPECIFIC EMBODIMENTS

Figure 1:
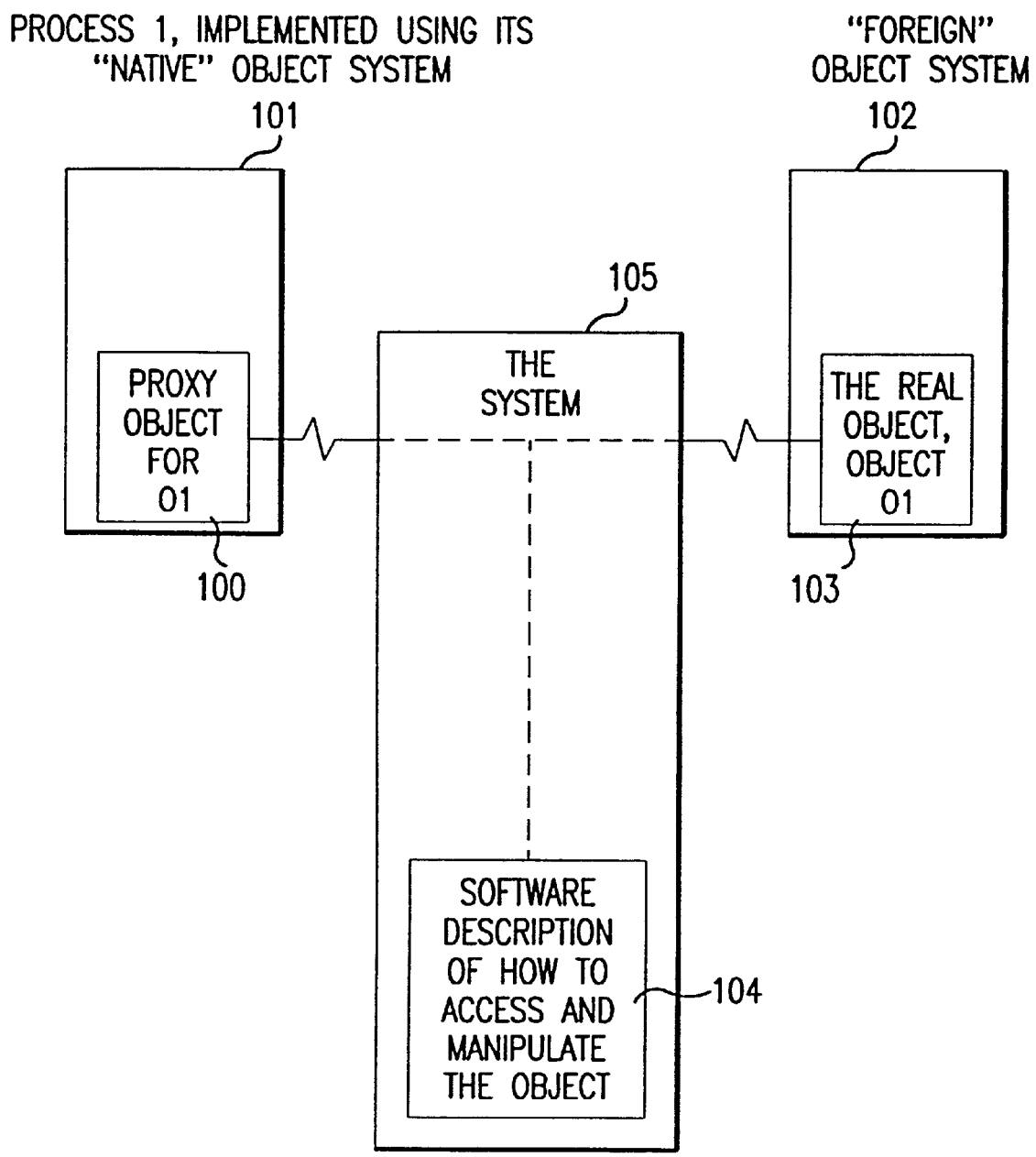
FIG. 1 is a simplified overview of a system (in use) in accordance with a preferred embodiment of the invention.

FIG. 1 shows a simplified overview of the system 105 in use in a digital computer in accordance with a preferred embodiment of the invention. Process 101 is implemented using a first object system, referred to as the "native" object system, distinct from a second object system in which process 102, and object 103 are implemented. The second object system, implementing process 102 and object 103, is referred to as the "foreign" object system (foreign relative to the process 101 which is using the object 103). The system 105 has constructed a proxy object 100. The proxy object 100 appears indistinguishable from other objects implemented using the native object system in process 101. The proxy object 100 established by system 105 contains a pointer to the real object 103, as well as to a software description 104, of how to access and manipulate the real object 103—e.g. how to call its methods, set its properties, and handle exceptions. When process 101 manipulates proxy object 100, the manipulations are intercepted by the system and forwarded to the real object 103. The system forwards the manipulation by following the instructions in the software description 104, which, in turn, results in the corresponding manipulation of the real object 103. The system can follow the instructions in the software description 104 regardless of which object system created it, thus resulting in a non-$N^2$-N approach to object system interoperability.

Figure 2A:
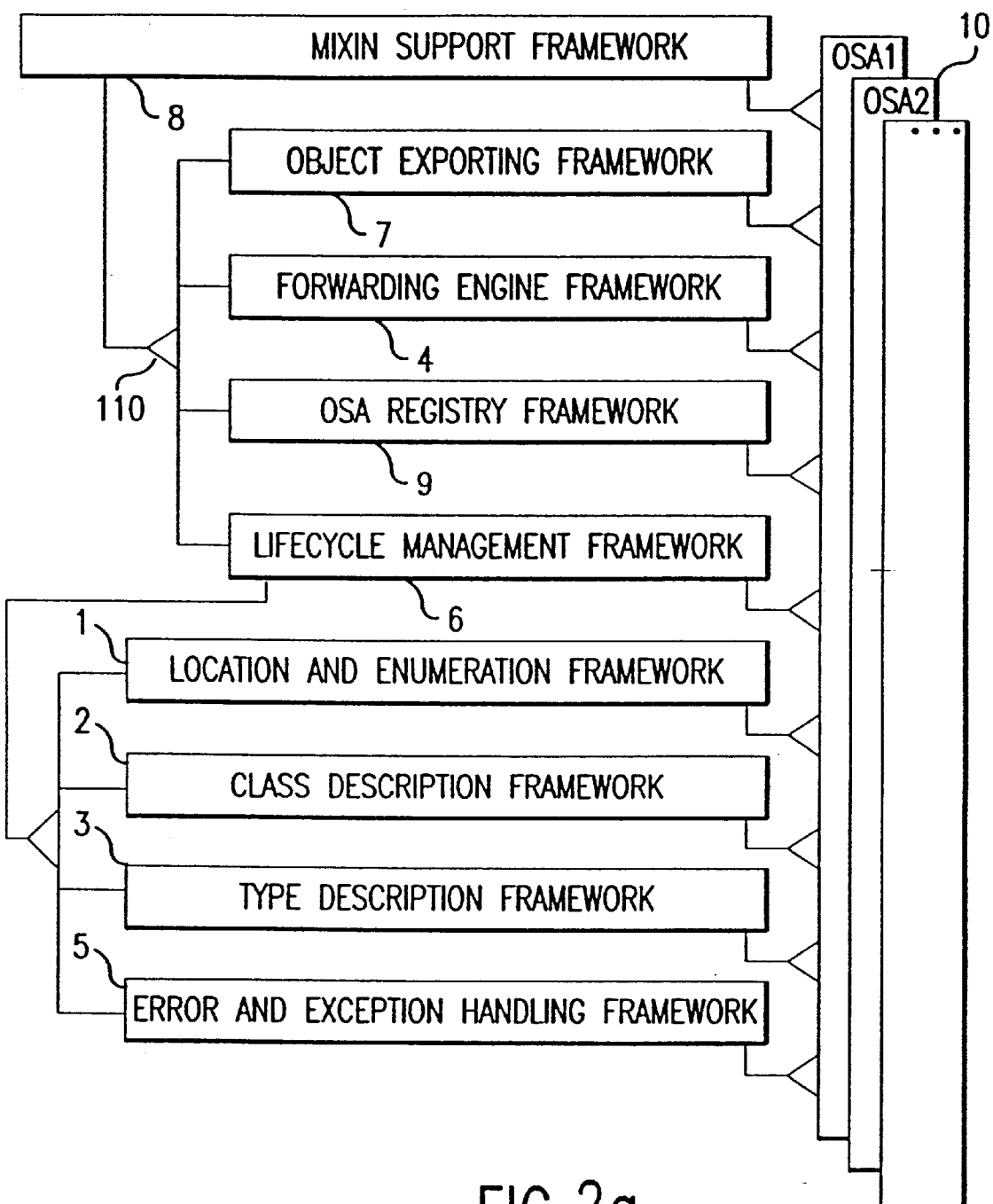
FIGS. 2a, 2b are an overview of the system architecture in accordance with a preferred embodiment of the invention.

Referring to FIG. 2, there is shown a simplified architecture diagram of the system in accordance with a preferred embodiment of the invention. As described below, applicants have successfully implemented this embodiment on a wide range of hardware platforms in a wide range of object systems. In the diagram, the triangular symbol 110 indicates that items to its right are subclasses. The system includes nine frameworks as follows:

the Location and Enumeration Framework 1 to dynamically locate objects in an object system-specific or uniform namespace. Included in this framework is the ability to determine the characteristics of objects that have been located;

the Class Description Framework 2 to provide a description of the characteristics of an object class or instance;

the Type Description Framework 3 to provide a description of and to convert both semantic and language types;

the Forwarding Engine Framework 4 to "execute" the software descriptions to forward manipulations of the proxy object to the real foreign object;

the Error and Exception Handling Framework 5 to handle errors and exceptions;

the Lifecycle Management Framework 6 to create, copy, destroy, and manage the lifecycle of objects; and the Object Exporting Framework 7 to "export" object definitions—i.e. to make objects in one object system appear as object classes indistinguishable from native object classes temporarily or permanently in other object systems.

In addition, there is the Mixin Support Framework 8 to add extra information to the description of any object class, enabling the support in all object systems of features found only in one object system. There is also the OSA Registry Framework 9 to load, unload, and manage Object System Adapters (OSAs) 10. The OSAs 10 are libraries that package together extensions to the default implementation of each aforementioned framework provided by the system. When added, they provide full bi-directional interoperability among all other object systems with corresponding OSAs loaded.

A more detailed description of the above architecture may be found at the end of the present specification. It will be understood by those skilled in the art that this architecture may be reorganized without affecting the utility of the embodiment described.

Figure 3:
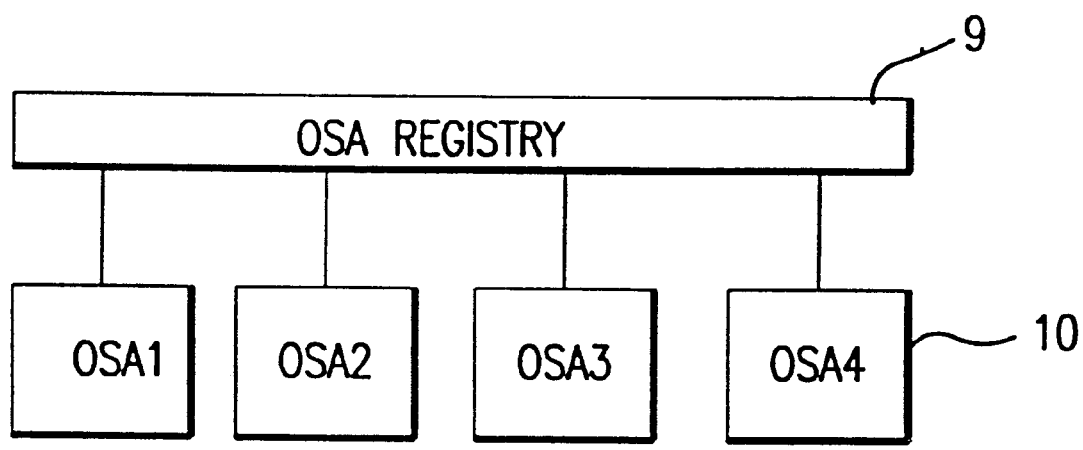
FIG. 3 shows Object System Adapters of FIG. 2 plugged into the Adapter Registry Framework.

FIG. 3 shows the OSA Registry framework 9 as well as a number of OSAs loaded. In this configuration, the system provides interoperability among the four object systems corresponding to the OSAs.

A specific embodiment of the invention has been written in C++ and runs on Microsoft Windows 3.1 and Windows NT, IBM OS/2 and AIX, Sun Microsystems SunOS and Solaris, as well as on Hewlett Packard HP-UX. Object System Adapters have been implemented for Microsoft OLE Automation, IBM SOM and DSOM, Microsoft COM, and for the Microsoft Visual Basic VBX object system. In addition, an OSA has been implemented for an interpretive language environment. The embodiment currently provides support for enabling objects implemented in pure C++ to be used in object systems with corresponding OSAs. Likewise, the embodiment currently provides support for enabling software written in C (i.e. not written to any object system) to be used in object systems with corresponding OSAs.

The sections below describe each of the above frameworks, and the section numbers below correspond to the item numbers in FIG. 2.

1) The Location and Enumeration Framework: a framework to dynamically locate objects in an object system-specific or uniform namespace.

Figure 2B:
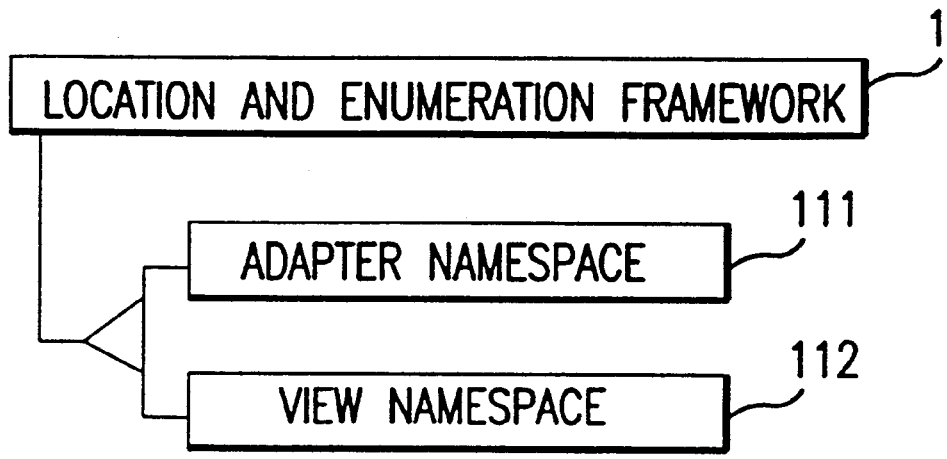

The Location and Enumeration framework has two primary sub-frameworks as shown in FIG. 2b, an object system-specific namespace sub-framework called an "Adapter NameSpace" 111, and an object system-independent namespace sub-framework called a "View NameSpace" 112. Together, adding support in the framework for new object systems requires only that the Adapter NameSpace be subclassed—a linear (i.e. non $N^2$-N) operation.

The Location and Enumeration Framework provides a suite of generic capabilities which may be used by OSAs or overridden (in the object-oriented sense) and replaced with capabilities specific to an individual object system. More specifically, the Adapter NameSpace 111 provides searching capabilities to locate a particular, or a complete list of: classes, instances, functions, types, exceptions, sub-namespaces, or any combination therein in the object system. It will be apparent to those skilled in the art that numerous well known search techniques, such as regular expression matching, may be applied during the search process. Using object-oriented principles, a single interface—the Adapter NameSpace interface—is therefore utilized by the remainder of the system to search any particular object system to determine and return the hierarchy of information it provides.

Items in Adapter NameSpaces may be enumerated upon execution of the system or loading of the particular OSA. More often, however, Adapter NameSpaces will not enumerate their contents until required, as would be the case if a user performed a browsing operation, if the system had to construct an object of a particular class, or if the system had to make a class visible in another object system.

Adapter NameSpaces enumerate their contents using generic mechanisms provided by the system, or by supplying object-specific mechanisms. Generic mechanisms provided by the system include static mechanisms, dynamic mechanisms, or database mechanisms. With static mechanisms, users of the system call system APIs to register their information. With dynamic mechanisms, the system queries the objects themselves (or the software utilizing the system, such as a language interpreter's symbol table) to determine the information. With database mechanisms, the system reads a file, or a repository to determine the information. Examples of the latter would include querying information from a CORBA interface repository, reading a COM Type Library, reading "header files" (e.g. C++ header files or CORBA IDL files), or reading the symbol table of a "dynamic link library". Typically, each OSA would have to override some capabilities of the generic mechanisms.

The second sub-framework, View NameSpaces 112, provides an object system independent mechanism to organize information such as classes, instances, types, etc. View NameSpaces, may be organized in a acyclic graph. View NameSpaces may also be subclassed to provide particular capabilities such as a flat list of named objects (i.e. classes, instances, types, etc.). Any item enumerated in an Adapter NameSpace may be placed in a View NameSpace, including then entire NameSpace of an OSA. As is typical of file systems, aliases are provided, and circularities are recognized. In this way, users of the system have a means to fully locate and organize information in an object system independent way.

2) The Class Description Framework: a framework to describe the characteristics of an object class or instance.

Contained in Adapter and View NameSpaces is the information to describe classes. The Class Description Framework is provided to enable this capability, and to enable OSAs to override built-in functionality. The Class Description Framework consists of a suite of classes which describe: classes, instances, properties, functions (including methods), arguments, and exceptions. The corresponding classes used are entitled, respectively: VClassData, VInstanceData, VPropData, VFunctionData, VArgumentData, and VExceptionData. An additional framework to describe types, the Type Description Framework as described below, is also utilized. Each of the above classes can be asked for the name of the object it represents, its type, its owner (e.g. if it describes a class property, its owner would be the class), the object system that manages it, as well as "usage codes" (described below).

The class in the Class Description Framework which is used to describe classes (as opposed to describing properties or methods) is called VClassData. VClassData provides descriptions of the class it represents to the rest of the system by returning results from method calls rather than by building a static data structure, a linked list data structure, or the like. For example, it provides a class method which returns a list of properties. This enables OSAs to subclass VClassData and override its methods in order to provide the class description using an object system-specific implementation, while still providing a single API to the rest of the system.

The VClassData class has methods to return, for the class it describes: the base classes (as a list of VClassData); the constructor, duplicator, and destructor (as VFunctionData); the class' methods (as a list of VFunctionData); the class' properties (as a list of VPropData); the class' exceptions (as a list of VExceptionData); as well as a method to return a named instance of the class.

The class in the Class Description Framework which describes functions and class methods is called VFunctionData. The VFunctionData class has methods to return, for the function it describes: the arguments (as a list of VArgData), the exceptions the function can throw (as a list of VExceptionData), and a callable entry point for the function (or method).

The class in the Class Description Framework which describes class properties is called VPropData. The VPropData class has methods to return, for the property it describes: a method to set the property, as well as a method to get the property (both as VFunctionData).

Likewise, the class in the Class Description Framework which describes function arguments, VArgData, has methods to return the name, the type, and the usage codes for the argument it describes. The class which refers too instances, VInstanceData, has methods get and set its value (i.e. the actual instance). The class which describes exceptions is described below in the section on error and exception handling.

Figure 4:
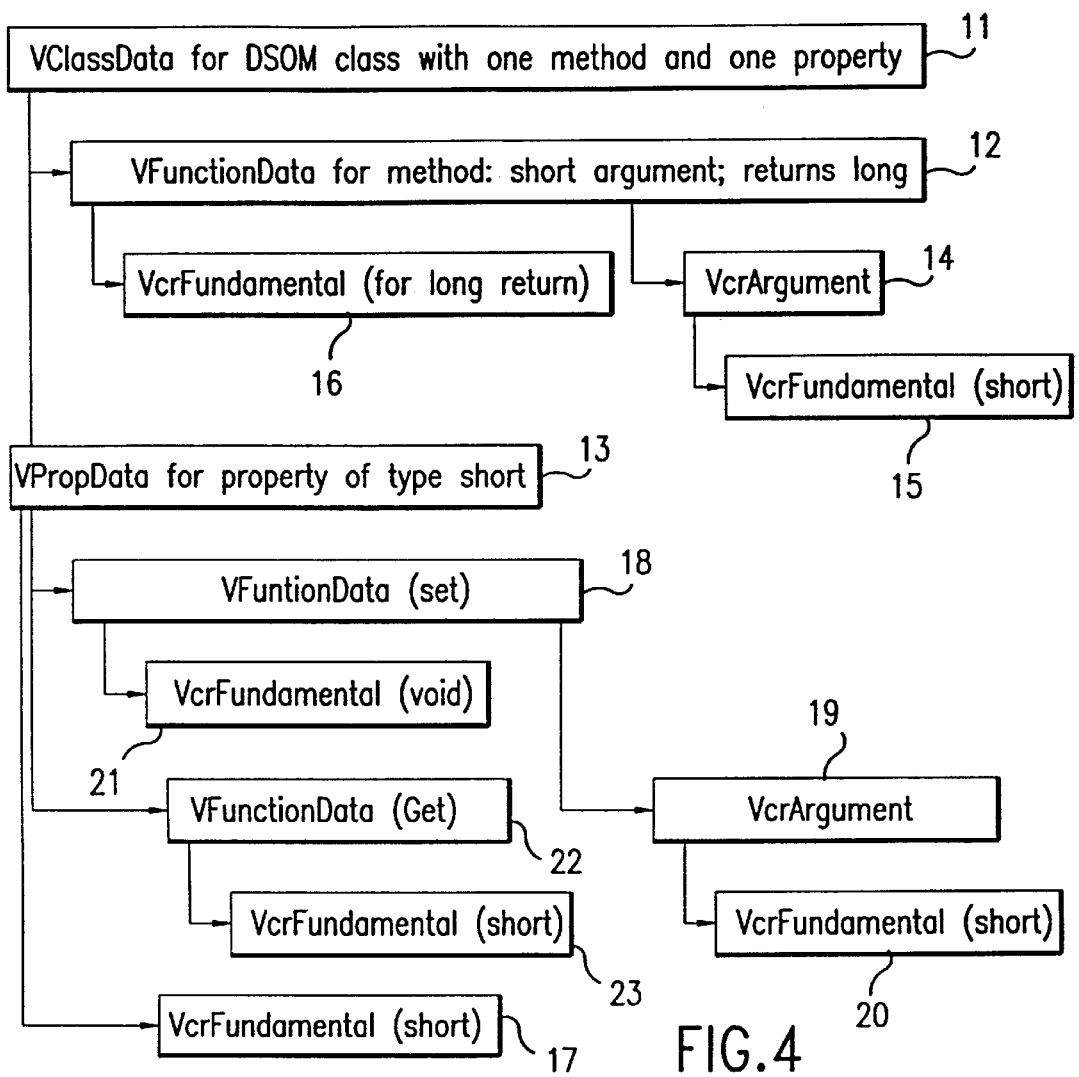
FIG. 4 shows the description of a class with one method and one property in accordance with the embodiment of FIG. 2.

The above information is typically constructed by the OSA as NameSpaces are enumerated, however, it may be constructed directly by the user of the system. If the OSA doesn't override any capabilities, as it enumerates its contents, it would typically use subclasses of each of the above classes which, in addition to having methods to retrieve information, have corresponding methods to set the information. Thus, as the OSA determined the contents of the object system, it would construct the necessary instances of the above classes, and call their methods to "connect" them. For example, it would construct the subclass of VClassData which supported these methods, then construct VPropData corresponding to the class'properties, then call a method to set the list of properties in the (subclass of) VClassData. FIG. 4 shows the results of an OSA constructing the description of a DSOM class 11 with one method 12, and one property 13. The method takes one argument 14 and 15, a short, and returns a long 16. The property 13 is of type short 17, has a function to set its value 18 that takes a short argument 19 and 20, and returns a void 21. The property also has a function to get its value 22 that returns a short 23. It will be apparent to those skilled in the art, that the information need not be organized in a tree as shown in FIG. 4.

3) The Type Description Framework: a type management framework to describe both semantic and language types.

Figure 5:
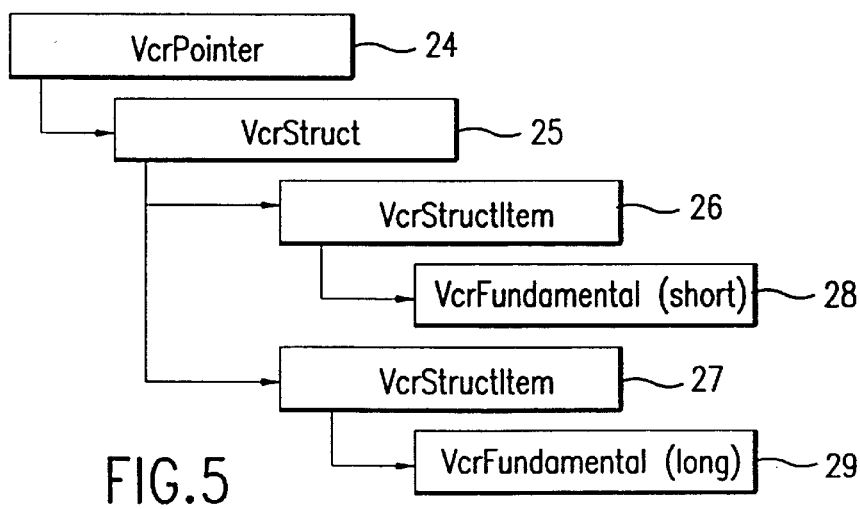
FIG. 5 shows a nested type description in accordance with the embodiment of FIG. 2.

Analogous to the Class Description Framework is the Type Description Framework to describe types, including both semantic and language types. The Type Description Framework provides a base class for describing types called VTypeData, as well as a subclass of VTypeData called VcrFundamental for representing fundamental types such as integer, float, double, byte, unsigned long, etc. In addition, complex types such as structures (VcrStruct), unions (VcrUnion), pointers (VcrPointer) and function pointers (VcrFunctionPointer), object references (VcrobjectRef), sequences (VcrSequence) including arrays (VcrArray) and strings (VcrString), enums (VcrEnum) and the like can be described using these subclasses of VTypeData. Types can also be nested to create arbitrarily complex types. FIG. 5 Shows the description of a type which is a pointer 24 to a structure 25 containing two items 26 and 27. The first item is a short 28, while the second item is a long 29.

4) The Forwarding Engine Framework: how do these descriptions make it possible to forward manipulations of the proxy object to the real foreign object?

Figures 6A, 6B:
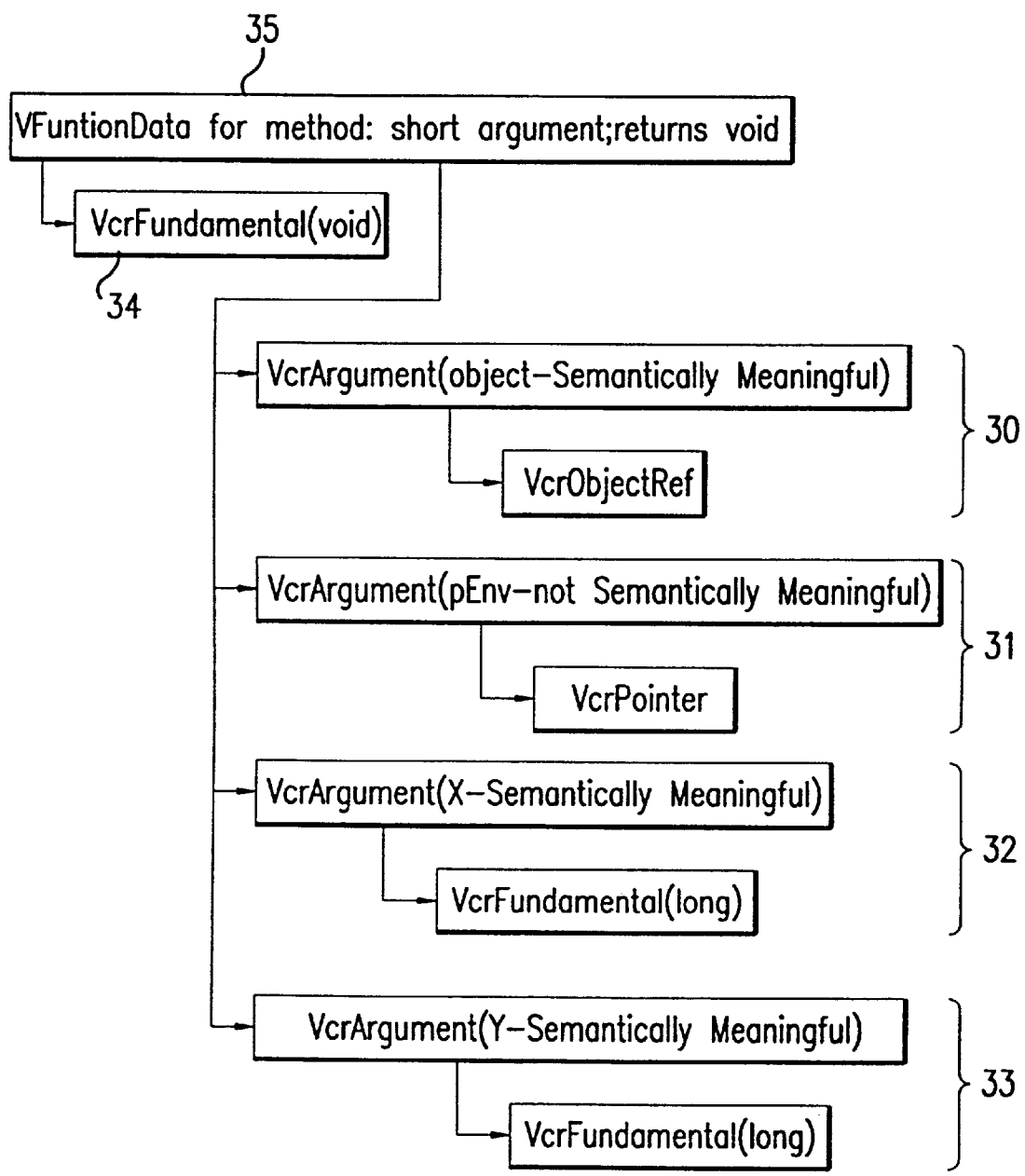
FIGS. 6a, 6b show the description of a method which follows the CORBA C language calling convention.

The above elements, class and type descriptions, are combined to fully describe a class. Two key aspect of the method are that elements are tagged as to whether they are semantically meaningful or not, and both semantic and non-semantic information are contained in the description. As a result, the description method is capable of fully describing the fundamental calling mechanism, as well as the language calling convention. For example, FIG. 6a shows a declaration for a simple method call following a CORBA calling convention. The method 35 takes four arguments: the object 30, the Environment pointer 31 (a characteristic of all CORBA method calls, the Environment pointer is most commonly used as the mechanism to return errors), as well as arguments entitled X 32, and Y 33. The method returns void 34. FIG. 6b shows the corresponding description of this method.

FIG. 7a shows the same method in a different object system which uses a different calling convention. In this declaration, a Dynamic Invocation Interface (DII) 41 is used to call the method. The first argument 36, is the object. The second argument is an identifier for the method 37. Next is a count of the number of arguments 38. Finally, the arguments are packed into an array 39. The DII returns an error pointer 40. FIG. 7b shows the corresponding description of this call. Notice that in both cases, only the object, X, and Y are tagged as being semantically meaningful (SM). The other described aspects are merely artifacts of how to make the method call.

In summary, to forward method calls from one object system to another, the forwarding engine walks down the description of the method call that was made, and pulls all semantically meaningful information from the calling stack. It then walks down the description of the method call it is about to make, and puts all the described information on the "call stack" (each computer system processor has particular rules about where to place arguments prior to making a function call, such place generically referred to as the "call stack"), transferring the semantically meaningful information to the correct position (and converting types if necessary.) It then calls the correct function to actually invoke the method. Once the method has returned, it likewise transfers the results back to the original method call stack.

Figure 7C:
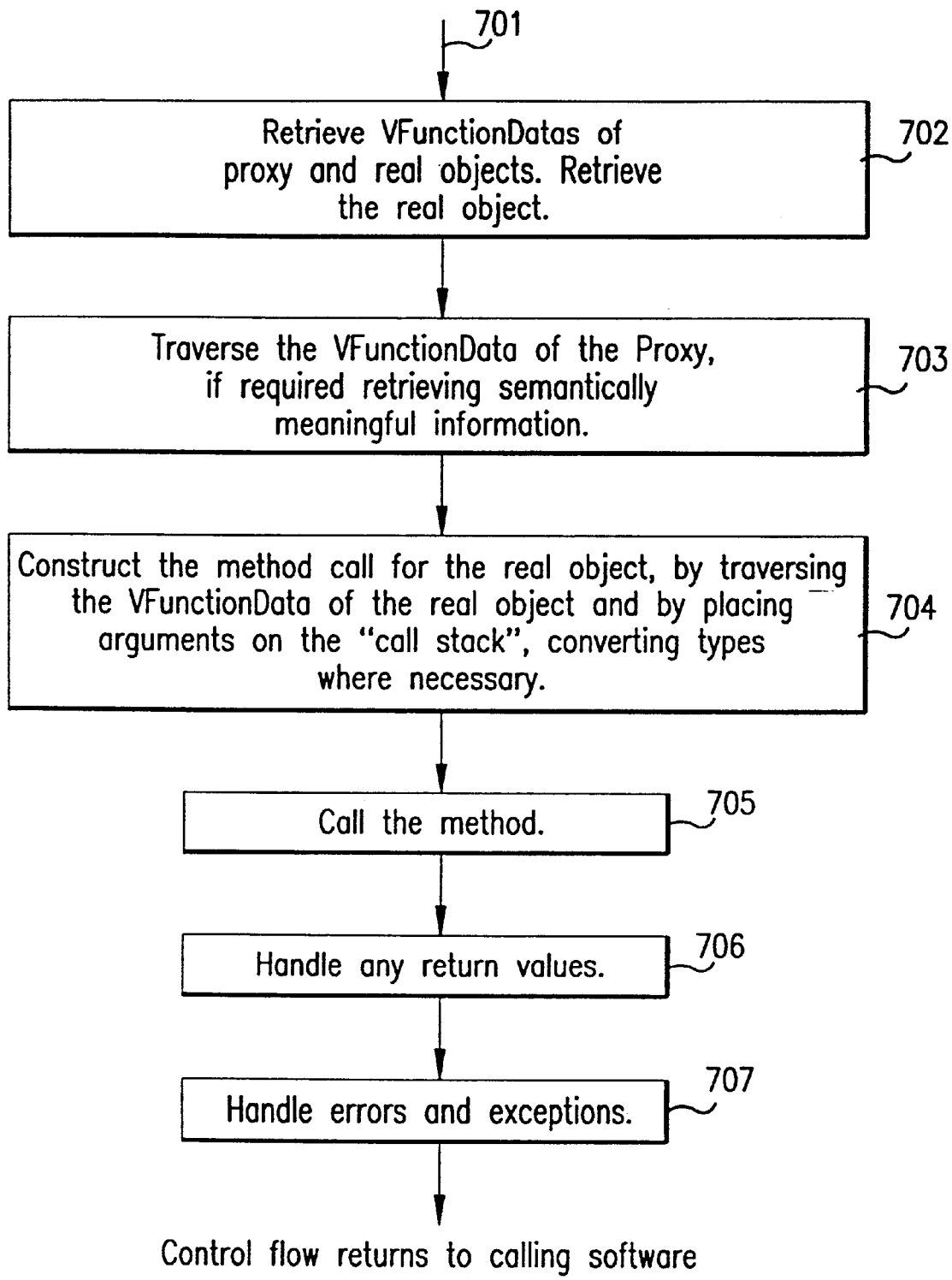

Shown in FIG. 7c are the steps that might take place if an object implemented in the object system of FIG. 7, hereafter referred to as the foreign object system, was being used by software written in the object system of FIG. 6, hereafter referred to as the native object system, when the method 35 of FIG. 6 was called.

Figure 10:
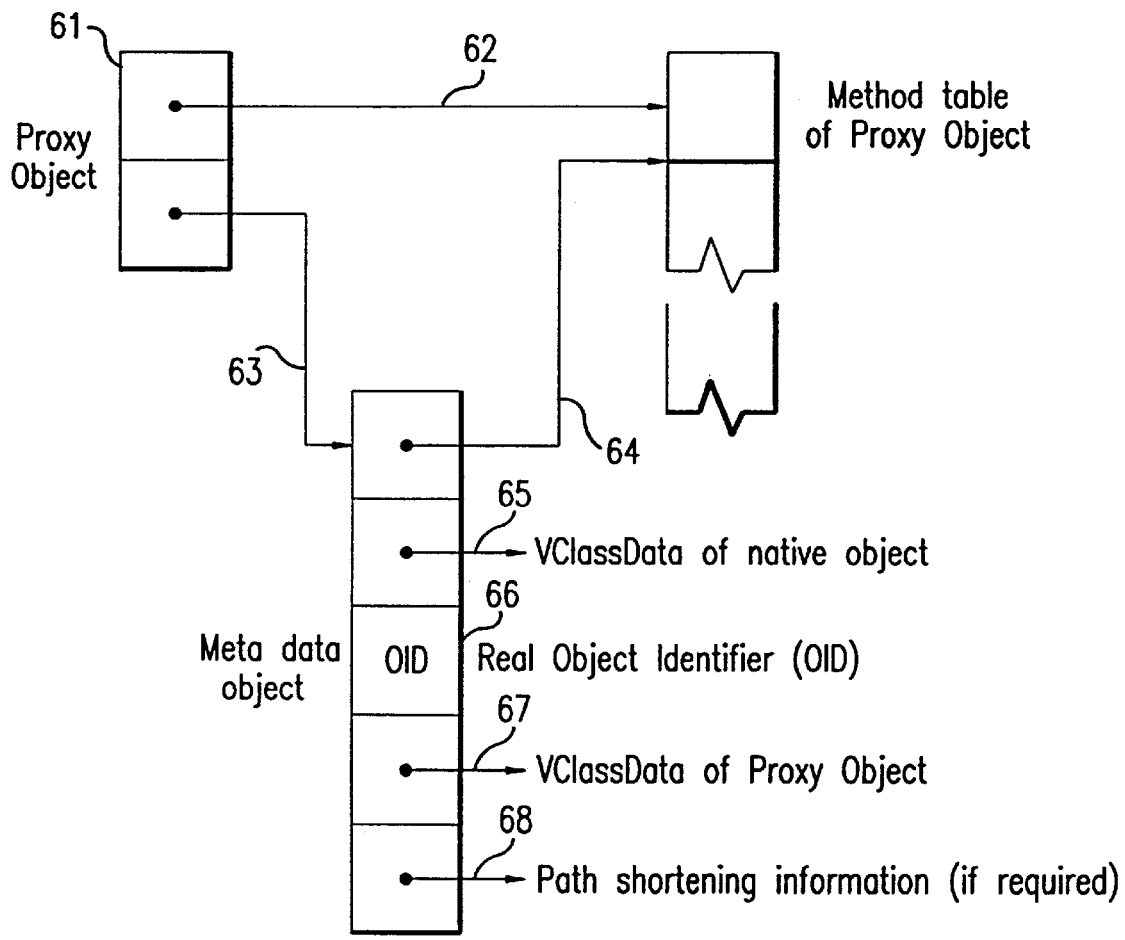
FIG. 10 shows a typical proxy object in accordance with the embodiment of FIG. 2.

First, based on the way the OSA constructed the proxy, the OSA receives the flow of control 701 from the software which manipulated the proxy. Next, based on the layout of the proxy it has constructed, the OSA of the native object system retrieves the real object, as well as the VFunctionDatas for both the real object and the proxy object 702. These are passed to the Forwarding Engine Framework. The layout of a typical proxy object is shown in FIG. 10 and described in section 7) below. the layout of The first major step the Forwarding Engine Framework performs is to traverse the VFunctionData of the proxy, using it to retrieve all semantically meaningful information from the just-occurred method call 703. It asks the for its list of arguments (i.e. the list of VcrArgument). For each argument determines if the argument is semantically meaningful. If the argument itself is not semantically meaningful, yet the argument is a complex type, the argument may still within itself contain semantically meaningful information. Thus, the Engine must traverse the contents of the argument recursively to ensure that no semantically meaningful information is within it.

Information which is not semantically meaningful is discarded, while semantically meaningful information is stored. In this example, the first argument 30 is the object upon which the method was called. It is semantically meaningful, therefore it is stored (although for optimization it need not be, since this identifier to the proxy object has already been retrieved by the native OSA).

The next argument 31 isn't semantically meaningful, so it is ignored. The third and fourth arguments, 32 and 33 respectively, are semantically meaningful, and so are retrieved and stored. See, for example, the Intel486 Microprocessor Family Programmer's Reference Manual 1992, hereby and hereinafter incorporated by reference, for an in depth explanation of how to retrieve information from a function call made on the Intel 486 microprocessor.

Having retrieved all semantically meaningful information from the original method call, the next major step taken by the Forwarding Engine is to begin constructing the method call for the real object by placing the appropriate arguments on the "call stack" 704. In this example, the Forwarding Engine would traverse the VFunctionData shown in FIG. 7 representing how to call the foreign object's (i.e. the real object's) method, retrieving the list of arguments.

The first argument 36 is semantically meaningful and must be placed on the call stack. The Forwarding Engine traverses the list of information retrieved from the original method call to find the matching information. In this case, the object. The object from the original call must be converted to the type required by the foreign call and placed on the stack. The Forwarding Engine contains an optimization which ascertains if the object required is the real object (which it is in this case) and so places the real object on the call stack. The second argument 37 is a string constant, "MethodName" (i.e. the name of the real method) which the Forwarding Engine places on the call stack. Likewise, the third argument 38 is the constant short whose value is 2, so 2 is placed on the call stack.

The fourth argument, 39 is a complex type, so the Forwarding Engine traverses its elements. The Forwarding Engine creates an array capable of containing two long integers. Then, it matches the first entry with the information retrieved from the original call, and so places X in the first position (as a long integer, no type conversion required). It performs the same for the second argument, Y. Once this is completed, it places the array on the call stack.

The third major step performed by the Forwarding Engine Framework is to call the actual method 705. The Forwarding Engine asks the VFunctionData 41 for the address of the function to call. In this example, it returns the address of the DII function. The Forwarding Engine then dereferences the pointer to actually call the function.

The next step performed by the Forwarding Engine is to handle the return values 706. The Forwarding Engine retrieves it from the call stack. The VFunctionData of the original method call is asked for its return type. The original method call returns void, so no information needs to be placed on the "return stack" (the term "return stack" refers generically to the computer processor-specific location or locations where the results of a function call are placed).

The final step before returning from the original method call is to handle errors and exceptions. In this example, the foreign method returns a pointer to error information 707. The original traversal of the VFunctionData identified the environment pointer as containing error information (the environment pointer is the native object system's standard mechanism to transfer error information). The Error and Exception Handling Framework is delegated the task of determining if an exception occurred, and converting the information from the form provided by the method call on the real object in the foreign object system to the form appropriate for the native object system. In this example, the necessary conversion takes place, control is returned to the forwarding engine, and ultimately to the process which originally called method 35.

Note that the series of steps taken by the Forwarding Engine can be automatically generated as source code and compiled for performance, if desired. Likewise, note that the above description was given in the context of method calls, however it applies to all manipulations. Furthermore, the object being manipulated need not be from an object system, as long as the requisite description is provided. For example, this enables straight C language software to appear to be implemented in any object system.

OSAs have a choice as to whether they have the system's Forwarding Engine Framework code handle forwarding of methods automatically, or whether they subclass the framework to provide a custom forwarding scheme. In some cases, the OSA can look at the description of the method call that is about to be made (i.e. not the one just made that has to be forwarded), and determine what semantic information must be removed from the call stack. By virtue of the fact that the OSA corresponds to the object system in which the call was just made, the OSA writer can code into the OSA how to remove information from the call stack—the OSA need not walk down a general description of its own method.

Likewise, the OSA that constructed the VFunctionData for the real method (i.e. the method in the foreign object system) can construct it so as utilize whatever means it finds necessary to accomplish the real call. For example, the OSA can construct the VFunctionData so as to "call back" into the OSA for further custom processing.

The above descriptions of classes aren't specific to any particular object system. They can be created by any object system to describe their classes, and they can be traversed and "executed" by any OSA to forward manipulations of objects by any object system to any other object system. As a result, the method to forward object manipulations isn't an $N^2$-N approach.

A similar method is used when objects are queried for a description of themselves. The description of the native object is traversed, as triggered by the proxy, either by the Forwarding Engine or by the OSA, and the semantic information converted to the format required by the object system making the request. The formatting of such information is one of the responsibilities of an OSA.

As mentioned, types, including semantic types such as strings and variables containing any type, as well as language types must often be converted between object systems. The system provides an object oriented type system, the Type Description Framework, capable of converting semantic and language types between any two object systems in a non-$N^2$-N fashion. The Forwarding Engine pulls information off the calling stack by utilizing the type information in the description of the method just called. When walking the description of the method about to be called, it likewise knows the type expected. Knowing both the original type, and the expected type, the Type Description Framework performs a conversion.

In the specific embodiment, two mechanisms are provided for type conversion: object oriented type casting, and neutral type representation. In object oriented type casting, the Type Description Framework can convert among types that are all subclasses of the same type. This is accomplished by the superclass, VTypeData, providing a set of methods which each of the subclasses implements. These methods return the information necessary to construct an instance. This information is sufficient to create any of the subclass types. Thus, to convert, these methods are called on the instance of the type just pulled off the stack. The results provide the information necessary to create an instance of the type which is about to be put on the stack.

In neutral type representation, types know how to convert themselves to one or more neutral types, as well as how to convert from neutral types to themselves. For example, a string type such as a COM Bstr, as a sublcass of string, would have methods to convert itself to either an ASCII string, or a Unicode string, as well as to convert from them to Bstr. Thus, to convert from any string type to any other, the first type converts itself to ASCII or Unicode, and the second type converts from that to itself. Note that the types can agree on which conversion is most efficient, and that conversion only takes place if necessary. Furthermore, those skilled in the art will recognize that the above doesn't preclude the addition of a direct type conversion mechanism between particular object systems (and types) where type conversion optimization is desired.

The Type Description Framework is also used to trigger automatic proxy construction. That is, when an object type is passed, the object needs to be "converted" to an object of the to-be-called object system. Thus a proxy needs to be constructed. The detailed steps involved in proxy construction are described in sections 6) and 7).

5) The Error and Exception Handling Framework: a framework to handle errors and exceptions.

The Error and Exception Handling Framework relies heavily on the type conversion system. As a part of every VFunctionData, a VExceptionData is created. When any exception occurs, the type conversion system converts the exception from the type in one object system to the corresponding type in another. In addition, the type conversion mechanism via the methods in VExceptionData, is responsible for triggering the exception handling system of the foreign object system.

6) The Lifecycle Management Framework: a framework to create, copy, destroy, and (manage the lifecycle of objects) and 7) The Object Exporting Framework: a framework to export object definitions.

Figure 8:
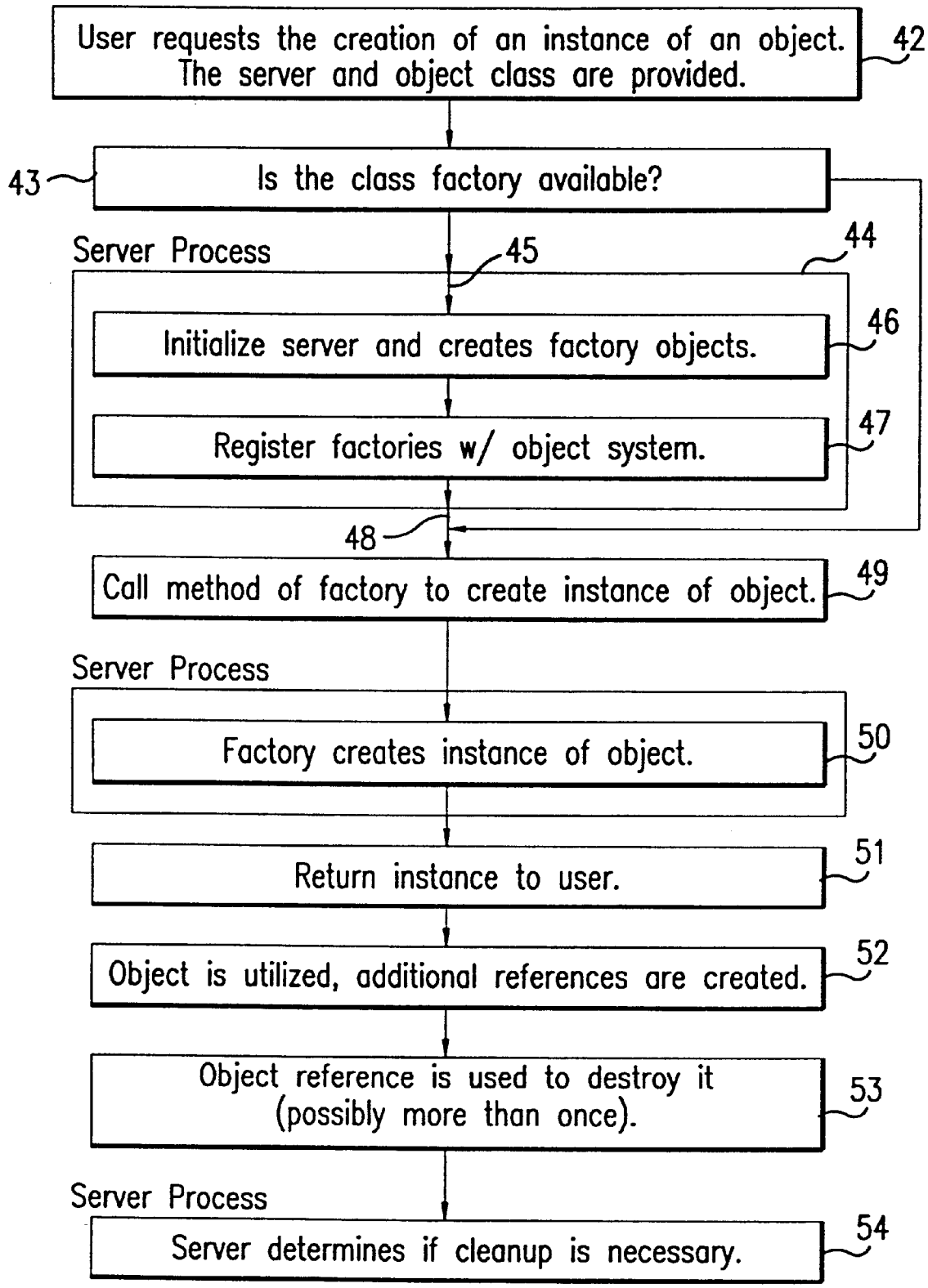
FIG. 8 shows the typical lifecycle of an object.

Although object lifecycles differ among object systems, the lifecycle of an object in a typical object system is shown in FIG. 8. The process begins when a user asks to create an instance of an object 42. The object system first determines if the factory to create the object is available 43. If the factory isn't available, the object system attempts to start the server 44, as specified in the call to create the object. The object system starts the server application (or loads the appropriate dynamically linked library) and transfers execution to it 45. The server performs initialization and creates factories for all the classes it supports 46. Then, the server registers its factories with the object system, in a process sometimes referred to as "exposing its factories" 47. When the process is completed, the server returns control to the object system 48. The object system then calls a method of the appropriate factory to create an instance of the desired class 49. The factory creates an instance of the object 50, and finally, the instance is returned to the user 51. As the object is utilized, additional references to it may be created 52. The object may be destroyed by any party that has a reference to it 53. Each time a reference to the object is used to destroy it, the server determines if any object cleanup is necessary 54 (e.g. should memory the object is using be de-allocated). Typically, this occurs when the last reference is destroyed.

The system provides interoperability transparently. As a result, it must appear to the object system as a standard object server that follows the standard lifecycle protocols that any server designed specifically for the object system would. The system, or more particularly, the OSA for the object system in which the request takes place, is therefore responsible for items 3, including items 5 and 6, item 8.5, and ensuring that during 10 and 12, all utilization/manipulation of the object is forwarded properly, and transparently to the real object. During 8.5, however, the OSA works with another OSA—the OSA of the object system that the real object is created in, to create a proxy for the real object.

Figure 9:
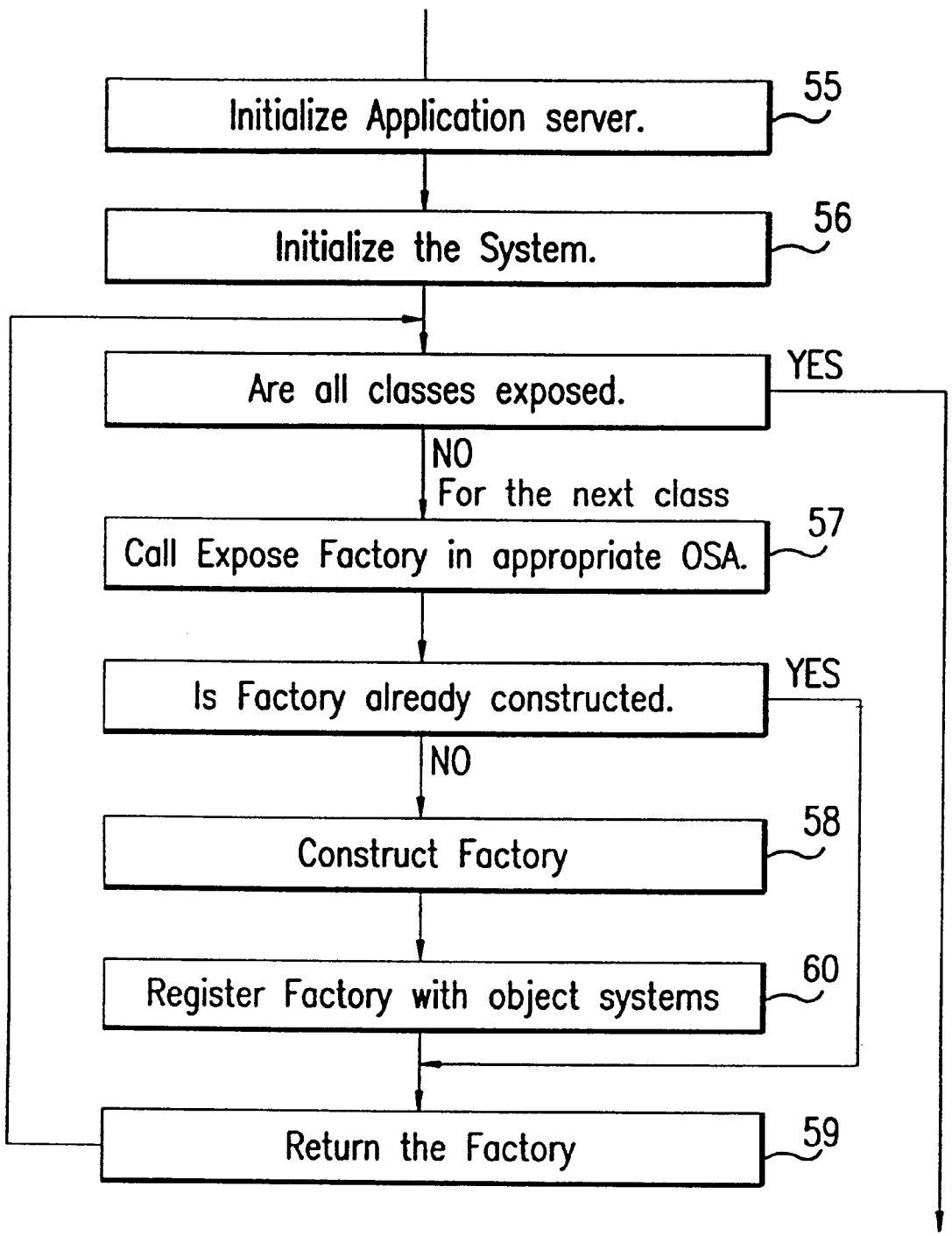
FIG. 9 shows the process used to expose classes using the system of FIG. 2.

The system provides a framework to perform the above steps—the Object Exporting Framework. Any application/server that contains the system may be 44. As shown in FIG. 9, in performing step 46, the application initializes itself 55, then initializes the system 56. For each class from another object system the application/server wishes to make available in this object system, the ExposeFactory method is called 57 in the OSA of requesting object system. The list of such classes may be hard-coded in the application/server, determined from a persistent store or file, or dynamically determined. The Expose Factory method is called with the VClassData of the class to be exposed, and returns a real factory object from the native object system. It constructs a new factory if required 58, or returns a previously created factory 59. The method also registers the factory with the native object system 60.

Another aspect of exposing classes is registering them in the native object systems "repository." This may involve generating an interface description in a "language" appropriate to the foreign object system (such as Interface Definition Language or IDL in CORBA systems, a Type Library in COM, or C++ header files). It may also require that the OSA use an API to register the class with the object system's repository.

When the object system calls the-method of the factory to create an object instance, it is the job of the factory to create a real instance in the foreign object system, then to create a proxy to be returned to the native object system (i.e. the object system which the factory was designed for.) When the OSA constructs the factory, it builds the VClassData for the object in its object system. This VClassData, and the VClassData for the real object (which the OSA was provided in the ExposeFactory method call) are stored with the factory object. When the factory object's method to create the object is called by the object system, the factory object uses the Forwarding Engine to forward the creation call from its object system (using the VClassData it created), to the native object system. When the real object is returned, the factory object constructs a proxy object by calling the AcquireProxy method in the OSA for the foreign object system (more precisely, in the subclass of the Object Exporting Framework provided in the OSA).

The AcquireProxy method is passed the VClassData of the real object, as well as an instance of the object. It constructs a proxy object in the native object system, associating with that object a pointer to all the information required by its OSA. Although the layout of a proxy object is up to the OSA, a typical proxy object is shown in FIG. 10. The proxy object 61 consists of a pointer to its method table 62 (referred to as a vtable in C++), as well as a pointer to a metadata object 63. The metadata object consists of a pointer to the method table 64, a pointer to the VClassData of the native object 65, the native object identifier 66, and a pointer to the VClassData of the proxy object 67, as well as path shortening information 68.

The first time an instance of the class is created in the native object system, the AcquireProxy method of an object system typically has to create a method table. It will be understood by those skilled in the art how to dynamically create a method table, and how to associate with each method, sufficient information for the OSA to retrieve which method was called. When the method is called by the object system via the method table, the following steps are typically performed: First, the VFunctionData for the method of the proxy object just called is retrieved. Next, from the metadata of the proxy object, the VClassData of the native object is retrieved, and in turn, the VFunctionData for the corresponding method of the native object is retrieved. These are passed to the forwarding engine for forwarding of the method call.

Construction of a proxy object can be triggered by the user, as in 42, or by the type conversion system. When triggered by type conversion, only AcquireProxy need be called.

When the AcquireProxy method is called, prior to creating a new proxy object, it must check if a proxy object for the native object already exists in this object system. Utilizing a capabilities provided by the system, the method checks its cache of objects. If a proxy already exists it is returned, other wise the system checks if path shortening is required. When multiple systems are working cooperatively to provide object system interoperability, it may be that the object for which a proxy is to be constructed is itself a proxy object. Path shortening refers to the act of not creating a proxy for the proxy, but rather "shortening the path of objects" and creating a proxy for the real object. Those skilled in the art will appreciate that there are numerous path shortening algorithms described in the literature, for example "SSP Chains: Robust, Distributed References Supporting Acyclic Garbage Collection, Shapiro, Dickman, and PlainFosse, Symposium on Principles of Distributed Computing, August 1992", which is hereby incorporated herein by reference.

8) The Mixin Support Framework: a framework to add extra information to the description of any object class, enabling the support in all object systems of features found only in one object system.

Often one object system provides features which aren't available in another object system. In addition, object systems often expect their object to provide certain features. The system provides a general mechanism to handle such interoperability issues called mixins. Mixins are simply objects which may be associated with any other object in the system to extend the functionality the object is capable of providing. A mixin can provide a method which the native object doesn't provide, or override any or all of the native object's methods. As all Frameworks are subclassed from the Mixin Support Framework, mixin objects may be added to any instance of any class provided from the system.

When the forwarding engine walks down the VClassData to retrieve the VFunctionData for the native object's method, it first determines if there is a mixin object associated with the object that provides the method. If so, it calls the Mixin's method instead of the native object's method (if the method even exists for the native object.) The methods of mixin objects can also be triggered to execute prior to, or after any native method call to augment the native object's capabilities. Mixin objects may be associated with the objects known to the system at the class level, or at the instance level. In addition, they are inherited as subclasses of objects are enumerated. Through the Mixin Support Mechanism, a native object need not be aware that its capabilities have been augmented.

9) The OSA Registry Framework: a framework to load, unload, and manage Object System Adapters.

As previously described, Object System Adapters are libraries which package together extensions to the system's default implementations of the above frameworks. An OSA packages everything necessary to fully support bi-directional interoperability among the object system to which it corresponds, and all other object systems with OSAs. The system can dynamically load and unload OSAs using a framework entitled the OSA Registry Framework. The OSA Registry Framework provides the methods to load and unload AdapterNamespaces, and provides the remainder of the system with an object system independent way to determine which object systems are supported. OSAs can be loaded and unloaded while the system is executing, dynamically extending the range of object systems supported.

FURTHER EMBODIMENTS OF THE PRESENT INVENTION

The invention in a range of other embodiments. In another embodiment, for example, there are provided (A) a system and method to enable the creation of a "universal object", i.e. a single object that appears to be implemented in a plurality of object systems simultaneously, and that can dynamically change which object systems it supports. Such a system enables the creation of "universal objects" in individual, application, and server configurations. Further, such objects may be based upon interpreted or compiled language technology.

Figure 11:
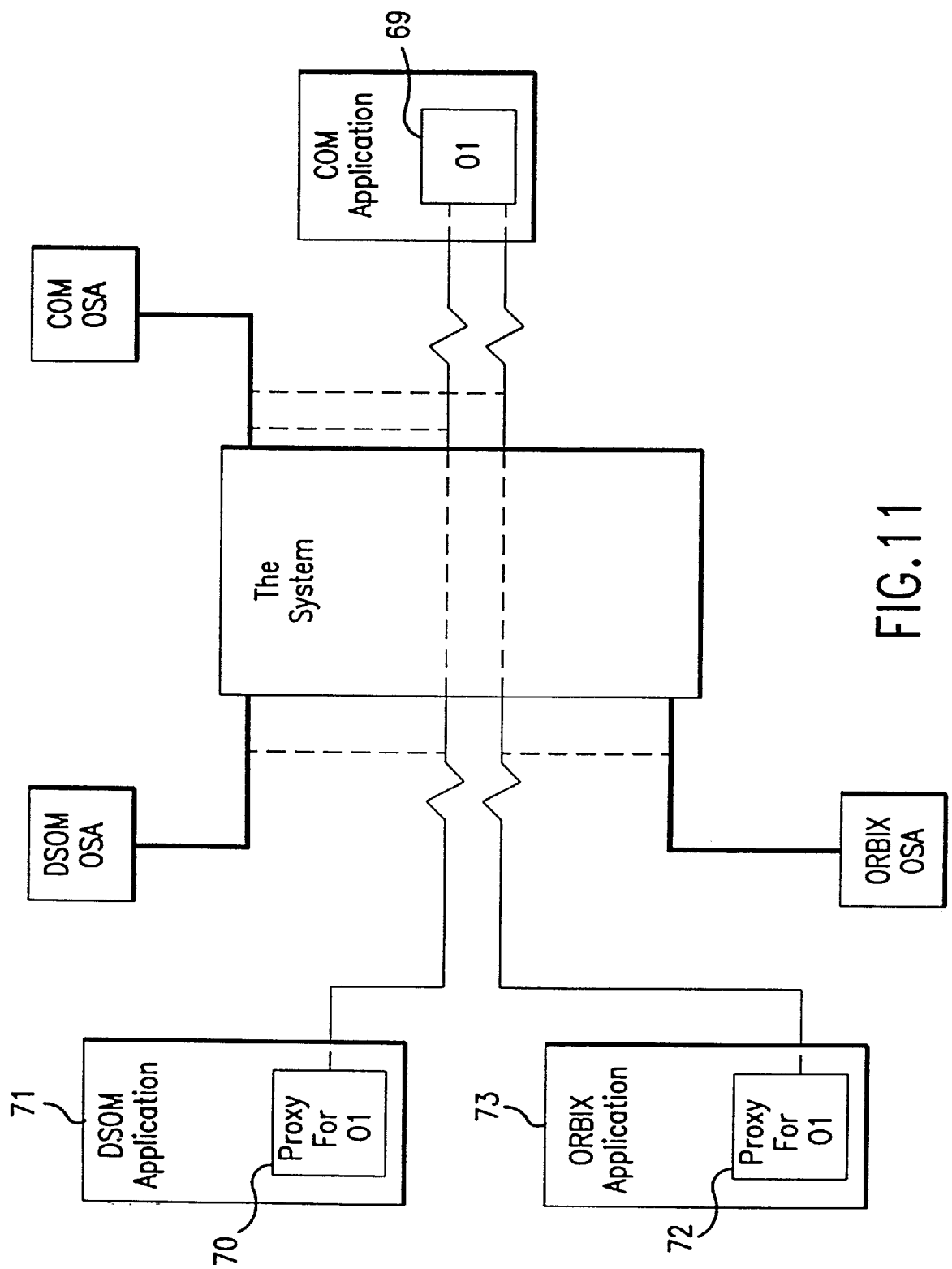
FIG. 11 shows a configuration of the invention in which an object appears to be implemented in a number of object systems and processes simultaneously.

In addition to enabling heterogeneous object systems to interoperate, such a system, when used in a slightly modified configuration, enables objects to appear to be implemented in a number of object systems simultaneously. FIG. 11 shows an example of the system being used in such a configuration. In the figure, an individual COM object 69, appears as both a DSOM object 70 in the DSOM-based application 71, as well as an ORBIX object 72 in the ORBIX-based application 73.

There are two configurations in which typical object systems enable their objects to be used: "in process"; and "out of process". See, for example, the OLE 2.0 Programmers Reference, and IBM SOMobjects Developer Toolkit Programmers Reference Manual. When objects are used "in process", they are used as a "dynamic link library" (DLL)—often referred to as a shared library—and execute in the same process space as the software using them. When objects are used "out of process", they execute in the process space of the separate application or server they are within, not within the process space of the software using them.

Although FIG. 11 shows all objects executing in separate processes, it will be obvious to those skilled in the art, that for object systems which support in both in process and out of process objects, the system may be used in either configuration. That is, when the system is used "in process" by an application, the system, including the various frameworks, and the OSA for the object system being used by the application, as well as the proxy objects being used by the application, execute as a DLL in the process space of the application. Note that while the proxies are "in process", the native objects (i.e. the real objects which correspond to the proxies) need not be. They may be in process or in a separate process, as determined by the way they were created in their native object system.

Conversely, while the application using the objects may create them "out of process", even though the system is executing in a separate process, it may create the native object "in process" for efficiency. In this case, in process means the objects are created in the system's process, and not in the process of the application using the objects.

Figure 12A:
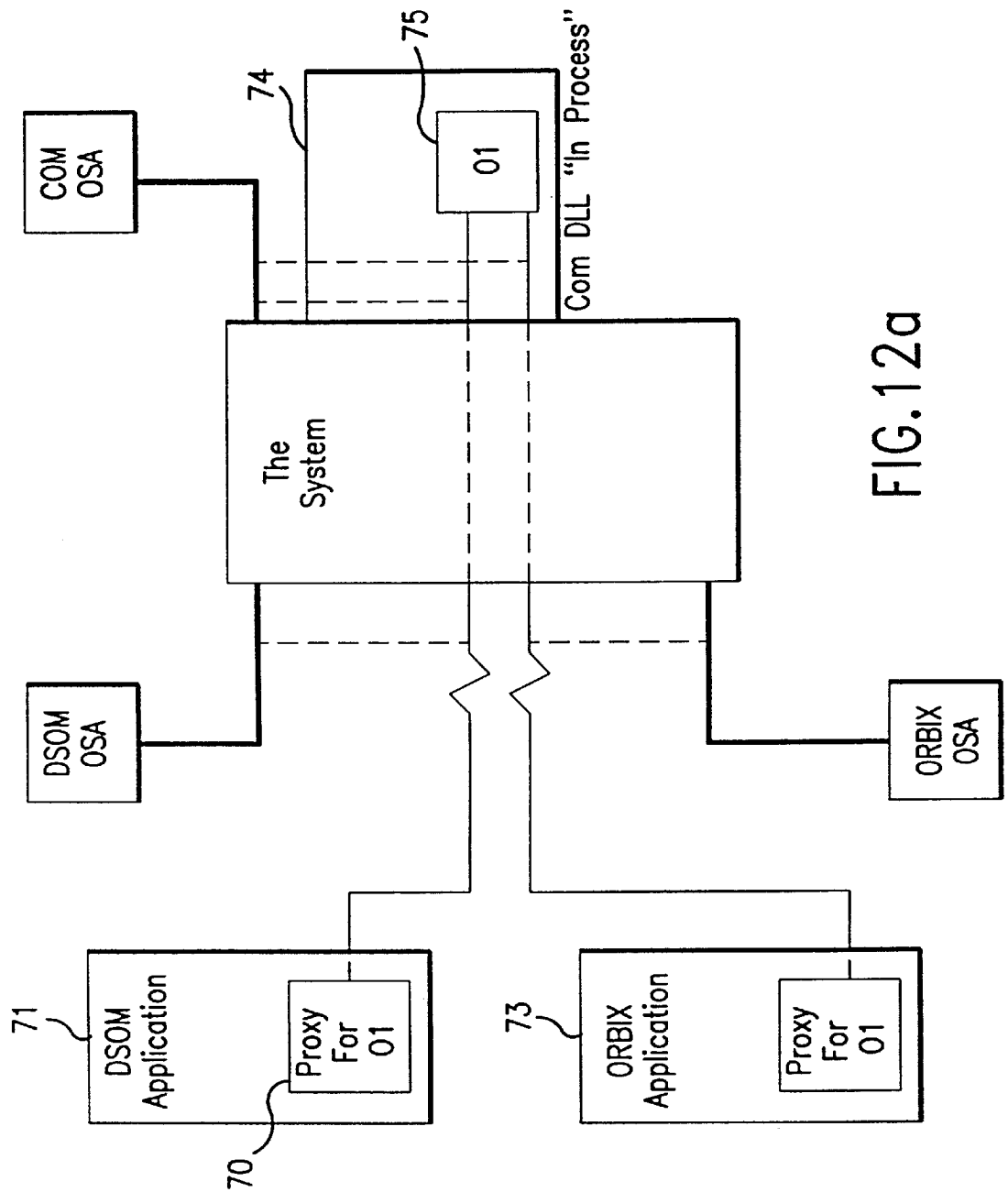
FIG. 12a, FIG. 12b, and FIG. 12c, respectively, show individual, application, and server configurations of "universal objects" in a accordance with a preferred embodiment of the invention.
Figure 12B:
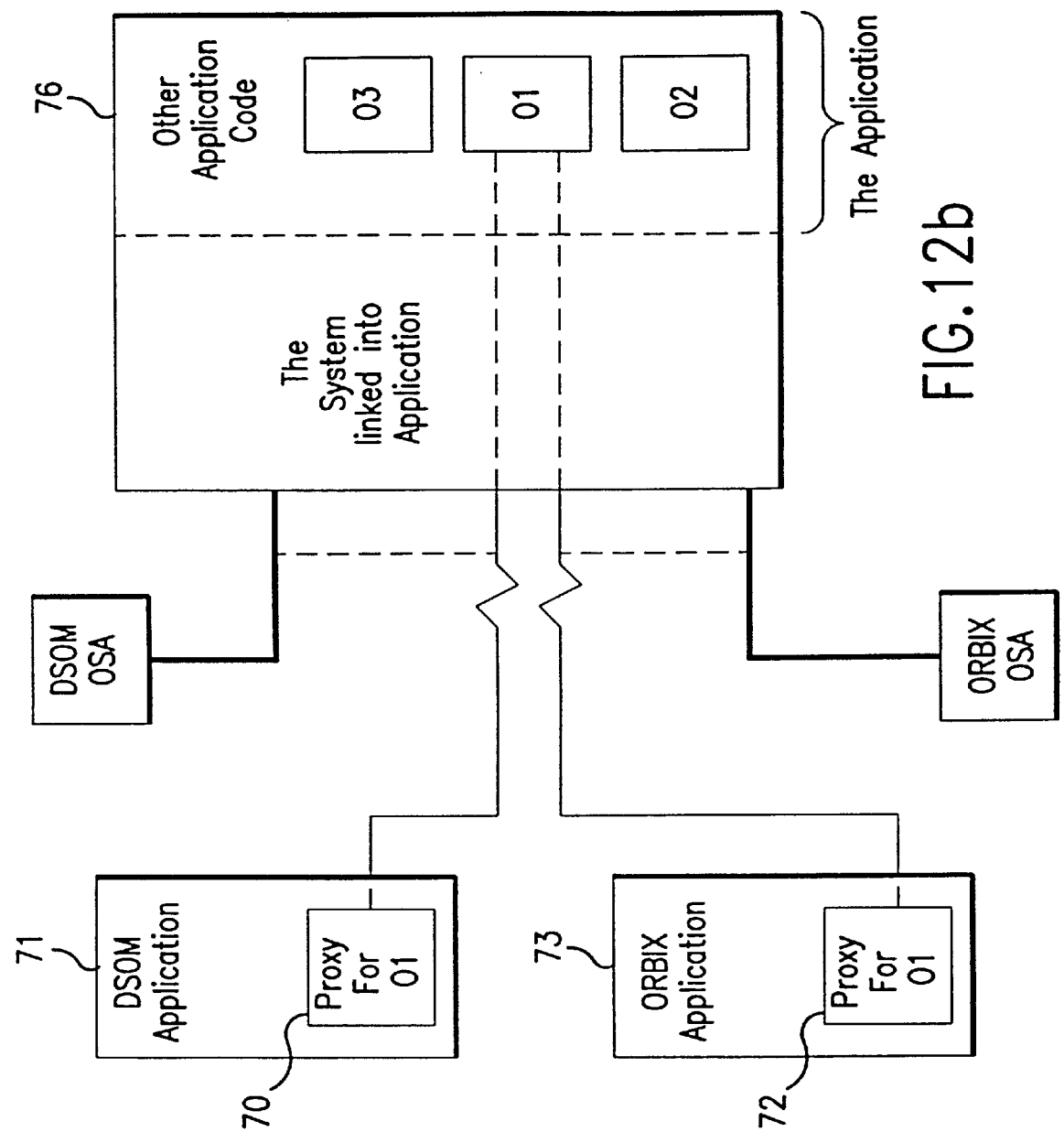
Figure 12C:
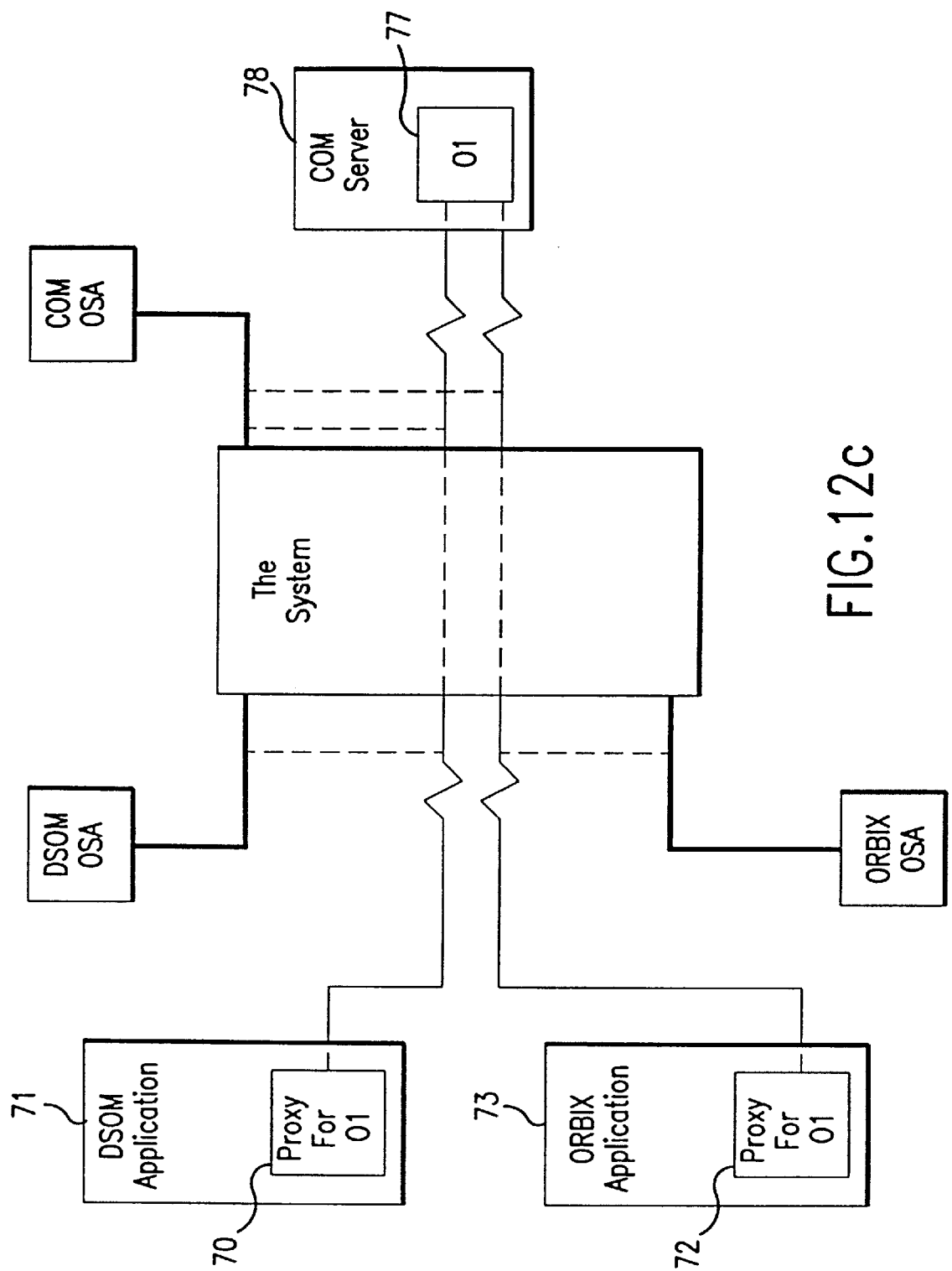

FIG. 12a shows an example of the system enabling a universal object in an individual configuration, while FIGS. 12b, and 12c show application and server configurations respectively. In FIG. 12a, 74 is a COM DLL containing three objects. Object 75, is an individual object (i.e. an object not within an application or server) that, through the system, may appear to be from multiple object systems simultaneously. Additional object systems can be supported simply by adding corresponding OSAs. It will be obvious to those skilled in the art that the DLL, 75, may contain one or more individual objects.

FIG. 12b shows an example of the system being used in an application configuration. The system is linked into the application, 76, which includes application objects. In this example, the application has described its objects directly to the system (as would have an OSA), so no OSA is required. The application's objects, through the system, may appear to be from multiple object systems simultaneously. Alternatively, by providing the appropriate OSAs, the same objects may appear to be implemented using different object systems on different platforms. It will be obvious to those skilled in the art that, had the application utilized an object system, an OSA could have been utilized.

FIG. 12c shows an example of the system being used in a server configuration. The characteristic of a server configuration is that the object server, i.e. the process or processes containing objects being used, are in a separate process from the application which is using those objects. In FIG. 12c, the objects, 77, in the server, 78, through he system, may appear to be from multiple object systems simultaneously.

In FIGS. 11 through 12c, the objects have been shown as compiled objects, however, they need not be. They may be objects written in an interpreted language, whether fully interpreted, or executed through an intermediate representation. All that is required is the interpreter provide some fundamental mechanism by which its objects may be accessed and manipulated, and that either an OSA be written, or the interpreter describe its objects directly to the system. The utility provided by such an approach is that objects may be written in the language of the interpreter, and those objects may, through the system, appear to be from any object system with a corresponding OSA, thus taking advantage of the rapid development characteristics of an interpretive language environment.

In a further embodiment there are provided (B) an apparatus—either library-based or interactive—to enable the construction of object classes from one or more object systems, including the aforementioned "universal object", where such system in the creation of said object classes, may subclass from, incorporate, or embed instances of objects from a plurality of object systems;

Heretofore, software, either library-based or interactive, which enabled the construction of applications from objects, and/or which enabled the construction of objects have required such objects to follow the single object model supported by the tool. For example, see Microsoft Visual Basic V3.0 Professional Features Book 1, Control Development Guide, 1993. In some cases, dynamic converters have been developed to enable the use of objects from one object system within other an object system, with all the consequent limitations, however, they have not enabled the construction of foreign objects. For example, see Borland C++ V4.0 User's Guide, 1993.

For the apparatus, the system is used in the application configuration, where the application software is that code, hereafter referred to as construction software, that is well known to those skilled in the art, for construction of applications from objects, or for the construction of object classes. To construct applications or object classes, the construction software loads object classes from any object system with an OSA (in addition to any which follow the construction software's own internal object model, if any.) The construction software manipulates the foreign object classes using the system frameworks directly, or alternatively, using the mechanisms from its object model. As a result of the uniform means to manipulate objects from a plurality of object systems provided by the system, the apparatus is enabled.

In another embodiment, there are provided (C) a system and method to enable object classes and objects to be relocated among applications and servers in one or more object systems while the applications and servers are executing, and without disruption of software utilizing said object classes and objects, even if it too is executing.

When used with "in process" objects, or when used with an interpretive language environment in individual, application, or server configurations, the relocation of object classes and objects among applications and servers in one or more object systems is enabled. To move an object class, first, a version of the class must be available in the new location/object system. This is accomplished by:

moving the native object definition. In the case of in-process objects, the DLL they are within must be copied or moved by other means. In the case of an interpretive environment, the source or the intermediate representation must be copied or moved by other means to the new location, and loaded into the appropriate application or server using the system to expose the class in the new location and/or object system updating the description of the object class in the system, including its VClassData and other descriptive elements, to reflect its new location and potentially new object system.

If instances of the class already exist and are not to be moved (i.e. only new instances are to be in the new location/object system), the version number of the class must be incremented.

As new instances are created and manipulated, they will be created and manipulated utilizing the new description, thus properly for their new location and potentially new object system. The method applies both to foreign objects, as well as to native objects as long as, for native objects, the system is utilized to perform the creation and manipulation of objects.

Object instances are moved using a similar mechanism. All existing proxies for the instance (i.e. each proxy for each object system and user) must simply have their software description of the native object updated to reflect the new location and/or object system of the instance.

The following is a description of a software architecture according to one embodiment of the present invention.

Overview

Transparent Object System Support

*"To compete in today's emerging global economy one must ..."* - Business Week.

Supporting various object systems in a product that runs on multiple platforms has traditionally been problematic. The same object systems are not always available on all platforms. The object model of choice on one platform is not likely to be the most common on another. Given that this diversity currently exists and will likely continue for the foreseeable future, the application developer is faced with supporting multiple objects systems.

Supporting multiple object models introduces its own problems. It is usually complicated and time consuming to write code for object systems such as OLE and DSOM. The investment required to learn the intricacies of each individual objects system is significant. In addition, coding to an object model can involve extensive restructuring of the original code. The final "wrench in the works" is that if an application is coded to one object model, this generally precludes coding to another at the same time. Recoding to yet another object system will again require a significant investment.

*"There's got to be a better way ..."* - RonCo Industries PLC.

The Visual Edge class registry eliminates these problems and dramatically reduces the investment developers must make to support multiple object models. The class registry abstracts each objects system behind a common API for describing classes, methods, properties, and data types. The API is designed to easily interface to your existing class hierarchy. Once your class hierarchy has been described to the class registry, support for new object systems comes without any modifications required. Support for individual object systems can even be installed and removed at runtime.

The class registry interfaces to an object system through an *object system adapter*. The object system adapter is responsible for managing the details of the object system that it supports. The details of this object system never need to be exposed beyond the adapter. Once an object system adapter is installed in the class registry, any class known to that object system can be transparently introduced to the class registry as needed and vice versa. The object system adapter handles all the details of exposing *any* object instance described in the class registry to the object system that the adapter represents. The adapter also manages the details of exposing any object instance from its object system back into the class registry.

*"But wait ... There's more ..."* - Ginsu Knives Inc.

The same functionality which allows the class registry user to transparently manipulate objects from any object system also allows it to act as an object system "bridge". The class registry can provide a pathway from one object system to another. This would allow, for instance, an OLE Automation application to control DSOM objects and vice versa using the class registry as a bridge. Or as another example, this functionality could allow an OLE Automation application to control an OLE Automation object on a *different* machine — using DSOM to manage the distributed computing and the class registry on both ends as the OLE ↔ DSOM bridge.

The object systems supported by the class registry through object system adapters are not limited to the conventional definition of "object system". An object adapter could be build to interface a database to the class registry. This database could then be able to be accessed easily from any standard object system. The class registry can also be used to interface standard object systems to proprietary object systems — with the addition of an object system adapter for the proprietary object system. This would provide significant leverage for users of the proprietary object system, since it would enable them to continue using their object system while accessing objects in other object systems at the same time.

The class registry is able to make all the installed object systems appear as a simple unified environment. However, different users of object systems have different needs. Some will want a flat name space for all classes and types while others will want a strict hierarchical grouping of class and type names. Others may choose to define their own hierarchy of name groupings which more closely relates to their current tasks. The class registry supports this through the use of *views*. A view defines a name space hierarchy which is independent of the actual hierarchy defined by the object system adapters. Multiple different views can be created for an adapter based hierarchy so that a user can organize his classes in different ways for different tasks. Views can even be reorganized without affecting the code which references classes and types inside them. Finally, developers can subclass views to provide a persistent name space hierarchy to their users.

*"What does this mean to me? "* - KTel Marketing Ltd.

The class registry provides the base functionality to interface to any object system. This allows developers the freedom to focus their resources on their specific strengths. The class registry's single, portable API results in decreased development and maintenance costs over the life cycle of an application as new object systems appear and others become obsolete. This translates into significant savings in overall investment and time to market.

Class Hierarchy

The class registry serves much the same purpose as an IDL or C++ header file of class, function, and type definitions. That is, it represents class and type hierarchies through C++ classes. Classes and types can be entered into the class registry from static, dynamic, and database like sources. Static sources of class and type definitions are typically class registry entries coded by hand and stored in a "code adapter". Dynamic sources, such as OLE and DSOM, provide class definitions to the class registry through their native repositories. Database sources, such as type libraries, provide a mechanism to demand load classes into the class registry.

As well as defining class hierarchies, the class registry provides a flexible dynamic way to advertise class interfaces to language interpreters, builders, object browsers and property editors. The classes in a class registry can be browsed as a whole, or they can be queried by name, version number, object system adapter, etc. The user of the class registry (an interpreter, builder, etc.) does not need to be concerned with the source of the class. The class may come from any object system installed in the class registry.

The class registry does not hide objects defined in foreign object systems under layers of overhead. The class registry manipulates its class instances by actual pointers to the instances; no conversion or casting is required. This allows the class registry to access objects as fast as their native object system can access them.

A class description in the class registry consists of the class name, its base class (or classes), and lists of its methods, user-accessible properties, nested types, exceptions, and named constants or instances.

Each method and property consists of some information (the name, data type, and list of arguments with their types), together with hooks for actually accessing the member on live objects. Each method description includes a function pointer that software using the class registry can call to invoke a method. Each property description can include two *accessor* method descriptions, one to get the value and another to set it. Read-only or write-only properties may omit one of the accessor methods.

C-callable functions are used for generality. Most compiled languages support C for external function calls. It would be convenient to give access to C++ methods and data members directly, but restrictions imposed by the language make this impractical for classes developed independently of the class registry. For situations where the C++ method implementation is predictable (such as platforms using the Microsoft Object Mapping), direct registration of virtual methods is supported. For the same reasons, data members are represented by a pair of accessor functions rather than a direct offset or member pointer.

Figure 13:
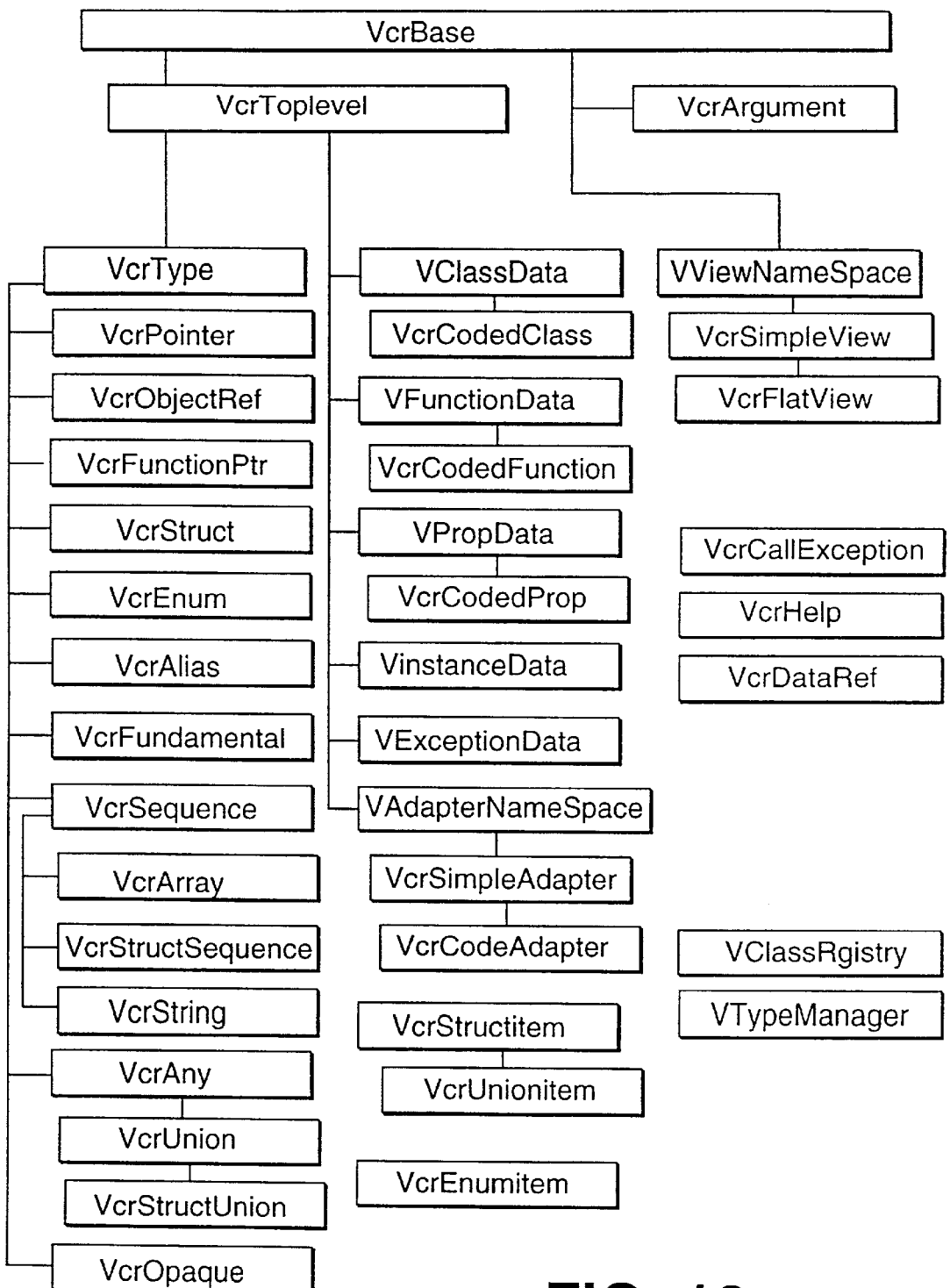
FIG. 13 shows a class hierarchy of a class registry according to the present invention.

Fig. 13 shows the class hierarchy of the class registry. The classes with highlighted borders are designed to be able to be subclassed by users of the class registry.

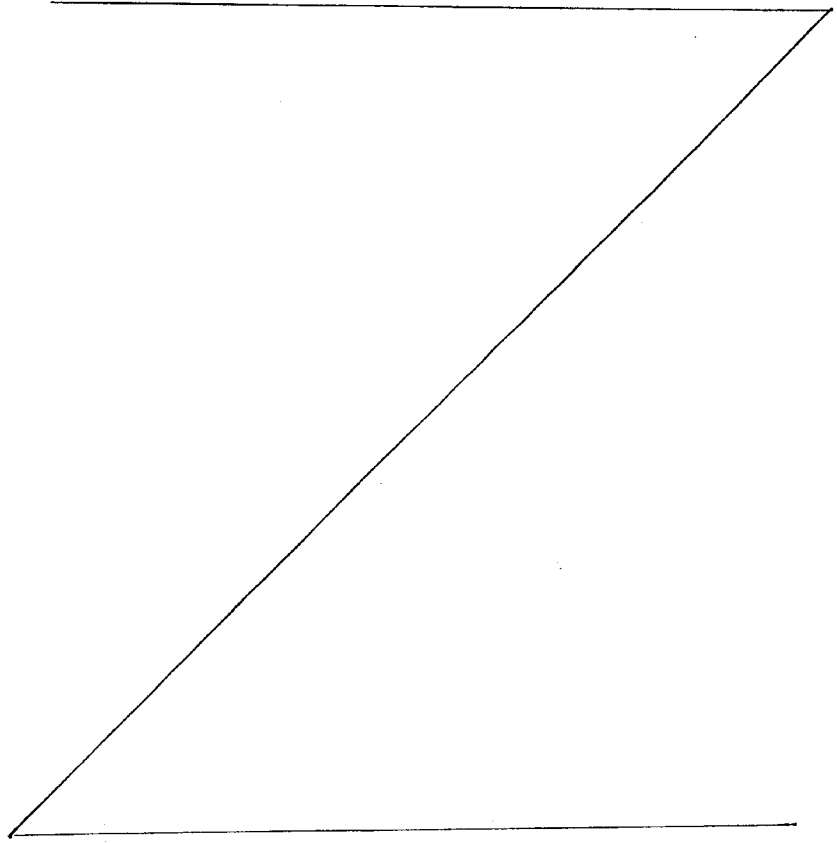

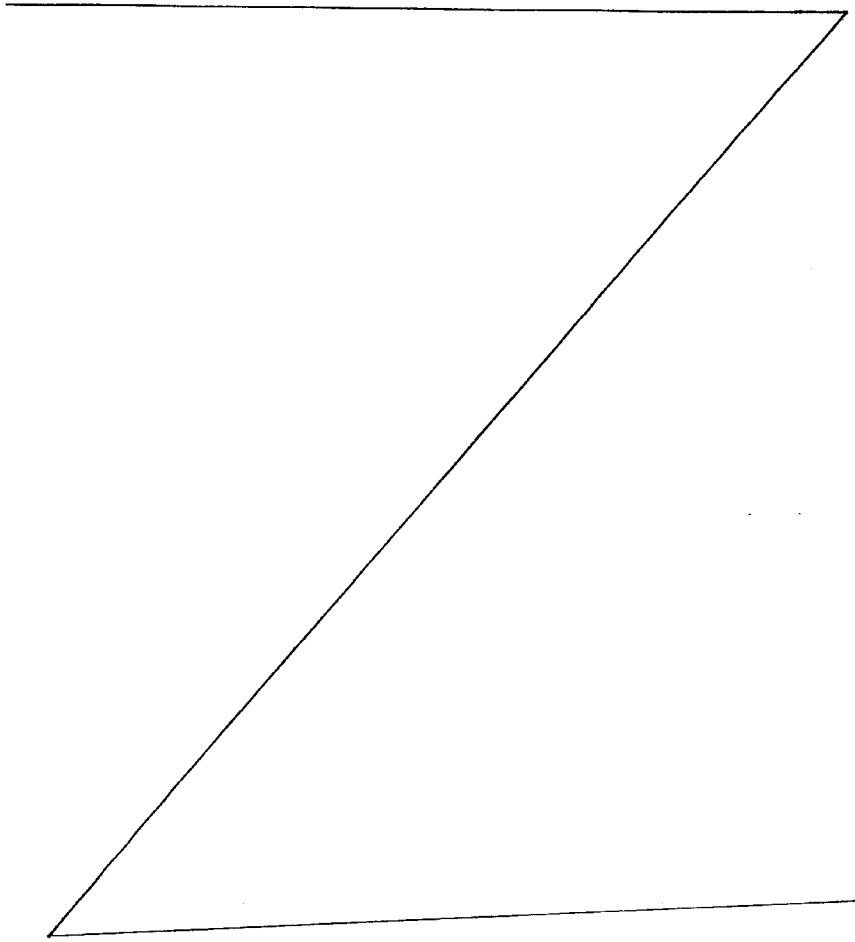

Figure 14:
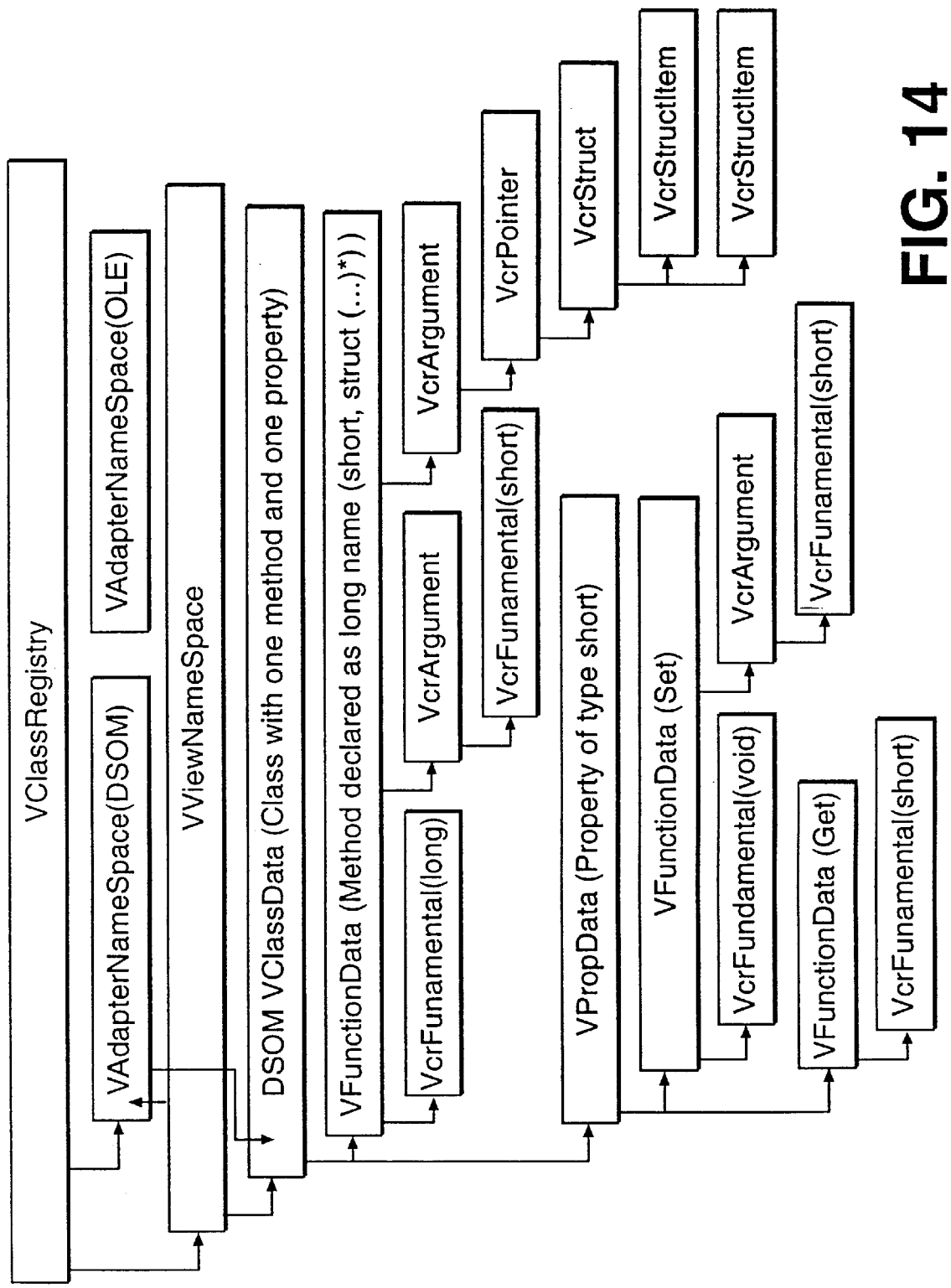
FIG. 14 shows a sample instance hierarchy according to the present invention.

The class registry provides an extensive instance hierarchy to define classes. To facilitate the understanding of this hierarchy the following figure represents a sample instance hierarchy. Fig.14 is intended only to give an example of the instance layout of the class registry and its components. This figure is not intended to be complete but to simply give an overview of the instance layout. The solid arrows represent direct pointers to objects. This hierarchy represents a class registry with two object system adapters installed. The class registry contains one class which defines one method and one property.

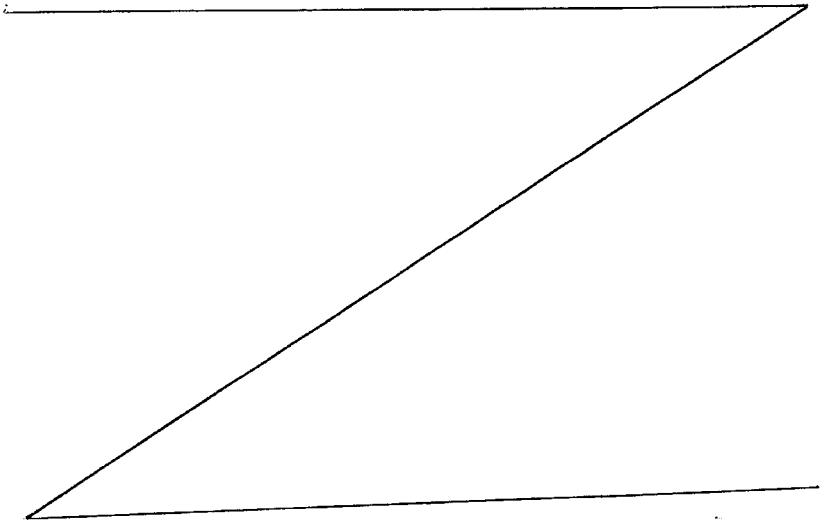

Static Entries

The class registry supports the creation of statically defined classes with methods and properties, types, functions, exceptions, and named instances. Static instances are defined by instantiating instances of the classes VcrCodedClass, VcrCodedFunction, VcrCodedProp, VInstanceData, and VExceptionData. These classes provide APIs to set install methods and properties in classes, to add arguments, etc. Classes are defined by creating a VCodedClass object. Methods and properties (VCodedFunction and VCodedProp instances) are added to the class using its methods AddMethod and AddProperty.

Methods are defined with a set of arguments (instances of VcrArgument) which are added to the method using AddArgument. A C callable function must be provided when defining a method.

Using wrapper functions for class methods can make integrating programmable objects easier, especially in scripting situations. The wrapper arguments need not be the exact types used for the arguments of the underlying class; the wrapper can convert from simpler types (like 'int.') to specific types such as enumerations that are difficult to express in a language such as Basic. You can register read-only properties by either supplying a NULL set function or by setting the usage flags of the property to "read only".

The type of each C wrapper function matches the member function it represents except that it is a file-scope function (or static member) with an instance pointer as its first argument (an explicit "this"). Macros can be defined which generate both the wrappers for C++ class members and the class registry item construction code.

Dynamic Entries

In addition to dealing with static entries the class registry can deal with highly dynamic entries. For example, in interactive object development or object system bridging, the content of the class registry can change as the user browses and queries for external classes or as the user adds or modifies their own classes. When the class registry is connected to an object system which is dynamic, the class registry itself is dynamic in these situations.

Development environments such as language interpreters can consult the class registry for all external type and name binding information at compile-time, run-time, or both. The results of a query at parse-time may indicate simply that the answer be deferred until runtime. If classes are defined statically their definitions can be available at compile time. If classes are being imported from an object system such as DSOM or OLE, they may be available at compile time, but all their methods and properties may not become available until an instance of the class is accessed. The class may also be retrieved from a database adapter. If the class is not found in the local cache, the database adapter may perform a query on the database to find the class definition.

The querying interface of the class registry is defined by the abstract class VViewNameSpace. Name-binding services are provided through its virtual methods. Client processes will typically be configured with one VClassRegistry instance while server processes may have one class registry instance per client. Typically, the class registries maintained by a process manage a set of specialized adapters, each able to query different sources of class and type information. The internal class registry data serves as little more than a cache for information derived from these other sources (such as interface repositories).

The special requirements of each object system adapter can be met by defining subclasses of the class registry item classes. The registry item classes define the structure of the class registry and the API for inspecting it. The registry is an abstract API which is always consulted through the item classes' virtual member functions.

Mixin Extensibility

The class registry defines a mixin framework for its own classes. Every item in the class registry can be extended with mixins. Mixins on class registry entries can provide support for functionality which is available in some object systems but not supported by all object systems. Mixins can also be used to augment the functionality of the class registry beyond its basic implementation. For instance, not all object systems can support exposing classes from the class registry to their object system. Thus, object systems which support exposure can provide an exposure mixin while those that do not support exposure will not provide an implementation of the exposure mixin. The mixin mechanism allows the class registry to be fully extensible without any recompilation of base system modules.

Visual Edge will be working with its partners to define standard suites of mixins (analogous to Apple Event Suites). This increasing application interoperability and helps promote a strong market for add on tools.

Mixins can be provided in an external DLL so that if the mixin is not queried the DLL does not need to be loaded. This also allows a system to define its own "add on packages". The add on packages can be DLL's which contain implementations of mixins. If the DLL is not found, the mixin is not provided and the system can continue with its default behavior.

The mixin extensibility mechanism can also provide memory consumption savings. Since mixins are typically dynamically created when first requested, if a mixin is not requested it will not be constructed.

The class registry provides the capability to provide application and mixin frameworks which are independent of the object system in which they are implemented. That is, an application defines a framework of abstract classes and mixins in its own object system. If the application is "class registry aware" then third parties may develop their implementation of the framework classes or mixins in their own choice of object system. For example, a builder may define mixins for specialized editing of objects such as fonts and colors. Given this standard mixin definition, a third party could implement a specialized editor in OLE using the standard mixin definition even though the builder may operate on DSOM objects. This allows users to have freedom of choice and it allows your application to have greater interoperability.

How This Specification Is Organized

The remainder of this specification defines the classes and types used by the class registry.

- The first section describes the enumerations and typedefs used throughout the class registry. These are general types which are used in more than one location and for more than one purpose. Typedefs which are specific to an individual class are listed with the class itself.

- The second section defines general classes for help support, data references, and function call error returns. These classes are used for specific helper functions such as description and help support, error reporting, and data reference counting.

- The third section outlines the base classes used as the foundation for the class registry classes. These classes provide API support for pervasive information such as usage codes and help information on each element.

- The fourth section defines the classes which are exposed to a user of the class registry. While these classes are the API to the outside world implementations may actually be subclasses of these.

- The fifth section describes the classes which are implementations of the exposed abstract classes. These classes are available for use by direct instantiation or by subclassing.

- The sixth section defines the type management hierarchy for the class registry. These classes provide the support for type casting and comparison between object systems.

- The last section outlines the currently defines extensions. These extensions are available as mixins on particular class registry entries which support the functionality.

The class registry uses the following Visual Edge utility classes. These classes are not defined in this document. Software using the class registry requires access to the libraries which define these classes.

| | |
|---|---|
| VArray | Extensible typed array. |
| VAtomDictionary | Atom keyed hash table. |
| VClass | Support for run time type identification. |
| VValue | Encapsulated union over integral types. |
| VString | Encapsulated null-terminated C string. |
| VAtomRef | String identifiers used for fast hashing and comparisons. |
| VPrimary | Base class for mixin support. |
| VrPrimary | Base class for reference counting and mixin support. |

| | |
|---|---|
| `VMixin` | Base class for mixin implementations. |
| `VrReference` | Smart pointer template to an object which keeps track of reference count of the object. This is needed for proper multi-thread support. |
| `VrRefList` | Template of an array of pointers to objects which keeps track of reference counts of the objects. This is needed for proper multi-thread support. Note that this is *not* an array of `VrReference` objects. |

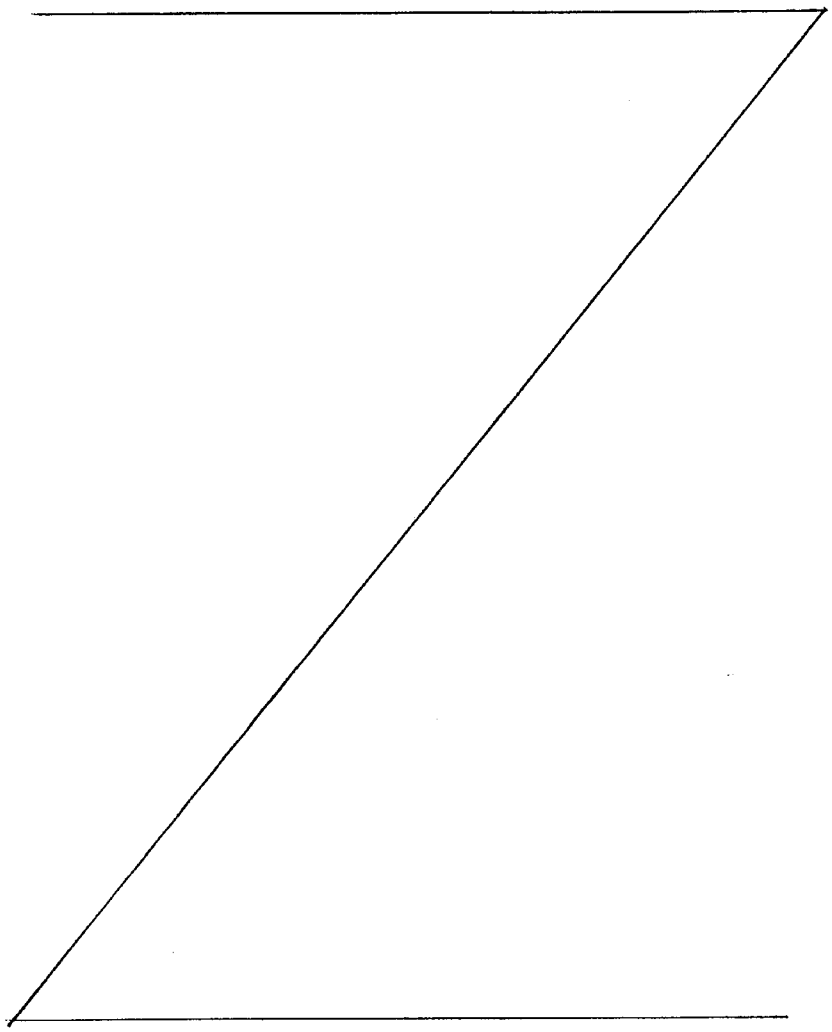

Types and Enumerations

Usage Codes

The registry associates a usage code with most items. The usage code is of type VTUsageCode and is a combination of bit flags describing how the item can be used, such as "hidden" for properties that interpreters can manipulate but should not make accessible directly to the user.

Usage codes supply annotations and implementation details: for example, you do not use separate types to specify call-by-reference versus call-by-value arguments; a usage bit marks function arguments as call-by-reference.

The usage bit flags are context-specific, and may carry different meanings for different classes of item (the same bit may mean one thing for a property and another for a class). Fig. 15 summarizes which usage codes apply to which classes and also which users are most likely to refer to the usage code.

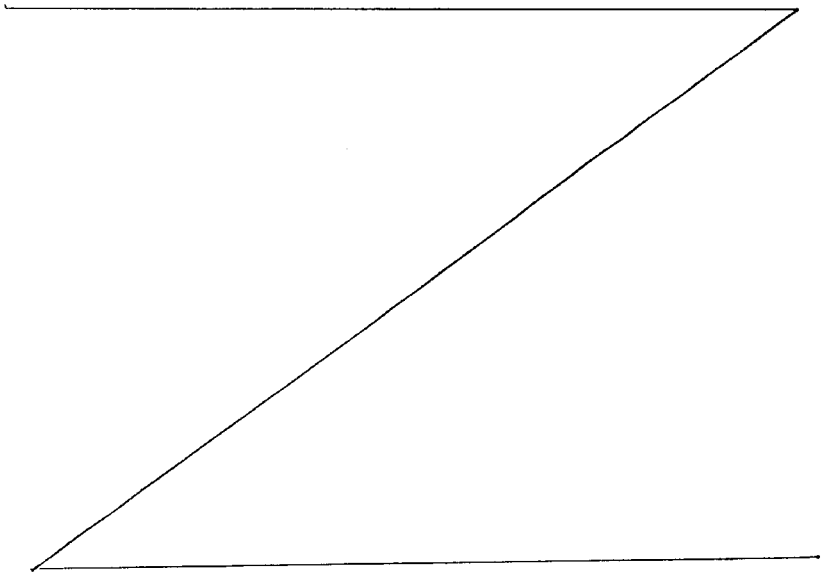

The meanings of the usage codes are as follow:

| | |
|---|---|
| kVUsageReadOnly | Property has no user-accessible set method. |
| kVUsageWriteOnly | Property has no user-accessible get method. |
| kVUsageDefaultProperty | Distinguishes one property of an object as the property to be assigned or read when the object itself appears in value expression (or as the recipient of an assignment). |
| kVUsageProtected | Specifies that this element of a class is a protected member. |

| | |
|---|---|
| `kVUsageThreadSafe` | This usage flag specifies that this function or method can be called by multiple threads at the same time. |
| `kVUsageStrict` | Property, argument, function return, or method return that must not be coerced by normal language rules. |
| `kVUsageVarArg` | For functions or methods, indicates that no argument description is available for it; the function or method should be called using the call arguments as found in the scripted source. Note that function or method described as having a variable number of arguments may not be able to be exposed to other object systems. |
| `kVUsageCallerIsOwner` | This usage flag specifies that this function return, method return, or value returned in an argument is to be freed by the caller. |
| `kVUsageByRef` | Identifies an argument which should actually be passed by address. |
| `kVUsageHidden` | Function, method, argument, or property is supplied by the environment, not by a user. |
| `kVUsageOptional` | Function or method argument can be omitted in call. |
| `kVUsageHasDefault` | An argument for which default value from the VcrArgument should be passed in a call if omitted from a call. |
| `kVUsageValue` | Specified on the argument or a property set which is to hold the actual value for the property. This is only needed when the property set takes multiple arguments. |
| `kVUsageOut` | The argument is actually a return from the function or method. |
| `kVUsageInOut` | The argument is an input to the function or method, but may also be modified during the call. |
| `kVUsageDynamic` | This usage specifies that this class definition may change between queries. That is, when the class is queried it may have more elements (properties, methods, etc.) than when it was first queried. Elements can only be added not removed. |
| `kVUsageDeleteNotify` | This specifies that when an instance of this object is destroyed or fully dereferenced in this process space then the other adapters will be notified of this. |
| `kVUsageCannotSubclass` | This class cannot be subclassed by a language or a builder (however, it may be subclassed in its native object system). |
| `kVUsageDoNotChache` | This usage flag specifies that this top level item should not be cached by any views. |

The set of available, unassigned usage codes is fairly small. Usage codes must be allocated by Visual Edge on an as needed basis so that they do not overlap with other definitions.

Enum VTCallType

This enumeration is used to define the calling conventions required to call a method or function correctly. On any given architecture some or all of the following calling conventions may overlap and provide the same implementation.

– 50 –

| | |
|---|---|
| `kVCallTypeC` | call the function with C calling conventions. This calling convention should be used for a function declared with no prototype in ANSI C or declared with a variable number of arguments |
| `kVCallTypeAnsiC` | call the function with ANSI C or C++ calling conventions. This calling convention should be used for a function declared with an ANSI C prototype and a fixed number of arguments. |
| `kVCallTypePascal` | Call the function with Pascal calling conventions. This calling convention should be used for a function written in Pascal or declared with Pascal calling conventions (i.e. __pascal). |
| `kVCallTypeInternal` | Call the function with ANSI C calling conventions and the internal call signature. The internal call signature is as follows: |

```
VcrCallException *InternalCallSignature(
                    VFunctionData    *funcData,
                    unsigned         paramCount,
                    VTypeData        **paramTypes,
                    void             **params,
                    VTypeData        *resultType,
                    VcrDataRef       *result)
```

| | |
|---|---|
| `funcData` | Function description for the call. |
| `paramCount` | Number of parameters. |
| `paramTypes` | Types of the parameters. |
| `params` | Array of pointers to the parameters. |
| `resultType` | Requested return type. |
| `result` | (Return) Pointer to the return value of the function. |

The value for all arguments should be specified. Hidden arguments should also be included. If any of the arguments cannot be converted to the expected types or if the actual return type of the function cannot be converted to the requested return type the this function should fail and return an exception.

Enum VTSearchType

This enumeration is used to specify how to search for class registry entries. Object system adapters should use this argument to determine whether they should make a possibly long and complex search for the class or function or whether they should simply look locally for the class or function. Languages which support late binding of types and functions may initially perform a local search to see if there is currently a definition. At runtime they will then perform a complete search if the class or function was not found at parse time.

| | |
|---|---|
| `kVSearchAll` | Search in every possible way to find the item. |
| `kVSearchLocal` | Only do a local search for the item; do not perform any time consuming operations to find the item. |

Enum VTSearchCase

This enumeration is used to specify how to perform name searches for class registry entries. Object system adapters and subclasses of the class registry entries should attempt to support both modes of name searching. If case insensitive searching is not possible then all searches should be case sensitive instead.

| | |
|---|---|
| kVCaseSensitive | Name search is case sensitive. |
| kVCaseInsensitive | Name search is case insensitive. |

Enum VTClassTag

This enumeration determines the major subclass of VcrBase to which a particular VcrBase instance belongs. This can be used to differentiate the type of object returned from generic lookup in the class registry.

| | |
|---|---|
| kVcrArgument | kVcrClass |
| kVcrFunction | kVcrProperty |
| kVcrType | kVcrInstance |
| kVcrException | kVcrAdapterSpace |
| kVcrViewSpace | kVcrAll |

Enum VTTypeSubclass

This enumeration determines the subclass of VTypeData to which a particular VTypeData instance belongs. This can be used to facilitate traversal of type trees.

| | |
|---|---|
| kVtmPointer | kVtmObjectRef |
| kVtmFunctionPtr | kVtmStruct |
| kVtmUnion | kVtmEnum |
| kVtmArray | kVtmSequence |
| kVtmVariableArray | kVtmAny |
| kVtmOpaque | kVtmFundamental |
| kVtmAlias | |

Enum VTExceptionType

This enumeration defines all generic class registry function calling exceptions.

| | |
|---|---|
| kVExceptionUnknown | Type of the exception is unknown. |
| kVExceptionCallFailed | Type of the exception is specific to the call support code. Object adapters should return exceptions with this type when marshalling errors, etc. occur. |
| kVExceptionCalleeFailed | The call was completed but the called function generated an exception. |
| kVExceptionNoResources | Insufficient resources were available to complete the call. This can, for instance, be generated by running out of memory. |
| kVExceptionBadParam | One of the parameters could not be converted to the required type. |
| kVExceptionParamCount | The number of parameters was incorrect. |
| kVExceptionBadObject | The object instance to which the call was attempted was invalid. |
| kVExceptionCouldNotExpose | An object instance passed to the call was from a foreign object system could not be converted into an instance from the native object system. |

Enum VTInternalRefType

VTInternalRefType defines the types of internal references to class registry entries:

| | |
|---|---|
| kVDirectRef | Reference is directly to another item in the hierarchy. |
| kVLoopRef | Reference may form a circularity. |

VTObjectSystem

VTObjectSystem is defined as a 16 bit unsigned number used to determine the object system adapter associated with a type manager or class registry entry. This ID is used by the object system adapter to determine any special handling requirements for its own objects and classes versus classes and objects from another object system. It is also used to determine search criteria when querying the class registry. VTObjectSystem ID's must be allocated by Visual Edge. The predefined object system IDs are kVAnyObjectSystem and kVNoObjectSystem.

VTVersion

VTVersion is defined as a 32 bit signed number used for specifying the version number of classes which have the same name but different implementations. A higher version number implies a newer definition. Negative version numbers are illegal. The constant kVVersionNotSpecified is used during searches to specify that the highest version should be found.

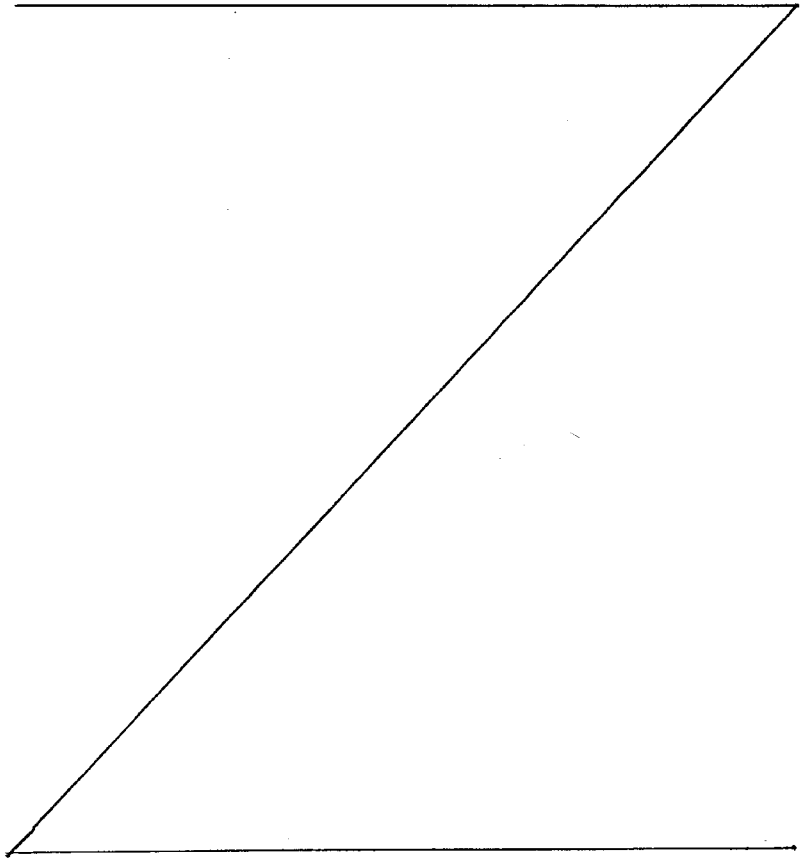

Support Classes

The support classes provide support for other class registry classes. The `VcrHelp` class is used to provide help information on class registry entries and on object method and property calling errors. `VcrCallException` provides information about why a call to a method or property failed. An instance of `VcrCallException` may contain an instance of `VcrHelp` if there is end user readable information available about the source of the problem. `VcrDataRef` is used when calling methods and properties to easily maintain a reference counted data object so that the data object will be deleted when needed.

Class VcrHelp

`VcrHelp` defines the class registry help interface. Subclasses of `VcrHelp` are intended to be implemented to take advantage of each platform's native help system.

Public Members

| | |
|---|---|
| VcrHelp | Constructs a VcrHelp object. |
| ~VcrHelp | Destroys a VcrHelp object. |

Overridable Public Members

| | |
|---|---|
| Description | Returns the textual description of the owner object. |
| PutDescription | Set the textual description for this help item. |
| HasHelp | Indicates whether the item is able display help information about its owner object. |
| DisplayHelp | Display the help information for the owner object. |

VcrHelp Constructors

```
VcrHelp()
VcrHelp(VString description)
``` description Description of the owner object.

Constructs a help support object. There is a convenience constructor which takes a description as its argument. This sets the default description information.

VcrHelp Destructor

```
~VcrHelp()
```

Destroys a help support object. If a help object is added to a class registry or type manager object the help object will be destroyed when its owner is destroyed.

Description and PutDescription

```
VString Description()
void PutDescription(VString)
```

The `Description` property stores the textual description of the owner object. It can be reimplemented in subclasses, for instance, to perform a dynamic lookup of the description. The description should be suitable for display to the end user or should be "" otherwise.

HasHelp

```
bool_t HasHelp()
```

HasHelp returns whether this object supports the native help system. If the return is true, VcrBase::DisplayHelp must be able to bring up the help about its owner object.

DisplayHelp

```
void DisplayHelp()
```

DisplayHelp brings up the native help system information with information about the owner object. If the object does not support help, HasHelp should return false.

Class VcrCallException

VcrCallException is an abstract class which is used to return information about a failed call to a function or method.

Public Members

| | |
|---|---|
| PutHelp | Sets the help system object for this exception. |

Overridable Public Members

| | |
|---|---|
| Type | Returns the type of the exception. |
| Code | Returns the error code for the exception. This is specific to the source of the exception. |
| SourceName | Returns the name of the source of the exception. |
| Help | Returns the help system object for this exception. |
| Index | Returns the index of the parameter which caused the exception (if any). |
| UserType | Returns the exception type if this is a user defined exception. |
| UserData | Returns the exception data if this is a user defined exception. |

Help and PutHelp

```
VcrHelp *Help()
void PutHelp(VcrHelp *help)
```

| | |
|---|---|
| help | Help for this item. |

The Help property stores the help system object for this exception. The help system object provides descriptive information about this exception as well as the ability to display help from the native help system. If the Help property is NULL then this exception does not support any help.

Type

```
VTExceptionType Type() = 0
```

Type returns the type of the exception. This type can be translated into a language specific error message.

Code

```
long Code() = 0
```

Code returns a source specific error code. Unless the meaning of this value is known for the source, this value cannot be interpreted.

SourceName

```
VString SourceName() = 0
```

SourceName returns the name of the source of the exception. This may be the name of an application, object system, etc., or "" if the error was detected inside class registry code.

Index

```
long Index() = 0
```

Index returns the index of the argument which caused the exception. This value is negative if the exception type does not apply to a particular argument or the argument which cause the exception is unknown.

UserType

```
VExceptionData *UserType() = 0
```

UserType returns what type of user defined exception occurred. The data for the exception is retrieved with UserData.

UserData

```
const VcrDataRef &UserData() = 0
```

UserData returns the data associated with a user defined exception. The type of this data is the same as the type of the exception.

Class VcrDataRef

VcrDataRef is an class which is used to manage references to objects or data. The class is self describing and will properly dispose of the data when all VcrDataRef objects which reference the data are disposed of. Note that for the auto-deletion to work, all references must be build from the first reference to the data, not from the original data directly. Internally the reference stores the number of references to an object in a temporary location so that all VcrDataRef objects can access this.

Public Members

| | |
|---|---|
| VcrDataRef | Constructs a VcrDataRef object. |
| Address | Returns a pointer to the data. |
| Type | Returns the type of the data. |
| Value | Returns the internal VValue. |
| PutPointer | Sets the pointer to the data. |
| PutConstant | Sets the value of the data to a constant. |
| PutCopy | Sets this to be a copy of another data ref. |
| PutOwnership | Sets the data's ownership for the references. |
| IsContained | Returns whether the data is contained in the reference. |
| WillDelete | Returns whether the data will be deleted. |

| WillDeref | Returns whether the object will be dereferenced. |

VcrDataRef Constructor

```
VcrDataRef(   void              *dataPntr,
              VTypeData         *type,
              bool_t            doDelete = FALSE,
              bool_t            doDeref  = FALSE)
VcrDataRef(   VValue            data,
              VTypeData         *type = 0)
VcrDataRef(   const VcrDataRef  ©)
VcrDataRef()
```

| dataPntr | Pointer to the data. |
| data | Actual data for the reference value. |
| copy | VcrDataRef to copy from. |
| type | Type of the data. |
| doDelete | Delete the data when references goes to zero. |
| doDeref | Dereference the object when references goes to zero. |

Constructs a reference object. If the data is provided stored in a VValue, the data must be constant. If a VValue is provided and type is zero, type will be initialized from the type stored in the VValue. Note that this might lose any alias information for the type of the data. Only fundamental types (no object pointers, pointers, structs, etc.) are supported in VValues. If type is not an object pointer doDeref is ignored and UxFree will be called on the data if doDelete is TRUE and the number of references reaches zero. If type is an object pointer, if doDelete is TRUE the destructor for the class instance will be called when the reference count reaches zero. Otherwise, if doDeref is TRUE, the release method of the class instance will be called. The constructor with no arguments builds an empty reference.

Address

```
void *Address() const
```

Address returns a pointer to the data. The pointer passed into the constructor or to PutPointer is returned. If the reference is initialized with a constant from a VValue, a pointer to the data will also be returned; however, the reference to the constant will return a pointer to a storage location inside itself. Thus, the pointer should not be used after the reference disappears.

Type

```
VTypeData *Type() const
```

Type returns the type of the data. This is the same as the value passed to the constructor or to PutPointer or PutValue.

Value

```
VValue Value() const
```

Value returns the internal VValue storage if the data is a constant. If the data is a pointer, an invalid VValue will be returned. This method should only be called if IsContained returns TRUE.

PutPointer

```
void PutPointer(    void        *dataPntr,
                    VTypeData   *type,
                    bool_t      doDelete = FALSE,
                    bool_t      doDeref  = FALSE)
```

| | |
|---|---|
| dataPntr | Pointer to the data. |
| type | Type of the data. |
| doDelete | Delete the data when references goes to zero. |
| doDeref | Dereference the object when references goes to zero. |

Resets a reference object. If type is not an object pointer doDeref is ignored and UxFree will be called on the data if doDelete is TRUE and the number of references reaches zero. If type is an object pointer, if doDelete is TRUE the destructor for the class instance will be called when the reference count reaches zero. Otherwise, if doDeref is TRUE, the release method of the class instance will be called. Any data that was previously in the reference will be handled just as if this reference had been destroyed.

PutConstant

```
void PutConstant(   VValue      data,
                    VTypeData   *type = 0)
```

| | |
|---|---|
| type | Type of the data. |
| dataPntr | Pointer to the data. |
| doDelete | Delete the data when references goes to zero. |
| doDeref | Dereference the object when references goes to zero. |

Resets a reference object. The data must be constant. If type is zero type will be initialized from the type stored in the VValue. Note that this might lose any alias information for the type of the data. Only fundamental types (no object pointers, pointers, structs, etc.) are supported in VValues. Any data that was previously in the reference will be handled just as if this reference had been destroyed.

PutCopy

```
void PutCopy(const VcrDataRef ©)
```

| | |
|---|---|
| copy | VcrDataRef to copy. |

Resets a reference object. The new value of the reference is the same as that of copy. This will point to the same data as copy unless copy was as VValue based VcrDataRef. In this case this VcrDataRef will contain a duplicate of the value in copy. Any data that was previously in the reference will be handled just as if this reference had been destroyed.

PutOwnership

```
void PutOwnership(  bool_t      doDelete = FALSE,
                    bool_t      doDeref  = FALSE)
``` doDelete   Delete the data when references goes to zero.
doDeref    Dereference the object when references goes to zero.

PutOwnership changes the ownership information if the data is referenced. If the data is stored in a VValue this method has no effect. This method will typically be used to take over ownership of an object or data. The caller must be sure that the lifetime of the data will be longer than the lifetimes of all references to it.

IsContained

`bool_t IsContained() const`

IsContained returns whether the data is a constant stored in a VValue inside the reference.

WillDelete

`bool_t WillDelete() const`

WillDelete returns whether the data will be deleted when all references to it disappear. This will return TRUE if the data is a constant stored in a VValue inside the reference.

WillDeref

`bool_t WillDeref() const`

WillDeref returns whether the object will be dereferenced when all references to it disappear. This will return FALSE if the data is a constant stored in a VValue inside the reference.

Base Classes

These classes are the base classes for all class registry entries. They provide the common methods and properties which are needed across most of the different classes. VcrBase defines the lowest common denominator for all class registry classes. It supports reference counting, help information, etc. Many of its methods are pure virtual and are implemented in subclasses. VcrToplevel is the base class for class registry items which can be found directly in name spaces. It provides support for version numbering of class registry entries and for maintenance of view information.

Class VcrBase

Public subclass of VrPrimary

VcrBase is the base class for the all class registry elements and type descriptions. It provides methods and storage for name, type, usage, and help information about the item. This base class also supports reference counting for use in its derived classes. VcrBase is not directly instantiable.

Protected Members

| | |
|---|---|
| AcquireChild | Asks the base class to acquire a reference to a child. |
| ReleaseChild | Asks the base class to release a reference to a child. |

Overridable Protected Members

| | |
|---|---|
| AcquireChildren | Acquires internal references to children. |
| ReleaseChildren | Releases internal references to children. |

Public Members

| | |
|---|---|
| AcquireInternal | Acquires an internal reference to the object. |
| ReleaseInternal | Releases an internal reference to the object. |
| PutOwner | Changes the owner of the object. |
| PutHelp | Sets the help information object for this item. |
| Tag | Returns the tag identifying this item. |

Overridable Public Members

| | |
|---|---|
| Name | Returns the name of the item. |
| Type | Returns the type of the item. |
| Usage | Returns the usage flags for the item |
| Owner | Returns the owner the object. |
| Help | Returns the help information object for this item. |
| ObjectSystem | Returns the object system which manages this item. |

Protected Data Members

| | | |
|---|---|---|
| VTAtomP | itsName | The name of the item. |
| VTUsageCode | itsUsage | The usage flags of the item. |

AcquireChild

```
void AcquireChild( VcrBase            *child,
                   VTInternalRefType  refType = kVDirectRef)
``` child          Child to acquire the reference to.
refType      Type of reference to acquire on the child.

This method acquires internal references on a children of the object. For instance, a class would add direct references to its methods, properties, types, etc. This method should be called whenever a new child is added to the object and when AcquireChildren is called. The choice of reference type to add to children is as follows:

- Direct internal references are held by owners on their children and by items on their type objects. AcquireChild(kVDirectRef) adds a direct internal reference.

- Loop internal references are held by types on classes, functions, and other types. AcquireChild(kVLoopRef) adds a loop internal reference.

ReleaseChild

```
void ReleaseChild(    VcrBase            *child,
                      VTInternalRefType  refType,
                      bool_t             decRef     = TRUE,
                      bool_t             deleteSelf = TRUE)
``` child        Child to release the reference from.
refType     Type of reference to release on the child.
decRef      Decrement reference count.
deleteSelf   Delete self if reference count reaches zero.

ReleaseChild will remove internal references from a child of the object. This method should be called whenever a child is removed from the object and when ReleaseChildren is called.

AcquireChildren

```
void AcquireChildren() = 0
```

This method acquires internal references to all children of the object. This method will only be called from AcquireInternal. For instance, a class would add direct references to its methods, properties, types, etc. The choice of reference type to add to children is as follows:

- Direct internal references are held by owners on their children and by items on their type objects. AcquireChild(kVDirectRef) adds a direct internal reference.

- Loop internal references are held by types on classes, functions, and other types. AcquireChild(kVLoopRef) adds a loop internal reference.

ReleaseChildren

```
void ReleaseChildren( bool_t   decRef     = TRUE,
                      bool_t   deleteSelf = TRUE) = 0
``` decRef      Decrement reference count.
deleteSelf  Delete self if reference count reaches zero.

ReleaseChildren will remove internal references from all of its children. This method will only be called from ReleaseInternal. The boolean arguments should be passed on to the ReleaseChild calls on the children. If deleteSelf is TRUE then ReleaseChildren should can replace any pointer to its children with NULL. If deleteSelf is FALSE then ReleaseChildRefs must *not* remove the pointers to its children.

AcquireInternal

```
VTRefCount AcquireInternal(
                    VTInternalRefType refType = kVDirectRef)
``` refType    Type of reference to acquire to the object.

This method acquires an internal reference to the object. AcquireInternal returns the total number of external and internal references to the object including the newly added reference. Internal references are references to the object which are controlled inside the class registry hierarchy. External reference are references to the object which are controlled outside the class registry hierarchy. Internal references are used to avoid circularities in reference counts. This method is only called by AcquireChild. The choice of reference type is as follows:

- External references are held only by the observers outside the class registry. Acquire should be called to add an external references.

- Direct internal references are held by owners on their children and by items on their type objects. AcquireInternal(kVDirectRef) adds a direct internal reference.

- Loop internal references are held by types on classes, functions, and other types. AcquireInternal(kVLoopRef) adds a loop internal reference.

ReleaseInternal

```
VTRefCount ReleaseInternal(
                    VTInternalRefType  refType      = kVDirectRef,
                    bool_t             decRef       = TRUE,
                    bool_t             deleteSelf   = TRUE)
``` refType      Type of reference to acquire to the object.
decRef       Decrement reference count.
deleteSelf   Delete self if reference count reaches zero.

ReleaseInternal will remove an internal reference to the object. The return value is the total number of external and internal references to the object which remain. ReleaseInternal will call ReleaseChildRefs when necessary. ReleaseInternal takes care of resolving circular references. This method is only called by ReleaseChild.

PutOwner

```
void PutOwner(VcrBase *owner)
``` owner      The owner of this object.

PutOwner sets the owner of this object. The owner property is used to enable tracing up an instance tree to the root type or class definition. This method is automatically called by the predefined subclasses of VcrBase.

Help and PutHelp

```
VcrHelp *Help()
void PutHelp(VcrHelp *help)
``` help      Help for this item.

The Help property stores the help system object for this item. The help system object provides description information about this object as well as the ability to display help from the native help system. If the Help property is NULL then this item does not support any help.

Name

```
VAtomRef Name()
```

Name returns the name of the object. The name was specified as an argument to the constructor of the subclasses of VcrBase.

Tag

```
VTClassTag Tag() const
```

Tag returns the tag of the object. The tag identifies which type of subclass of VcrBase that this object is. Each subclass redefines this method to provide the correct implementation.

Type

```
VTypeData *Type()
```

Type returns the type of the object. The default implementation returns NULL. This method must be redefined in each of VcrBase subclasses where it is meaningful. That is, VClassData should return a type which is an object reference to the class; VFunctionData should return the return type of the function; VPropData should return the type of the property. VcrArgument should return the type of the argument; VTypeData should return itself.

Usage

```
VTUsageCode Usage()
```

Usage returns the usage flags of the object. The usage flags were specified as an argument to the constructor of the subclasses of VcrBase.

Owner

```
VcrBase *Owner()
```

Owner returns the VcrBase object which owns this object. For instance if a VFunctionData is added to a VClassData using VClassData::AddMethod, the owner of the VFunctionData will be the VClassData. The subclasses of VcrBase set the owner appropriately using VcrBase::PutOwner. See PutOwner for more information.

ObjectSystem

```
VTObjectSystem ObjectSystem()
```

ObjectSystem returns the object system which manages this item. The default implementation for this method returns kVNoObjectSystem. VcrArgument redefines this method to return the object system of its owner.

Class VcrToplevel

Public subclass of VcrBase

VcrToplevel is the base class for class registry items which can be found directly in a name space. It stores specific information about the views that this item is found in as well as the version number of the item and its full name. This class is not directly instantiable.

Public Members

| | |
|---|---|
| Views | Returns the views which reference this item. |
| InView | Returns whether this class is already in the specified view tree. |
| AddView | Adds a view to the list of references. |
| RemoveView | Removes a view from the list of references. |
| UnmapSelf | Removes the item from all views and its adapter. |

Overridable Public Members

| | |
|---|---|
| MajorVersion | Returns the major version of this item. |
| MinorVersion | Returns the minor version of this item. |

Type Definitions

| | |
|---|---|
| VTToplevelRefList | VrRefList of VcrToplevel objects. |
| VTToplevelRef | VrReference to a VcrToplevel object. |
| VTToplevelDict | VAtomDictionary of VcrToplevel objects. |

Views

```
VTViewList Views() const
```

Views returns all the view name spaces which currently reference this item. No two view name spaces from the same tree can reference the item at the same time.

InView

```
bool_t InView(VViewNameSpace *node) const
``` node     A node in the view name space tree to check for.

InView returns whether the specified item is already found somewhere in the view which owns node. This method can be used to check whether it is already in the tree.

AddView

```
void AddView(VViewNameSpace *node)
``` node     Node in view to add.

AddView adds a view to the list of views which reference this item. node is the actual location in the view at which the item can be found.

- 64 -

RemoveView

```
void RemoveView(VViewNameSpace *node)
``` node      Node in view to remove.

RemoveView removes a view from the list of views which reference this item. node is the actual location in the view at which the item can be found.

UnmapSelf

```
void UnmapSelf()
```

UnmapSelf unmaps the item from all views and from its adapter. This has the effect of flushing this item out of the cache. This can be called on items to help control memory consumption. This implementation of this method calls Unmap on all attached views and on the adapter which owns this item.

MajorVersion

```
VTVersion MajorVersion()
```

MajorVersion returns the major version number of the item. The default implementation return 0. This method can be overridden in subclasses to return a valid major version number.

MinorVersion

```
VTVersion MinorVersion()
```

MinorVersion returns the minor version number of the item. The default implementation return 0. This method can be overridden in subclasses to return a valid minor version number.

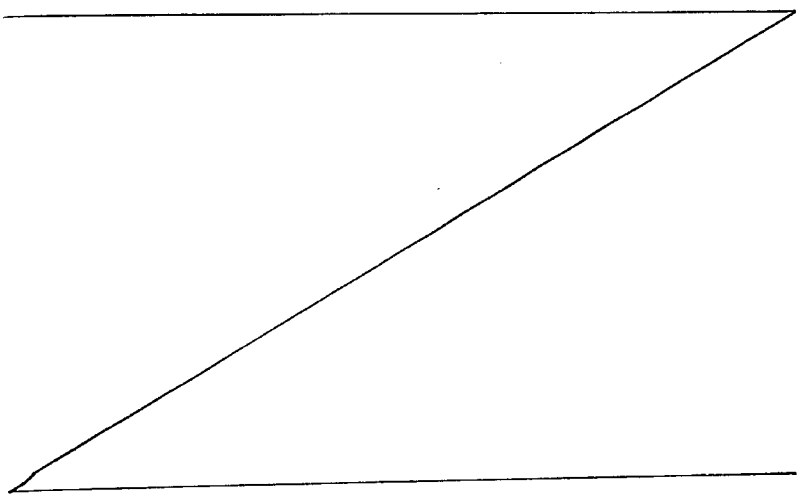

- 65 -

Exposed Classes

These are the classes which are exposed to a user of the class registry. These classes defines the structure for class registry entries. VFunctionData, VPropData, VClassData, VAdapterNameSpace, and VViewNameSpace are abstract classes which are intended to be subclassed for each object system to be able to provide its special support. VcrArgument, VExceptionData, and VInstanceData can either be directly instantiated or can be subclassed for specific purposes. VClassRegistry is directly instantiable and should not be subclassed. The set of exposed classes also includes VTypeData which is defined in the *Type Management* section.

Class VcrArgument
Public subclass of VcrBase

VcrArgument instances specify the arguments to class registry described methods.

Public Members

| | |
|---|---|
| VcrArgument | Constructs a VcrArgument object. |
| Default | Returns the default value of the argument |
| PutDefault | Set the default value of the argument. |

Type Definitions

| | |
|---|---|
| VTArgumentList | VArray of VcrArgument objects. |

VcrArgument Constructor

```
VcrArgument( VAtomRef    name,
             VTypeData   *type,
             VTUsageCode ucodes = 0 )
``` name     Name of the argument.
type     Type of the argument.
ucodes    Usage flags for the argument (if any).

Constructs an argument object. This object will typically be added to a VFunctionData using AddArgument after its creation.

Default and PutDefault

```
const VcrDataRef &Default()
void PutDefault(VcrDataRef)
```

The Default property stores the default value for the argument. This value will be used if the argument is not specified when the method is called. The default value will only be used if the argument type is a fundamental type.

Class VFunctionData
Public subclass of VcrToplevel

- 66 -

VFunctionData is an abstract class which describes a declared function (or method). It includes its name, arguments, return type, and callable entry point. This object can be used in class registry or type manager descriptions or a subclass can be built for the explicit purpose of aiding function calling in an application which does not provide internal support for direct function calling. A method differs from a function in that a method should have a hidden first argument which is an object pointer. This argument will be declared as a generic object pointer. Thus, before executing the method (with VcrCall), it is up to the caller to perform the correct type checking on the first argument. It is the responsibility of the subclass of VFunctionData to add the hidden argument for a method.

Public Members

| | |
|---|---|
| VFunctionData | Constructs a VFunctionData object. |
| Equal | Determines whether this function definition is the same as the specified one. |

Overridable Public Members

| | |
|---|---|
| LockAccess | Checks whether this thread can call the function. |
| UnlockAccess | Unlocks this thread's lock on calling function. |
| FunctionType | Returns a type which represents a pointer to this type of function. |
| IsMethod | Returns whether this is a method. |
| Arguments | Returns the list of arguments for the function. |
| Exceptions | Returns the list of exceptions the function can throw. |
| EntryPoint | Returns the callable entry point for the function. |
| ValidCall | Returns whether the previous call was successful. |

Type Definitions

| | |
|---|---|
| VTFunctionList | VArray of VFunctionData objects. |
| VTFunctionRefList | VrRefList of VFunctionData objects. |
| VTFunctionRef | VrReference to a VFunctionData object. |
| VTFunctionDict | VAtomDictionary of VFunctionData objects. |

VFunctionData Constructor

```
VFunctionData(    VAtomRef      name,
                  VTUsageCode   ucodes = 0 )
``` name     Name of the function.
ucodes     Usage flags for the function (if any).

Constructs a function description. After the definition of the function is complete it can be stored in a class or name space.

Equal

```
bool_t Equal(VFunctionData *func)
``` func     Function description to compare to.

Equal will compare the two function descriptions and return true if they are equal. For the two functions to be equal the names, return types, usage codes, numbers of arguments, and exceptions of the function descriptions must be the same. Also the names, types, and usage codes of all arguments must be equal. The help information is not checked. This method is called by the type manager when determining if two function pointer types are of equal types.

LockAccess

```
bool_t LockAccess(bool_t wait)
``` wait      Wait for lock to be released.

LockAccess locks the VFunctionData so that no other threads may call the function at the same time. If kVUsageThreadSafe is specified on the VFunctionData then LockAccess will always return TRUE. If wait is TRUE and the function is currently locked then LockAccess will wait for the function to be released; otherwise, LockAccess will return FALSE. If LockAccess returns TRUE the VFunctionData::UnlockCall *must* be called later.

UnlockAccess

```
void UnlockAccess()
```

UnlockAccess unlocks the VFunctionData so that other threads may call the function. If kVUsageThreadSafe is specified on the VFunctionData then UnlockAccess does nothing.

FunctionType

```
VTypeData *FunctionType() = 0
```

Returns a type which represents a pointer to function with this signature.

IsMethod

```
bool_t IsMethod() = 0
```

Return whether this object is a method of a class (i.e. it has a hidden first argument of type object) or whether it is a function.

Arguments

```
VTArgumentList Arguments() = 0
```

Return the list of arguments to this function. The list should never have items added to it or removed from it after the function has been directly or indirectly entered in the class registry.

Exceptions

```
VTExceptionList Exceptions() = 0
```

Return the list of exceptions that this function can throw. This list should never be modified by the calling code. A language is not required to use this information. When a function is called through the Call method all necessary information about the exception is returned. This method is used primarily for informational purposes. The list should never have items added to it or removed from it after the function has been directly or indirectly entered in the class registry.

EntryPoint

```
void *EntryPoint(  VClassData   *objClass = 0,
                   void         *object = 0,
                   void         **callObject = 0,
                   VTCallType   *calltype = 0) = 0
```

| | |
|---|---|
| objClass | Class of the object if this is a method. |
| object | Object to which this function will be applied (only valid when EntryPoint is called on a method). |
| callObject | (Return) If this is a method and 'object' is valid, this will contain the object to use as the first argument to the call. |
| callType | (Return) Calling conventions for calling the function |

EntryPoint returns the callable entry point for this function. If this is a method, the first argument may to used to do a dynamic lookup of the entry point for the given object. This means that the entry point and calling conventions can differ depending upon the object instance. The second argument is used to return the object which will be used for the actual call to the method. If this is a method, its owner is a class, and objClass is not 0, then objClass->CastToBase will automatically be called on the object. Otherwise, object should already have been converted to a pointer to the base class by calling VClassData::CastToBase on the object.

ValidCall

```
VcrCallException *ValidCall(
                        VFunctionData    *funcData,
                        unsigned         paramCount,
                        VTypeData        **paramTypes,
                        void             **params,
                        VcrDataRef       &result) = 0
```

| | |
|---|---|
| funcData | Function description for the call. |
| paramCount | Number of parameters. |
| paramTypes | Types of the parameters. |
| params | Array of pointers to the parameters. |
| result | Pointer to the return value of the function. |

ValidCall checks whether the previous call to the function produced a valid result. This method should be reimplemented in subclasses to check the return value and output or in/out parameters for exception information.

Class VPropData

Public subclass of VcrBase

VPropData is an abstract class which describes a property of a class. A property is a named attribute of a class which is accessed through get and set accessor methods. A property must define at least one of the two accessor methods, "get", and "set". The accessor methods can have multiple arguments. This is useful, for instance, when a property is actually a collection of other objects which requires an index to access a particular location in the collection.

Public Members

| | |
|---|---|
| VPropData | Constructs a VPropData object. |

Overridable Public Members

| | |
|---|---|
| LockAccess | Checks whether this thread can call the function. |
| UnlockAccess | Unlocks this thread's lock on calling function. |
| GetMethod | Returns the "get" method of the property. |
| SetMethod | Returns the "set" method of the property. |

Type Definitions

| | |
|---|---|
| VTPropList | VArray of VPropData objects. |

VPropData Constructor

```
VPropData(   VAtomRef        name,
             VTUsageCode     ucodes = 0)
```

| | |
|---|---|
| name | Name of the property. |
| ucodes | Usage flags for the property (if any). |

Constructs a property description. The names of the accessor methods should be the name of the property preceded with either _get_ or _set_. This naming convention (from the CORBA C language binding) allows properties to be accessed consistently across multiple class registry enabled programming languages.

LockAccess

```
bool_t LockAccess(bool_t wait)
```

| | |
|---|---|
| wait | Wait for lock to be released. |

LockAccess locks the VPropData so that no other threads may access the property at the same time. If kVUsageThreadSafe is specified on the VPropData then LockAccess will always return TRUE. If wait is TRUE and the function is currently locked then LockAccess will wait for the function to be released; otherwise, LockAccess will return FALSE. If LockAccess returns TRUE the VPropData::UnlockCall *must* be called later. The default implementation locks both the get accessor and the set accessor before returning.

UnlockAccess

```
void UnlockAccess()
```

UnlockAccess unlocks the VPropData so that other threads may access the property. If kVUsageThreadSafe is specified on the VPropData then UnlockAccess does nothing.

GetMethod

```
VFunctionData *GetMethod() = 0
```

GetMethod returns the retrieval accessor method for the property. This method was installed in the property as part of the constructor. If the return is NULL then the property is not readable. This should always return the same value after its initial invocation.

SetMethod

```
VFunctionData *SetMethod() = 0
```

SetMethod returns the storage accessor method for the property. This method was installed in the property as part of the constructor. If the return is NULL then the property is not writable. This should always return the save value after its initial invocation.

Class VInstanceData
Public subclass of VcrToplevel

VInstanceData describes a named instance of a constant, variable or class. The named instance may be installed in the class registry so that it is a generally available instance or so that it is specific to a class. VInstanceData may be subclassed if necessary. The usage flags specify whether the instance is read only, read write, or write only. A constant is described as a read only instance.

Public Members

| | |
|---|---|
| VInstanceData | Constructs a VInstanceData object. |

Overridable Public Members

| | |
|---|---|
| Value | Returns the value of the instance. |

Protected Members

| | |
|---|---|
| PutValue | Sets the value of the instance. |

Type Definitions

| | |
|---|---|
| VTInstanceList | VArray of VInstanceData objects. |
| VTInstanceRefList | VrRefList of VInstanceData objects. |
| VTInstanceRef | VrReference to a VInstanceData object. |
| VTInstanceDict | VAtomDictionary of VInstanceData objects. |

VInstanceData Constructor

```
VInstanceData(    VAtomRef        name,
                  VcrDataRef      value,
                  VTUsageCode     ucodes = 0)
```

| | |
|---|---|
| name | Name of the instance. |
| value | Value of the instance. |
| ucodes | Usage flags for the instance (if any). |

Constructs a description of a named instance.

PutValue

```
void PutValue(VcrDataRef value)
```

| | |
|---|---|
| value | Value of the instance. |

Sets the value of the named instance. This is intended to be called from subclasses of VInstanceData which need to set the value of the constant after initialization of the base class.

Value

```
const VcrDataRef &Value()
```

Returns the value of the named instance.

---

Class VExceptionData

Public subclass of VcrToplevel

VExceptionData describes a user defined exception. The exception may be installed in the class registry so that it is a generally available exception or so that it is specific to a class. Exceptions are differentiated by their names. VExceptionData may be subclassed it necessary.

Public Members

| | |
|---|---|
| VExceptionData | Constructs a VExceptionData object. |

Protected Members

| | |
|---|---|
| PutType | Sets the type of the exception. |

Type Definitions

| | |
|---|---|
| VTExceptionList | VArray of VExceptionData objects. |
| VTExceptionRefList | VrRefList of VExceptionData objects. |
| VTExceptionRef | VrReference to a VExceptionData object. |
| VTExceptionDict | VAtomDictionary of VExceptionData objects. |

VExceptionData Constructor

```
VExceptionData(   VAtomRef      name,
                  VTypeData     *type,
                  VTUsageCode   ucodes = 0)
```

| | |
|---|---|
| name | Name of the exception. |
| type | Type of the exception. |
| ucodes | Usage flags for the exception (if any). |

Constructs a description of a user defined exception.

PutType

```
void PutType(VTypeData *type)
```

| | |
|---|---|
| type | Type of the exception. |

Sets the type of the user defined exception. This is intended to be called from subclasses of VExceptionData which need to set the type of the exception after initialization of the base class. The type of the exception should not be changed after it has first been retrieved.

---

Class VClassData

Public subclass of VcrToplevel

VClassData is an abstract class which describes a class of object to the class registry. Its definition provides support for querying the set of properties, methods, types, etc. which are owned by the class. The methods include a constructor method, destructor method, and reference counting methods. Any of these methods can be left undefined when describing a class. This class may be subclassed directly, or VcrCodedClass may be subclassed instead for object system adapters.

Public Members

| | |
|---|---|
| VClassData | Constructs a VClassData object. |
| NotifyViews | notifies views that the class has changed. |

Overridable Public Members

| | |
|---|---|
| BaseClass | Returns the first base class of the described class. |
| BaseClasses | Returns a list of all base classes. |
| Constructor | Returns the class's constructor description. |
| Duplicator | Returns the class's copy constructor description. |

| | |
|---|---|
| Destructor | Returns the class's destructor description. |
| AcquireMethod | Returns the description of the class's "Acquire" method. |
| ReleaseMethod | Returns the description of the class's "Release" method. |
| Methods | Returns a list of all the methods of the class or of all the methods which have the specified name. |
| Properties | Returns a list of all the properties of the class. |
| Types | Returns a list of all the types of the class. |
| Instances | Returns a list of all the instances defined in the class. |
| Exceptions | Returns a list of all the exceptions in the class. |
| Method | Returns the method of the specified name. |
| Property | Returns the property of the specified name. |
| DefaultProperty | Returns the default property of the described class. |
| Type | Returns the type of the specified name. |
| Instance | Returns the instance of the specified name. |
| Exception | Returns the exception of the specified name. |
| CastToDirectBase | Casts the object instance to a direct base class. |
| CastToBase | Casts the object instance to any base class instance. |
| CastFromDirectBase | Casts the object instance from a direct base class. |
| CastFromBase | Casts the object instance from any base class to this class. |
| SubclassOfObject | Returns the class of the specified object given that it is a subclass of this class. |
| SubclassOf | Determine whether the class is a subclass of the class which is an argument to this method. |
| SuperclassOf | Determine whether the class is a superclass of the class which is an argument to this method. |

Type Definitions

| | |
|---|---|
| VTClassList | VArray of VClassData objects. |
| VTClassRefList | VrRefList of VClassData objects. |
| VTClassRef | VrReference to a VClassData object. |
| VTClassDict | VAtomDictionary of VClassData objects. |

VClassData Constructor

```
VClassData(  VAtomRef     name,
             VTUsageCode  usage)
``` name    Name of the class.
usage   Usage flags for the class.

Constructs a description of a class. The class may be a base class, singly inherited, or multiply inherited.

A user of the class should obey the following rules for destruction of an object introduced into its scope:

- If the object was constructed with Constructor, the user should call Destructor (if defined) when appropriate.

- If the object is introduced through a method or function call, then if the usage flags on the argument/method which introduced the object contain the flags kVUsageCallerIsOwner then the user should call Destructor when appropriate.

- Otherwise, when the object is introduced, AcquireMethod should be called and when the object is to be disposed of, ReleaseMethod should be called if defined.

It should be noted that these methods (Constructor, Destructor, AcquireMethod, ReleaseMethod) do not necessarily need to be implemented by the object itself, but may be convenience functions designed to ease the integration into the class registry. Constructor may have any arguments, but Destructor, AcquireMethod, and ReleaseMethod must have no arguments or all the arguments must have default values.

NotifyViews

```
void NotifyViews(   short       nummeths,
                    short       numprops,
                    short       numtypes,
                    short       numinsts,
                    short       numexcepts)
``` nummeths   Number of new methods in the class.
numprops   Number of new properties in the class.
numtypes   Number of new types in the class.
numinsts   Number of new instances in the class.
numexcepts Number of new exceptions in the class.

NotifyViews notifies all views of the class that its definition has changed. This must be called whenever the class has changed and there are views on it already. More specifically, the views only need to be notified if the modification has occurred after a complete list of methods, properties, types, instances, or exceptions has been retrieved. Views need to be notified in case they are storing any specific information about methods, properties, etc. for querying purposes.

BaseClass

```
VClassData *BaseClass() = 0
```

BaseClass returns NULL if the class is a base class; the base class if this class is singly inherited; or the first base class provided to the constructor if this class is multiply inherited.

BaseClasses

```
VTClassList BaseClasses() = 0
```

BaseClasses returns an empty VArray if the class is a base class; a VArray containing the base class if this class is singly inherited; or the array of base classes provided to the constructor if this class is multiply inherited. This array should not be modified by the caller.

Constructor

```
VFunctionData *Constructor() = 0
```

Constructor returns the constructor for the described class. The function returned by Constructor is not identical to the C++ constructor for an object. The class registry defined constructor is responsible for allocating the object and it must return the new object. The class registry description for the constructor will have a generic object return type (type code kVTypeObjectPointer). It is possible that there is no constructor specified, in which case Constructor will return NULL. The VFunctionData returned by this method does not have a hidden first argument for the object instance. Thus, this VFunctionData should not be considered to be a method.

Duplicator

```
VFunctionData *Duplicator() = 0
```

Duplicator returns the copy constructor for the described class. The function returned by Duplicator is not identical to the C++ copy constructor for an object. The class registry defined copy constructor is responsible for allocating the object and it must return the new object. The class registry description for the copy constructor will have a generic object return type (type code kVTypeObjectPointer). It is possible that there is no copy constructor specified, in which case Copy will return NULL. The VFunctionData returned by this method has a hidden first argument for the object instance to copy. Thus, this VFunctionData is a method and is not similar to Constructor.

Destructor

```
VFunctionData *Destructor() = 0
```

Destructor returns the destructor for the described class. This method must have no arguments or have default values for all arguments. The method returned by Destructor is not identical to the C++ destructor in that this one is responsible for performing the actual free of the memory allocated for the object instance. It is possible that there is no destructor specified, in which case Destructor will return NULL. The return from Destructor must be a method.

AcquireMethod

```
VFunctionData *AcquireMethod() = 0
```

AcquireMethod returns the method used to add a reference to an instance of the class. This method must have no arguments or all arguments must have default values. The return of AcquireMethod may also be NULL. The return from AcquireMethod must be a method. If an object system does not inherently support reference counting the class registry can provide support for instance based reference counting using utility classes.

ReleaseMethod

```
VFunctionData *ReleaseMethod() = 0
```

ReleaseMethod returns the method used to remove a reference from an instance of the class. This method must have no arguments or all arguments must have default values. The return of ReleaseMethod may also be NULL. The return from ReleaseMethod must be a method.

Methods

```
VTFunctionList Methods() = 0
VTFunctionList Methods(   VAtomRef     name,
                          VTSearchCase searchas,
```

- 75 -

```
                    void       *object = 0) = 0
```

| name | Name of the methods to search for. |
|------|-----------------------------------|
| searchas | Search is either case sensitive or insensitive. |
| object | Object to use for a dynamic search. |

Methods has two overloaded definitions. If the version with no arguments is called, the list of all predefined methods in the class description is returned. The returned list must not be modified. This list will not contain any dynamically available methods unless these have been added to the internal list of methods by a subclass of VClassData. The second version of this method finds all overloaded methods of the given name. If an object is specified, a subclass of VClassData may use this to perform dynamic lookups of the method.

Properties

```
VTPropList Properties() = 0
```

Properties returns the list of all predefined properties in the class description. This list should not be modified by the caller. This list will not contain any dynamically available properties unless these have been added to the internal list of properties by a subclass of VClassData.

Types

```
VTTypeList Types() = 0
```

Types returns the list of all predefined types defined in the class description. This list should not be modified by the caller. This list will not contain any dynamically available types unless these have been added to the internal list of properties by a subclass of VClassData.

Instances

```
VTInstanceList Instances() = 0
```

Instances returns the list of all named instances defined in the class description. Note that these cannot be instances of the class, but will be named constants used by the class. This list should not be modified by the caller. This list will not contain any dynamically available instances unless these have been added to the internal list of properties by a subclass of VClassData.

Exceptions

```
VTExceptionList Exceptions() = 0
```

Exceptions returns the list of all predefined exceptions defined in the class description. This list should not be modified by the caller. This list will not contain any dynamically available exceptions unless these have been added to the internal list of properties by a subclass of VClassData.

Method

```
VFunctionData *Method(  VAtomRef      name,
                        VTSearchCase  searchas,
                        void          *object = 0) = 0
```

| name | Name of the method to search for. |
| --- | --- |
| searchas | Search is either case sensitive or insensitive. |
| object | Object to use for a dynamic search. |

Method finds the first available method of the given name. If an object is specified, a subclass of VClassData may use this to perform a dynamic lookup of the method.

Property

```
VPropData *Property(    VAtomRef     name,
                        VTSearchCase searchas,
                        void         *object = 0) = 0
```

| name | Name of the property to search for. |
| --- | --- |
| searchas | Search is either case sensitive or insensitive. |
| object | Object to use for a dynamic search. |

Property finds the property of the given name in the class description. If an object is specified, a subclass of VClassData may use this to perform a dynamic lookup of the property. Unlike methods, there is no concept of overloaded properties.

DefaultProperty

```
VPropData *DefaultProperty(void *object = 0) = 0
```

| object | Object to use for a dynamic search. |
| --- | --- |

DefaultProperty finds the default property in the class description. This is the property which has been specified with the kVUsageDefaultProperty usage flag. The concept of a default property is supported in languages such as Basic. If an object is specified, a subclass of VClassData may use this to perform a dynamic lookup of the property.

Type

```
VTypeData *Type(    VAtomRef     name,
                    VTSearchCase searchas,
                    void         *object = 0) = 0
```

| name | Name of the type to search for. |
| --- | --- |
| searchas | Search is either case sensitive or insensitive. |
| object | Object to use for a dynamic search. |

Type finds the type of the given name in the class description. If an object is specified, a subclass of VClassData may use this to perform a dynamic lookup of the type.

Instance

```
VInstanceData *Instance(  VAtomRef     name,
                          VTSearchCase searchas,
                          void         *object = 0) = 0
```

| | |
|---|---|
| name | Name of the instance to search for. |
| searchas | Search is either case sensitive or insensitive. |
| object | Object to use for a dynamic search. |

Instance finds the instance object of the given name in the class description. If an object is specified, a subclass of VClassData may use this to perform a dynamic lookup of the instance. Note that this cannot be an instance of the class, but will be a named constant used by the class.

Exception

```
VExceptionData *Exception(VAtomRef     name,
                          VTSearchCase searchas,
                          void         *obj = 0) = 0
```

| | |
|---|---|
| name | Name of the exception to search for. |
| searchas | Search is either case sensitive or insensitive. |
| obj | Object to use for a dynamic search. |

Exception finds the exception of the given name in the class description. If an object is specified, a subclass of VClassData may use this to perform a dynamic lookup of the exception.

CastToDirectBase

```
void *CastToDirectBase(  VClassData    *base,
                         void          *object)
```

| | |
|---|---|
| base | Base class to cast to. |
| object | A pointer to the object instance to cast. |

CastToDirectBase returns the new object pointer which can be used directly in method calls to the specified base class. The default implementation returns object unless base is not a direct base class. The default implementation will be sufficient for most object systems. However, for C++ with multiple base classes, a different object pointer must be returned for each base class. If the base class is not found in the list of base classes, this method should return NULL.

CastToBase

```
void *CastToBase(  VClassData    *base,
                   void          *object)
```

| | |
|---|---|
| base | Base class to cast to. |
| object | A pointer to the object instance to cast. |

CastToBase returns the new object pointer which can be used directly in method calls to the specified base class. The base class specified may be anywhere up the hierarchy. The default implementation finds a path to the base class and calls CastToDirectBase for each level of the hierarchy. The default implementation can be replaced by an adapter defined subclass to be more efficient. If the base class is not found in the hierarchy of base classes, this method should return NULL. This method performs preorder traversal of the tree to find a path to the specified base class.

CastFromDirectBase

```
void *CastFromDirectBase( VClassData    *base,
                          void          *object,
                          bool_t        safe)
```

- 78 -

| | |
|---|---|
| base | Base class to cast from. |
| object | A pointer to the object instance to cast. |
| safe | Perform type safe cast. |

`CastFromDirectBase` returns the new object pointer which can be used directly in method calls to this class. The default implementation returns `object` unless `base` is not a direct base class. The default implementation will be sufficient for most object systems. However, for C++ with multiple base classes, a different object pointer represents each base class instance. If the base class is not found in the list of base classes, this method should return `NULL`. If `safe` is `TRUE` then this method should return non `NULL` only if the cast can be performed as a type safe cast. The default implementation returns `NULL` if `safe` is `TRUE`.

CastFromBase

```
void *CastFromBase( VClassData      *base,
                    void            *object,
                    bool_t          safe)
```

| | |
|---|---|
| base | Base class to cast from. |
| object | A pointer to the object instance to cast. |
| safe | Perform type safe cast. |

`CastFromBase` returns the new object pointer which can be used directly in method calls to this class. The base class specified may be anywhere up the hierarchy. The default implementation finds a path to the base class and calls `CastFromDirectBase` for each level of the hierarchy. The default implementation can be replaced by an adapter defined subclass to be more efficient. If the base class is not found in the hierarchy of base classes, this method should return `NULL`. If `safe` is `TRUE` then this method should return non `NULL` only if the cast can be performed as a type safe cast. The default implementation returns `NULL` if `safe` is `TRUE`. This method performs preorder traversal of the tree to find a path to the specified base class.

SubclassOfObject

```
VClassData *SubclassOfObject(void **object)
```

| | |
|---|---|
| object | (Input & Return) A pointer to the object to narrow. |

Given that `object` is an instance of the described class or of a subclass of the described class, `SubclassOfObject` will narrow the object by returning the subclass description to which the object belongs. If the subclass cannot be determined then the return should be the current class description pointer. In certain cases the implementation of `VClassData` may determine that the object can be more efficiently represented by another pointer. In these cases the input object pointer may be modified. The caller of `SubclassOfObject` should use the modified object pointer in all subsequent calls to methods of the class registry and methods of the object itself.

SubclassOf

```
bool_t SubclassOf(VClassData *other)
```

| | |
|---|---|
| other | Class to use in hierarchy check. |

`SubclassOf` returns whether this described class is a subclass of the class described by `other`.

- 79 -

SuperclassOf

```
bool_t SuperclassOf(VClassData *other)
``` other      Class to use in hierarchy check.

`SuperclassOf` returns whether this described class is a superclass of the class described by `other`.

Class VAdapterNameSpace
Public subclass of VcrToplevel

VAdapterNameSpace is an abstract class which should be subclassed by each object system adapter. This class provides the interface between an object system and the class registry. The object system adapter should, through subclassing of class registry objects, provide an interface between its native format for item descriptions and the class registry description of items such as classes and methods. The adapter should provide a name space hierarchy to the class registry which is as close as possible to its native hierarchy.

Public Members

| | |
|---|---|
| VAdapterNameSpace | Constructs an adapter name space object. |

Overridable Public Members

| | |
|---|---|
| SubSpace | Returns the name space of the specified name. |
| Class | Returns the class of the specified name. |
| Function | Returns the function of the specified name. |
| Type | Returns the type of the specified name. |
| Instance | Returns the instance of the specified. |
| Exception | Returns the exception of the specified name. |
| Classes | Returns the classes of the specified name. |
| Functions | Returns the functions of the specified name. |
| Types | Returns the types of the specified name. |
| Instances | Returns the instances of the specified name. |
| Exceptions | Returns the exceptions of the specified name. |
| All | Returns every item of the specified name. |
| Enumerate | Enumerate items in the name space. |
| Unmap | Unmaps an item from this adapter. |
| UnmapAllFromTree | Unmaps all items from the cache. |
| Removed | Notifies the adapter that it has been removed from the class registry. |

Type Definitions

| | |
|---|---|
| VTAdapterList | VArray of VAdapterNameSpace objects. |
| VTAdapterRefList | VrRefList of VAdapterNameSpace objects. |
| VTAdapterRef | VrReference to a VAdapterNameSpace object. |

VAdapterNameSpace Constructor

```
VAdapterNameSpace( VAtomRef    name,
                   VTUsageCode usage)
``` name       Name of the name space.
usage      Usage flags for the name space.

Constructs an adapter name space. This class is used as the base class to implement object system adapters for the class registry.

SubSpace

```
VTAdapterRef SubSpace(
            VAtomRef        name,
            VTSearchCase    scase  = kVCaseSensitive,
            VTSearchType    search = kVSearchAll,
            unsigned short  depth  = 1) = 0
``` name       Name of name space to find.
scase      Search is either case sensitive or insensitive.
search     Type of search to perform.
depth      Number of name spaces layers to search into.

SubSpace finds the nested name space of the specified name. If the depth parameter is 1 only the top level name space will be searched.

Class

```
VTClassRef Class(
            VAtomRef        name,
            VTSearchCase    scase  = kVCaseSensitive,
            VTVersion       major  = kVVersionNotSpecified,
            VTVersion       minor  = kVVersionNotSpecified,
            VTSearchType    search = kVSearchAll,
            unsigned short  depth  = 1,
            VClassData      *last  = 0) = 0
``` name       Name of class to find.
scase      Search is either case sensitive or insensitive.
major      Major version number to find.
minor      Minor version number to find.
search     Type of search to perform.
depth      Number of name spaces layers to search into.
last       Last found highest version number.

Class finds the class of the specified name. If either of the version numbers is not specified then the item with the highest version number is chosen. If the depth parameter is 1 only the top level name space will be searched. If a version of the item has already been found, it should be passed into this method as the parameter last to use in internal comparisons of version numbers.

Function

```
VTFunctionRef Function(
            VAtomRef        name,
            VTSearchCase    scase  = kVCaseSensitive,
            VTVersion       major  = kVVersionNotSpecified,
            VTVersion       minor  = kVVersionNotSpecified,
            VTSearchType    search = kVSearchAll,
            unsigned short  depth  = 1,
            VFunctionData   *last  = 0) = 0
```

- 81 -

| | |
|---|---|
| name | Name of function to find. |
| scase | Search is either case sensitive or insensitive. |
| major | Major version number to find. |
| minor | Minor version number to find. |
| search | Type of search to perform. |
| depth | Number of name spaces layers to search into. |
| last | Last found highest version number. |

Function finds the function of the specified name. If either of the version numbers is not specified then the item with the highest version number is chosen. If the depth parameter is 1 only the top level name space will be searched. If a version of the item has already been found, it should be passed into this method as the parameter last to use in internal comparisons of version numbers.

Type

```
VTTypeRef Type(
            VAtomRef        name,
            VTSearchCase    scase  = kVCaseSensitive,
            VTVersion       major  = kVVersionNotSpecified,
            VTVersion       minor  = kVVersionNotSpecified,
            VTSearchType    search = kVSearchAll,
            unsigned short  depth  = 1,
            VTypeData       *last  = 0) = 0
```

| | |
|---|---|
| name | Name of type to find. |
| scase | Search is either case sensitive or insensitive. |
| major | Major version number to find. |
| minor | Minor version number to find. |
| search | Type of search to perform. |
| depth | Number of name spaces layers to search into. |
| last | Last found highest version number. |

Type finds the type of the specified name. If either of the version numbers is not specified then the item with the highest version number is chosen. If the depth parameter is 1 only the top level name space will be searched. If a version of the item has already been found, it should be passed into this method as the parameter last to use in internal comparisons of version numbers.

Instance

```
VTInstanceRef Instance(
            VAtomRef        name,
            VTSearchCase    scase  = kVCaseSensitive,
            VTVersion       major  = kVVersionNotSpecified,
            VTVersion       minor  = kVVersionNotSpecified,
            VTSearchType    search = kVSearchAll,
            unsigned short  depth  = 1,
            VInstanceData   *last  = 0) = 0
```

- 82 -

| | |
|---|---|
| name | Name of instance to find. |
| scase | Search is either case sensitive or insensitive. |
| major | Major version number to find. |
| minor | Minor version number to find. |
| search | Type of search to perform. |
| depth | Number of name spaces layers to search into. |
| last | Last found highest version number. |

Instance finds the instance of the specified name. If either of the version numbers is not specified then the item with the highest version number is chosen. If the depth parameter is 1 only the top level name space will be searched. If a version of the item has already been found, it should be passed into this method as the parameter last to use in internal comparisons of version numbers.

Exception

```
VTExceptionRef Exception(
            VAtomRef         name,
            VTSearchCase     scase  = kVCaseSensitive,
            VTVersion        major  = kVVersionNotSpecified,
            VTVersion        minor  = kVVersionNotSpecified,
            VTSearchType     search = kVSearchAll,
            unsigned short   depth  = 1,
            VExceptionData   *last  = 0) = 0
```

| | |
|---|---|
| name | Name of exception to find. |
| scase | Search is either case sensitive or insensitive. |
| major | Major version number to find. |
| minor | Minor version number to find. |
| search | Type of search to perform. |
| depth | Number of name spaces layers to search into. |
| last | Last found highest version number. |

Exception finds the user defined exception of the specified name. If either of the version numbers is not specified then the item with the highest version number is chosen. If the depth parameter is 1 only the top level name space will be searched. If a version of the item has already been found, it should be passed into this method as the parameter last to use in internal comparisons of version numbers.

Classes

```
VTClassRefList Classes(
            VAtomRef         name,
            VTSearchCase     scase  = kVCaseSensitive,
            VTVersion        major  = kVVersionNotSpecified,
            VTVersion        minor  = kVVersionNotSpecified,
            VTSearchType     search = kVSearchAll,
            unsigned short   depth  = 1) = 0
```

| | |
|---|---|
| name | Name of classes to find. |
| scase | Search is either case sensitive or insensitive. |
| major | Minimum major version number to find. |
| minor | Minimum minor version number to find. |
| search | Type of search to perform. |
| depth | Number of name spaces layers to search into. |

Classes finds all versions of class of the specified name. If either of the version numbers are specified, all items with version numbers greater than or equal to numbers specified are returned. If the depth parameter is 1 only the top level name space will be searched.

Functions

```
VTFunctionRefList Functions(
            VAtomRef          name,
            VTSearchCase      scase  = kVCaseSensitive,
            VTVersion         major  = kVVersionNotSpecified,
            VTVersion         minor  = kVVersionNotSpecified,
            VTSearchType      search = kVSearchAll,
            unsigned short    depth  = 1) = 0
```

| | |
|---|---|
| name | Name of functions to find. |
| scase | Search is either case sensitive or insensitive. |
| major | Minimum major version number to find. |
| minor | Minimum minor version number to find. |
| search | Type of search to perform. |
| depth | Number of name spaces layers to search into. |

Functions finds all overloads and versions of the function of the specified name. If either of the version numbers are specified, all items with version numbers greater than or equal to numbers specified are returned. If the depth parameter is 1 only the top level name space will be searched.

Types

```
VTTypeRefList Types(
            VAtomRef          name,
            VTSearchCase      scase  = kVCaseSensitive,
            VTVersion         major  = kVVersionNotSpecified,
            VTVersion         minor  = kVVersionNotSpecified,
            VTSearchType      search = kVSearchAll,
            unsigned short    depth  = 1) = 0
```

| | |
|---|---|
| name | Name of types to find. |
| scase | Search is either case sensitive or insensitive. |
| major | Minimum major version number to find. |
| minor | Minimum minor version number to find. |
| search | Type of search to perform. |
| depth | Number of name spaces layers to search into. |

Types finds all versions of the type of the specified name. If either of the version numbers are specified, all items with version numbers greater than or equal to numbers specified are returned. If the depth parameter is 1 only the top level name space will be searched.

Instances

```
VTInstanceRefList Instances(
        VAtomRef         name,
        VTSearchCase     scase  = kVCaseSensitive,
        VTVersion        major  = kVVersionNotSpecified,
        VTVersion        minor  = kVVersionNotSpecified,
        VTSearchType     search = kVSearchAll,
        unsigned short   depth  = 1) = 0
```

| | |
|---|---|
| name | Name of instances to find. |
| scase | Search is either case sensitive or insensitive. |
| major | Minimum major version number to find. |
| minor | Minimum minor version number to find. |
| search | Type of search to perform. |
| depth | Number of name spaces layers to search into. |

Instances finds all versions of the instance of the specified name. If either of the version numbers are specified, all items with version numbers greater than or equal to numbers specified are returned. If the depth parameter is 1 only the top level name space will be searched.

Exceptions

```
VTInstanceRefList Exceptions(
        VAtomRef         name,
        VTSearchCase     scase  = kVCaseSensitive,
        VTVersion        major  = kVVersionNotSpecified,
        VTVersion        minor  = kVVersionNotSpecified,
        VTSearchType     search = kVSearchAll,
        unsigned short   depth  = 1) = 0
```

| | |
|---|---|
| name | Name of exceptions to find. |
| scase | Search is either case sensitive or insensitive. |
| major | Minimum major version number to find. |
| minor | Minimum minor version number to find. |
| search | Type of search to perform. |
| depth | Number of name spaces layers to search into. |

Exceptions finds all versions of the user defined exception of the specified name. If either of the version numbers are specified, all items with version numbers greater than or equal to numbers specified are returned. If the depth parameter is 1 only the top level name space will be searched.

All

```
VTToplevelRefList All(
        VAtomRef         name,
        VTSearchCase     scase  = kVCaseSensitive,
        VTVersion        major  = kVVersionNotSpecified,
        VTVersion        minor  = kVVersionNotSpecified,
        VTSearchType     search = kVSearchAll,
        unsigned short   depth  = 1) = 0
```

- 85 -

| | |
|---|---|
| name | Name of items to find. |
| scase | Search is either case sensitive or insensitive. |
| major | Minimum major version number to find. |
| minor | Minimum minor version number to find. |
| search | Type of search to perform. |
| depth | Number of name spaces layers to search into. |

All finds all different items (classes, functions, types, etc.) of the specified name. If either of the version numbers are specified, all items with version numbers greater than or equal to numbers specified are returned. If the depth parameter is 1 only the top level name space will be searched.

Enumerate

```
void Enumerate(
                VTAdapterEnumFunc   func,
                void                *context,
                VTClassTag          type   = kVcrAll,
                VTSearchType        search = kVSearchAll) = 0
```

| | |
|---|---|
| func | Function to call for each item. |
| context | Context information to pass into enumeration function. |
| search | Type of search to perform. |

Enumerate enumerates all items of the specified type. If type is kVcrAll then all items are enumerated. Enumerate does not enumerate any items in nested name spaces. For each item found, the enumeration function is called with the arguments context and the item itself.

Unmap

```
void Unmap(VcrToplevel *item) = 0
``` item    Item to unmap from the view.

Unmap unmaps a particular item from the cache of this adapter. The adapter should remove all reference to the item and remove it from its cache. This method can be applied both to adapter name spaces and other items.

UnmapAllFromTree

```
void UnmapAllFromTree() = 0
```

UnmapAllFromTree unmaps all items found recursively in this name space from the cache of this adapter. The adapter should remove all reference to the items and remove them from its cache. This method can be applied both to adapter name spaces and other items.

Removed

```
void Removed() = 0
```

Removed is called by the class registry on the top level adapter name space to notify the adapter that it has been removed. The adapter should not unmap its items and name spaces from views; the views will do this. After calling Removed the class registry will release its reference to the adapter which should then delete the adapter.

Class VViewNameSpace
Public subclass of VcrToplevel

VViewNameSpace is an abstract class which represents a user defined view of class registry items. VAdapterNameSpaces define the actual hierarchy of names where each object system is, in itself, a separate name space from other object systems. Each object system may in turn contain sub name spaces. This predetermined hierarchy of names may not reflect how the end user chooses to view the physically different name spaces. For instance, the user may want all top level names to be in the same name space; or, a language such as Basic may prefer to have a flat name space to work with. These goals can be accomplished using VViewNameSpace. VViewNameSpace provides the user defined mapping between the physical hierarchy of names and the user's view of the hierarchy of names. Multiple VViewNameSpace hierarchies may exist for any physical hierarchy. VViewNameSpace also acts as a cache for items which are retrieved from the adapter name space. Once items have been retrieved from the adapter name space, they can be moved around in the view hierarchy without affecting code which uses them. A view may be implemented in persistent storage. To save where each individual item in the view came from, the view can find the fully qualified name of an item by tracing up the adapter name space hierarchy using VcrBase::Owner. When restoring itself the view can rebuild the objects by querying each level in the fully qualified name for the next item in the name.

Public Members

| | |
|---|---|
| VViewNameSpace | Constructs a view name space. |
| DistanceTo | Returns the distance to another view in the tree. |
| DirectlyInView | Returns whether the item is directly in this view. |
| ViewOfObject | Returns the view which contains the object. |

Overridable Public Members

| | |
|---|---|
| Toplevel | Returns the top level view in this hierarchy. |
| SubSpace | Returns the name space of the specified name. |
| Class | Returns the class of the specified name. |
| Function | Returns the function of the specified name. |
| Type | Returns the type of the specified name. |
| Instance | Returns the instance of the specified. |
| Exception | Returns the exception of the specified name. |
| Classes | Returns the classes of the specified name. |
| Functions | Returns the functions of the specified name. |
| Types | Returns the types of the specified name. |
| Instances | Returns the instances of the specified name. |
| Exceptions | Returns the exceptions of the specified name. |
| All | Returns every item of the specified name. |
| Enumerate | Enumerate items in the name space. |
| MappedAdapters | Returns the list of adapters which are mapped onto this view. |
| Map | Maps an item into this view. |
| Unmap | Unmaps an item from this view. |
| UnmapAll | Unmaps all adapter specific items from this view. |
| UnmapAllFromTree | Unmaps all adapter specific items from this view and all contained views. |
| ClassChanged | Notifies the view that a class in it has changed. |
| AdapterAdded | Notifies the view that a new adapter has been installed in the class registry. |
| AdapterRemoved | Notifies the view that an adapter has been removed from the class registry. |

TopLevel returns the top level view in this hierarchy of view name spaces. This will be called often so it should be cached inside each nested view name space. This method will be called by VcrToplevel::InView to determine if an item had already been mapped into the particular view hierarchy.

SubSpace

```
VTViewRef SubSpace(
            VAtomRef          name,
            VTSearchCase      scase  = kVCaseSensitive,
            VTObjectSystem    system = kVAnyObjectSystem,
            VTSearchType      search = kVSearchAll,
            unsigned short    depth  = 1) = 0
``` name     Name of name space to find.
scase    Search is either case sensitive or insensitive.
system   Object system to do the search in.
search   Type of search to perform.
depth    Number of name spaces layers to search into.

SubSpace finds the nested name space of the specified name. If the item is not found in the cache the view should query each adapters which matches system for the item. If the depth parameter is 1 only the top level name space will be searched. It is the responsibility of the view to decide whether an item from an adapter can appear in multiple locations in a view. The method VcrTopLevel::InView can be called on the item to check if it is already in this view hierarchy.

Class

```
VTClassRef Class(
            VAtomRef          name,
            VTSearchCase      scase  = kVCaseSensitive,
            VTObjectSystem    system = kVAnyObjectSystem,
            VTVersion         major  = kVVersionNotSpecified,
            VTVersion         minor  = kVVersionNotSpecified,
            VTSearchType      search = kVSearchAll,
            unsigned short    depth  = 1,
            VClassData        *last  = 0) = 0
```

- 88 -

| | |
|---|---|
| Removed | Notifies the view that it has been removed from the class registry. |

Type Definitions

| | |
|---|---|
| VTViewList | VArray of VViewNameSpace objects. |
| VTViewRefList | VrRefList of VViewNameSpace objects. |
| VTViewRef | VrReference to a VViewNameSpace object. |

VViewNameSpace Constructor

```
VViewNameSpace(    VAtomRef      name,
                   VTUsageCode   usage)
```

| | |
|---|---|
| name | Name of the name space. |
| usage | Usage flags for the name space. |

Constructs an view name space. This class is used as the base class to implement customizable views of the class registry hierarchy.

DistanceTo

```
bool_t DistanceTo(
            VViewNameSpace   *other,
            int              *distance)
```

| | |
|---|---|
| other | Other name space in the tree. |
| distance | (Return) Distance to the other name space. |

DistanceTo returns the distance to another view in the same tree. The return is FALSE if this and other are not in the same tree or if this and other are siblings. TRUE is returned if other is an ancestor of this or if this is an ancestor of other. distance will be positive if this is an ancestor of other (i.e. other is further down the tree). distance will be negative if other is an ancestor of this. If this is equal to other then the return will be 0.

DirectlyInView

```
bool_t DirectlyInView(VcrToplevel *item)
```

| | |
|---|---|
| item | Object to check. |

DirectlyInView returns whether item is contained directly inside this view. The method will return FALSE unless item is contained directly inside this view.

ViewOfObject

```
VTViewRef ViewOfObject(VcrToplevel *item)
```

| | |
|---|---|
| item | Object to check. |

ViewOfObject returns the view name space in this view hierarchy which contains item.

Toplevel

```
VViewNameSpace *Toplevel() = 0
```

- 89 -

| | |
|---|---|
| name | Name of class to find. |
| scase | Search is either case sensitive or insensitive. |
| system | Object system to do the search in. |
| major | Major version number to find. |
| minor | Minor version number to find. |
| search | Type of search to perform. |
| depth | Number of name spaces layers to search into. |
| last | Last found highest version number. |

Class finds the class of the specified name. If either of the version numbers is not specified then the item with the highest version number is chosen. If an item is found in the cache all subsequent items with higher versions are only checked if from the same adapter and adapter name space. Once the cache checks are complete and higher versions still need to be found or the exact version is not found then the corresponding (or all) adapters name spaces should be checked. If the depth parameter is 1 only the top level name space will be searched. If a version of the item has already been found, it should be passed into this method as the parameter last to use in internal comparisons of version numbers. It is the responsibility of the view to decide whether an item from an adapter can appear in multiple locations in a view. The method VcrTopLevel::InView can be called on the item to check if it is already in this view hierarchy.

Function

```
VTFunctionRef Function(
            VAtomRef          name,
            VTSearchCase      scase  = kVCaseSensitive,
            VTObjectSystem    system = kVAnyObjectSystem,
            VTVersion         major  = kVVersionNotSpecified,
            VTVersion         minor  = kVVersionNotSpecified,
            VTSearchType      search = kVSearchAll,
            unsigned short    depth  = 1,
            VFunctionData     *last  = 0) = 0
```

| | |
|---|---|
| name | Name of function to find. |
| scase | Search is either case sensitive or insensitive. |
| system | Object system to do the search in. |
| major | Major version number to find. |
| minor | Minor version number to find. |
| search | Type of search to perform. |
| depth | Number of name spaces layers to search into. |
| last | Last found highest version number. |

Function finds the function of the specified name. If either of the version numbers is not specified then the item with the highest version number is chosen. If an item is found in the cache all subsequent items with higher versions are only checked if from the same adapter and adapter name space. Once the cache checks are complete and higher versions still need to be found or the exact version is not found then the corresponding (or all) adapters name spaces should be checked. If the depth parameter is 1 only the top level name space will be searched. If a version of the item has already been found, it should be passed into this method as the parameter last to use in internal comparisons of version numbers. It is the responsibility of the view to decide whether an item from an adapter can appear in multiple locations in a view. The method VcrTopLevel::InView can be called on the item to check if it is already in this view hierarchy.

Type

```
VTTypeRef Type(
          VAtomRef         name,
          VTSearchCase     scase  = kVCaseSensitive,
          VTObjectSystem   system = kVAnyObjectSystem,
          VTVersion        major  = kVVersionNotSpecified,
          VTVersion        minor  = kVVersionNotSpecified,
          VTSearchType     search = kVSearchAll,
          unsigned short   depth  = 1,
          VTypeData        *last  = 0) = 0
```

| | |
|---|---|
| name | Name of type to find. |
| scase | Search is either case sensitive or insensitive. |
| system | Object system to do the search in. |
| major | Major version number to find. |
| minor | Minor version number to find. |
| search | Type of search to perform. |
| depth | Number of name spaces layers to search into. |
| last | Last found highest version number. |

Type finds the type of the specified name. If either of the version numbers is not specified then the item with the highest version number is chosen. If an item is found in the cache all subsequent items with higher versions are only checked if from the same adapter and adapter name space. Once the cache checks are complete and higher versions still need to be found or the exact version is not found then the corresponding (or all) adapters name spaces should be checked. If the depth parameter is 1 only the top level name space will be searched. If a version of the item has already been found, it should be passed into this method as the parameter last to use in internal comparisons of version numbers. It is the responsibility of the view to decide whether an item from an adapter can appear in multiple locations in a view. The method VcrTopLevel::InView can be called on the item to check if it is already in this view hierarchy.

Instance

```
VTInstanceRef Instance(
          VAtomRef         name,
          VTSearchCase     scase  = kVCaseSensitive,
          VTObjectSystem   system = kVAnyObjectSystem,
          VTVersion        major  = kVVersionNotSpecified,
          VTVersion        minor  = kVVersionNotSpecified,
          VTSearchType     search = kVSearchAll,
          unsigned short   depth  = 1,
          VInstanceData    *last  = 0) = 0
```

| | |
|---|---|
| name | Name of instance to find. |
| scase | Search is either case sensitive or insensitive. |
| system | Object system to do the search in. |
| major | Major version number to find. |
| minor | Minor version number to find. |
| search | Type of search to perform. |
| depth | Number of name spaces layers to search into. |
| last | Last found highest version number. |

Instance finds the instance of the specified name. If either of the version numbers is not specified then the item with the highest version number is chosen. If an item is found in the cache all subsequent items with higher versions are only checked if from the same adapter and adapter name space. Once the cache checks are complete and higher versions still need to be found or the exact version is not found then the corresponding (or all) adapters name spaces should be checked. If the depth parameter is 1 only the top level name space will be searched. If a version of the item has already been found, it should be passed into this method as the parameter last to use in internal comparisons of version numbers. It is the responsibility of the view to decide whether an item from an adapter can appear in multiple locations in a view. The method VcrTopLevel::InView can be called on the item to check if it is already in this view hierarchy.

Exception

```
VTExceptionRef Exception(
            VAtomRef            name,
            VTSearchCase        scase   = kVCaseSensitive,
            VTObjectSystem      system  = kVAnyObjectSystem,
            VTVersion           major   = kVVersionNotSpecified,
            VTVersion           minor   = kVVersionNotSpecified,
            VTSearchType        search  = kVSearchAll,
            unsigned short      depth   = 1,
            VExceptionData      *last   = 0) = 0
```

| | |
|---|---|
| name | Name of exception to find. |
| scase | Search is either case sensitive or insensitive. |
| system | Object system to do the search in. |
| major | Major version number to find. |
| minor | Minor version number to find. |
| search | Type of search to perform. |
| depth | Number of name spaces layers to search into. |
| last | Last found highest version number. |

Exception finds the user defined exception of the specified name. If either of the version numbers is not specified then the item with the highest version number is chosen. If an item is found in the cache all subsequent items with higher versions are only checked if from the same adapter and adapter name space. Once the cache checks are complete and higher versions still need to be found or the exact version is not found then the corresponding (or all) adapters name spaces should be checked. If the depth parameter is 1 only the top level name space will be searched. If a version of the item has already been found, it should be passed into this method as the parameter last to use in internal comparisons of version numbers. It is the responsibility of the view to decide whether an item from an adapter can appear in multiple locations in a view. The method VcrTopLevel::InView can be called on the item to check if it is already in this view hierarchy.

Classes

```
VTClassRefList Classes(
            VAtomRef            name,
            VTSearchCase        scase  = kVCaseSensitive,
            VTObjectSystem      system = kVAnyObjectSystem,
            VTVersion           major  = kVVersionNotSpecified,
            VTVersion           minor  = kVVersionNotSpecified,
            VTSearchType        search = kVSearchAll,
            unsigned short      depth  = 1) = 0
```

| | |
|---|---|
| name | Name of classes to find. |
| scase | Search is either case sensitive or insensitive. |
| system | Object system to do the search in. |
| major | Minimum major version number to find. |
| minor | Minimum minor version number to find. |
| search | Type of search to perform. |
| depth | Number of name spaces layers to search into. |

Classes finds all versions of class of the specified name. If either of the version numbers are specified, all items with version numbers greater than or equal to numbers specified are returned. Once the local view checks are complete then each mapped adapter matching system should be checked. If the depth parameter is 1 only the top level name space will be searched. It is the responsibility of the view to decide whether an item from an adapter can appear in multiple locations in a view. The method VcrTopLevel::InView can be called on the item to check if it is already in this view hierarchy.

Functions

```
VTFunctionRefList Functions(
            VAtomRef            name,
            VTSearchCase        scase  = kVCaseSensitive,
            VTObjectSystem      system = kVAnyObjectSystem,
            VTVersion           major  = kVVersionNotSpecified,
            VTVersion           minor  = kVVersionNotSpecified,
            VTSearchType        search = kVSearchAll,
            unsigned short      depth  = 1) = 0
```

| | |
|---|---|
| name | Name of functions to find. |
| scase | Search is either case sensitive or insensitive. |
| system | Object system to do the search in. |
| major | Minimum major version number to find. |
| minor | Minimum minor version number to find. |
| search | Type of search to perform. |
| depth | Number of name spaces layers to search into. |

Functions finds all overloads and versions of the function of the specified name. If either of the version numbers are specified, all items with version numbers greater than or equal to numbers specified are returned. Once the local view checks are complete then each mapped adapter matching system should be checked. If the depth parameter is 1 only the top level name space will be searched. It is the responsibility of the view to decide whether an item from an adapter can appear in multiple locations in a view. The method VcrTopLevel::InView can be called on the item to check if it is already in this view hierarchy.

- 93 -

Types

```
VTTypeRefList Types(
            VAtomRef          name,
            VTSearchCase      scase   = kVCaseSensitive,
            VTObjectSystem    system  = kVAnyObjectSystem,
            VTVersion         major   = kVVersionNotSpecified,
            VTVersion         minor   = kVVersionNotSpecified,
            VTSearchType      search  = kVSearchAll,
            unsigned short    depth   = 1) = 0
```

| | |
|---|---|
| name | Name of types to find. |
| scase | Search is either case sensitive or insensitive. |
| system | Object system to do the search in. |
| major | Minimum major version number to find. |
| minor | Minimum minor version number to find. |
| search | Type of search to perform. |
| depth | Number of name spaces layers to search into. |

Types finds all versions of the type of the specified name. If either of the version numbers are specified, all items with version numbers greater than or equal to numbers specified are returned. Once the local view checks are complete then each mapped adapter matching system should be checked. If the depth parameter is 1 only the top level name space will be searched. It is the responsibility of the view to decide whether an item from an adapter can appear in multiple locations in a view. The method VcrTopLevel::InView can be called on the item to check if it is already in this view hierarchy.

Instances

```
VTInstanceRefList Instances(
            VAtomRef          name,
            VTSearchCase      scase   = kVCaseSensitive,
            VTObjectSystem    system  = kVAnyObjectSystem,
            VTVersion         major   = kVVersionNotSpecified,
            VTVersion         minor   = kVVersionNotSpecified,
            VTSearchType      search  = kVSearchAll,
            unsigned short    depth   = 1) = 0
```

| | |
|---|---|
| name | Name of instances to find. |
| scase | Search is either case sensitive or insensitive. |
| system | Object system to do the search in. |
| major | Minimum major version number to find. |
| minor | Minimum minor version number to find. |
| search | Type of search to perform. |
| depth | Number of name spaces layers to search into. |

Instances finds all versions of the instance of the specified name. If either of the version numbers are specified, all items with version numbers greater than or equal to numbers specified are returned. Once the local view checks are complete then each mapped adapter matching system should be checked. If the depth parameter is 1 only the top level name space will be searched. It is the responsibility of the view to decide whether an item from an adapter can appear in multiple locations in a view. The method VcrTopLevel::InView can be called on the item to check if it is already in this view hierarchy.

Exceptions

```
VTExceptionRefList Exceptions(
            VAtomRef            name,
            VTSearchCase        scase  = kVCaseSensitive,
            VTObjectSystem      system = kVAnyObjectSystem,
            VTVersion           major  = kVVersionNotSpecified,
            VTVersion           minor  = kVVersionNotSpecified,
            VTSearchType        search = kVSearchAll,
            unsigned short      depth  = 1) = 0
```

| | |
|---|---|
| name    | Name of exceptions to find. |
| scase   | Search is either case sensitive or insensitive. |
| system  | Object system to do the search in. |
| major   | Minimum major version number to find. |
| minor   | Minimum minor version number to find. |
| search  | Type of search to perform. |
| depth   | Number of name spaces layers to search into. |

Exceptions finds all versions of the user defined exception of the specified name. If either of the version numbers are specified, all items with version numbers greater than or equal to numbers specified are returned. Once the local view checks are complete then each mapped adapter matching system should be checked. If the depth parameter is 1 only the top level name space will be searched. It is the responsibility of the view to decide whether an item from an adapter can appear in multiple locations in a view. The method VcrTopLevel::InView can be called on the item to check if it is already in this view hierarchy.

All

```
VTToplevelRefList All(
            VAtomRef            name,
            VTSearchCase        scase  = kVCaseSensitive,
            VTObjectSystem      system = kVAnyObjectSystem,
            VTVersion           major  = kVVersionNotSpecified,
            VTVersion           minor  = kVVersionNotSpecified,
            VTSearchType        search = kVSearchAll,
            unsigned short      depth  = 1) = 0
```

| | |
|---|---|
| name    | Name of items to find. |
| scase   | Search is either case sensitive or insensitive. |
| system  | Object system to do the search in. |
| major   | Minimum major version number to find. |
| minor   | Minimum minor version number to find. |
| search  | Type of search to perform. |
| depth   | Number of name spaces layers to search into. |

All finds all different items (classes, functions, types, etc.) of the specified name. If either of the version numbers are specified, all items with version numbers greater than or equal to numbers specified are returned. Once the local view checks are complete then each mapped adapter matching system should be checked. If the depth parameter is 1 only the top level name space will be searched. It is the responsibility of the view to decide whether an item from an adapter can appear in multiple locations in a view. The method VcrTopLevel::InView can be called on the item to check if it is already in this view hierarchy.

Enumerate

```
void Enumerate(
            VTViewEnumFunc      func,
            void                *context,
            VTClassTag          type    = kVcrAll,
            VTObjectSystem      system  = kVAnyObjectSystem,
            VTSearchType        search  = kVSearchAll) = 0
```

| | |
|---|---|
| func | Function to call for each item. |
| context | Context information to pass into enumeration function. |
| type | Type of item to search for. |
| system | Object system to do the search in. |
| search | Type of search to perform. |

Enumerate enumerates all items of the specified type. If type is kVcrAll then all items are enumerated. Once the local view checks are complete then each mapped adapter matching system should be checked. If the depth parameter is 1 only the top level name space will be searched. For each item found, the enumeration function is called with the arguments context, and the item itself. This should not enumerate the items in any nested name spaces. It is the responsibility of the view to decide whether an item from an adapter can appear in multiple locations in a view. The method VcrTopLevel::InView can be called on the item to check if it is already in this view hierarchy.

MappedAdapters

```
VTAdapterRefList MappedAdapters() = 0
```

MappedAdapters returns the list of all adapter name spaces which have been mapped onto this view.

Map

```
bool_t Map(VcrToplevel *item) = 0
``` item        Item to map into the view.

Map maps a particular item in into the current view. The view should cache item so that it can be looked up during searches and enumerations. Map applies to classes, functions, types, instances, exceptions, and name spaces. A return or TRUE indicates that the mapping operation was successful. Note that even if the return is successful, the object may not be mapped directly in this name space. It may have been mapped into another place in this view tree.

Unmap

```
void Unmap(VcrToplevel *item) = 0
``` item        Item to unmap from the view.

Unmap unmaps a particular item from the current view. If item is mapped into this view it should be removed. Unmap applies to classes, functions, types, instances, exceptions, and name spaces.

UnmapAll

```
void UnmapAll(VTObjectSystem system) = 0
```

− 96 − system     Object system to unmap items for.

UnmapAll unmaps all items owned by system from the current view. Any items mapped in the view which are owned by system should be removed. UnmapAll does not apply to name spaces only to classes, functions, types, instances, and exceptions.

UnmapAllFromTree

```
void UnmapAllFromTree(VTObjectSystem system) = 0
``` system     Object system to unmap items for.

UnmapAll unmaps all items owned by system from the current view and from all contained views recursively. Any items mapped in the view which are owned by system should be removed. UnmapAllFromTree does not apply to name spaces only to classes, functions, types, instances, and exceptions.

ClassChanged

```
void ClassChanged(   VClassData   *cls,
                     short        nummeths,
                     short        numprops,
                     short        numtypes,
                     short        numinsts,
                     short        numexcepts) = 0
``` cls           Class which has changed.
nummeths    Number of new methods in the class.
numprops    Number of new properties in the class.
numtypes    Number of new types in the class.
numinsts    Number of new instances in the class.
numexcepts   Number of new exceptions in the class.

ClassChanged notifies the view that a class which it contains has changed. It provides the view with the number of new items which were added to the class. This allows the view to manage specialized tables to enable complex searches through its contents.

AdapterAdded

```
void AdapterAdded(VAdapterNameSpace *nspace) = 0
``` nspace     Adapter which was added.

The class registry calls AdapterAdded for each top level view when a new adapter has been installed. The view may map the adapter into its space in any way it chooses.

AdapterRemoved

```
void AdapterRemoved(VAdapterNameSpace *nspace) = 0
``` nspace     Adapter which was removed.

The class registry calls AdapterRemoved for each top level view when an adapter has been removed. The view may persistently store information about where the adapter's items are in its hierarchy at this time. After this, the view should unmap all adapter name spaces and items belonging to the adapter.

Removed

```
void Removed() = 0
```

Removed is called by the class registry on the top level view to notify it that it has been removed from the list of available views. The view can persistently store information about its hierarchy at this time. The view should then unmap all items and adapters and all sub views. After calling Removed the class registry will release its reference to the view which should cause the view to be deleted.

Class VClassRegistry

Public subclass of VPrimary

VClassRegistry is a class which manages views and adapters. Adapters provide the interface between different object systems and the views. Views provide a hierarchy of name spaces which may be presented to the user. Views can be defined by the user to group items into user defined categories. Although any given class can appear only once in a view, multiple views can exist at the same time. Any view can have any layout of names. The physical hierarchy of names (classes inside name spaces, etc.) remains the same and views only reorder their hierarchy to suit their own needs. Views may be implemented as persistent storage objects which store the "virtual" hierarchy of name spaces and items and reload it when later recreated. Adapter views provide the physical hierarchy of names.

Public Members

| | |
|---|---|
| VClassRegistry | Constructs a VClassRegistry object. |
| ~VClassRegistry | Destroys a VClassRegistry object. |

Public Members

| | |
|---|---|
| TypeManager | Returns the type manager used by this registry. |

Overridable Public Members

| | |
|---|---|
| AddView | Adds a new top level view. |
| RemoveView | Removes a view from the registry. |
| Views | Returns all the views in the registry. |
| AddAdapter | Adds an object system adapter to the registry. |
| RemoveAdapter | Removes an object system adapter from the registry. |
| Adapters | Returns the list of installed object system adapters. |

VClassRegistry Constructor

VClassRegistry(VTypeManager *manager)

manager   Type manager to use for type comparisons.

The VClassRegistry constructor the internal data structures. The argument specifies which type manager to use for type queries. The class registry itself does not use the type manager directly. It is provided so that users of the class registry are able to determine comparison information about the types contained in class, function, instance, exception, and type descriptions.

VClassRegistry Destructor

~VClassRegistry()

The VClassRegistry destructor removes all views and removes all adapters. This will cause all class registry objects to be destructed unless they are still referenced.

TypeManager

```
VTypeManager *TypeManager() = 0
```

TypeManager returns the type manager associated with this class registry. The type manager is used to manage compatibility of data types.

AddView

```
void AddView(VViewNameSpace *view)
``` view     View to add to the list.

AddView adds a new view to the list of top level views. The registry will add a reference to the view then notify it of all adapters attached to the registry.

RemoveView

```
void RemoveView(VViewNameSpace *view)
``` view     View to remove from the list.

RemoveView removes a view from the list of top level views. The registry will call Removed on the view and then release its reference to the view.

Views

```
VTViewRefList Views()
```

Views returns the list of all created top level views attached to the class registry. This list should not be modified.

AddAdapter

```
void AddAdapter(VAdapterNameSpace *adapter)
``` adapter     Adapter to add to the list.

AddAdapter adds an object system adapter to the list of supported adapters. As each adapter is added, the adapter is put on the end of the adapter list. The order in which adapters are added to the class registry is important since they are queried in the same order. This will notify each existing view that a new adapter has been added.

RemoveAdapter

```
void RemoveAdapter(VAdapterNameSpace *adapter)
``` adapter     Adapter to remove from the list.

RemoveAdapter removes an object system adapter from the list of supported adapters. Adapters can be removed in any order. This will notify each existing view that an adapter has been removed. Then registry will call Removed on the adapter and release its reference to the adapter.

Adapters

```
VTAdapterRefList Adapters()
```

Adapters returns the list of all installed object system adapters. This list should not be modified.

Implementation Classes

These classes are implementations of the abstract classes defined in the *Exposed Classes* section. These classes are directly instantiable and can be used to build up class registry entries in code. These classes may also be subclassed to provide special support for an object system adapter. It is up to the designer of an object system adapter to decide whether to subclass these classes or whether to subclass the classes defined in the *Exposed Classes* section.

Class VcrCodedFunction

Public subclass of VFunctionData

VcrCodedFunction is an implementation if VFunctionData which allows the object to be built up in simple C++ code by adding arguments and exceptions one by one. This implementation stores the information about the arguments and exceptions. This class may be subclassed by other object systems.

Public Members

| | |
|---|---|
| VcrCodedFunction | Constructs a VcrCodedFunction object. |
| AddArgument | Adds an argument to the function. |
| RemoveArgument | Removes an argument from the function. |
| AddException | Adds an exception which the function can throw. |
| RemoveException | Removes an exception which the function can throw. |

Protected Members

| | |
|---|---|
| PutType | Sets the type of the function. |

Protected Data Members

| | | |
|---|---|---|
| bool_t | itIsAMethod | Specifies whether this is a method or not. |
| void | *itsEntryPoint | Stores the entry point of this function. |
| VTCallType | itsCallType | Stores the calling conventions for this function. |

VcrCodedFunction Constructor

```
VcrCodedFunction(   VAtomRef      name,
                    VTypeData     *resultType = 0,
                    bool_t        isMethod = TRUE,
                    VTUsageCode   ucodes = 0,
                    void          *entryPoint = 0,
                    VTCallType    calltype = kVCallTypeAnsiC)
```

| | |
|---|---|
| name | Name of the method. |
| resultType | Return type of the method. |
| isMethod | This object represents a method. |
| ucodes | Usage flags for the method (if any). |
| entryPoint | Callable entry point of the method. |
| calltype | Calling conventions to use when calling the method. |

Constructs a function description object. If isMethod is true the constructor automatically adds a hidden first argument of type kVTypeObjectPointer. After creation arguments can be added to the description using AddArgument. After the definition of the function is complete it can be stored in a class or name space.

AddArgument

```
void AddArgument(VcrArgument *arg)
``` arg      The argument to add to the function description.

AddArgument adds an argument to the function description. As each argument is added, the argument is put on the end of the argument list. Arguments should never be added to the function after it is directly or indirectly installed in the class registry.

RemoveArgument

```
void RemoveArgument(VcrArgument *arg)
``` arg      The argument to remove from the function description.

RemoveArgument removes an argument from the function description. Arguments can be removed in any order. Arguments should never be removed from the function after it is directly or indirectly installed in the class registry.

AddException

```
void AddException(VExceptionData *except)
``` except      The exception to add to the function description.

AddException adds an exception to the list of exceptions the function can throw. To allow languages to access the exceptions by name they should also be added to either a class or name space.

RemoveException

```
void RemoveException(VExceptionData *except)
``` except      The exception to remove from the function description.

RemoveException removes an exception from the list of exceptions that the function can throw. Exceptions can be removed in any order. Exceptions should never be removed from the function after it is directly or indirectly installed in the class registry.

PutType

```
void PutType(VTypeData *type)
``` type      Type of the function.

Sets the return type of the function. This is intended to be called from subclasses of VcrCodedFunction which need to set the type of the function after initialization of the base class. The type of the function should not be changed after it has first been retrieved.

Class VcrCodedProp

Public subclass of VPropData

VcrCodedProp is an implementation of VPropData which can be used directly from C++ so that a subclass of VPropData does not need to be defined. VcrCodedProp stores the accessor methods inside itself. This class is designed to allow subclassing.

Public Members

VcrCodedProp          Constructs a VPropData object.

Protected Members

PutType          Sets the type of the function.

Protected Members

PutGetMethod          Sets the "get" method of the property.
PutSetMethod          Sets the "set" method of the property.

VcrCodedProp Constructor

```
VcrCodedProp(VAtomRef       name,
             VTypeData      *resultType = 0,
             VTUsageCode    ucodes = 0,
             VFunctionData  *getMethod = 0,
             VFunctionData  *setMethod = 0)
```

| | |
|---|---|
| name | Name of the property. |
| resultType | The type of the property. |
| ucodes | Usage flags for the property (if any). |
| getMethod | Description of the "get" method. |
| setMethod | Description of the "set" method. |

Constructs a property description. The names of the accessor methods should be the name of the property preceded with either "Get" or "Set". This naming convention allows properties to be accessed consistently across multiple class registry enabled programming languages.

PutType

```
void PutType(VTypeData *type)
``` type          Type of the property.

Sets the type of the property. This is intended to be called from subclasses of VcrCodedProp which need to set the type of the property after initialization of the base class. The type of the property should not be changed after it has first been retrieved.

PutGetMethod

```
void PutGetMethod(VFunctionData *getMethod)
``` getMethod      Description of the "get" method.

Changes the "get" method of the property. Normally this should only be called from a subclass which needs to set the data after creation.

PutSetMethod

```
void PutSetMethod(VFunctionData *setMethod)
``` setMethod      Description of the "set" method.

Changes the "set" method of the property. Normally this should only be called from a subclass which needs to set the data after creation.

Class VcrCodedClass
Public subclass of VClassData

VcrCodedClass is an implementation of VClassData which is used to define classes directly from C++ code without the need to subclass VClassData. The instance stores lists of methods, properties, types, instances, and exceptions as they are added. This class is designed to be subclassed if so desired.

Public Members

| | |
|---|---|
| VcrCodedClass | Constructs a VcrCodedClass object. |

Public Members

| | |
|---|---|
| AddMethod | Adds a method to the class description. |
| RemoveMethod | Removes a method from the class description. |
| AddProperty | Adds a property to the class description. |
| RemoveProperty | Removes a property from the class description. |
| AddType | Adds a type to the class description. |
| RemoveType | Removes a type from the class description. |
| AddInstance | Adds an instance to the class description. |
| RemoveInstance | Removes an instance from the class description. |
| AddException | Adds an exception to the class description. |
| RemoveException | Removes an exception from the class description. |

Protected Members

| | |
|---|---|
| PutBaseClass | Sets the base class of this class. |
| PutBaseClasses | Sets the list of base classes of this class. |
| PutConstructor | Sets the constructor function. |
| PutDuplicator | Sets the copy constructor function. |
| PutDestructor | Sets the destructor method. |
| PutAcquireMethod | Sets the acquire method. |
| PutReleaseMethod | Sets the release method. |
| MyMethods | Returns the list of methods defines in this class. |
| MyProperties | Returns the list of properties defines in this class. |
| MyTypes | Returns the list of types defines in this class. |
| MyInstances | Returns the list of instances defines in this class. |
| MyExceptions | Returns the list of exceptions defines in this class. |

Protected Data Members

| | | |
|---|---|---|
| VTVersion | itsMajor | Major version number of the class. |
| VTVersion | itsMinor | Minor version number of the class. |
| VTCastList | itsCastToBasesList | List of functions which cast to the given base classes. |
| VTSafeCastList | itsCastFromBasesList | List of functions which cast from the given base classes. |

VcrCodedClass Constructors

| VcrCodedClass( | VAtomRef | name, |
|---|---|---|
| | VClassData | *baseClass = 0, |
| | VFunctionData | *constructor = 0, |
| | VFunctionData | *duplicator = 0, |
| | VFunctionData | *destructor = 0, |
| | VFunctionData | *acquire = 0, |

- 103 -

```
                    VFunctionData       *release = 0,
                    VTUsageCode         ucodes = 0,
                    VTVersion           major = 0,
                    VTVersion           minor = 0)

VcrCodedClass(      VAtomRef            name,
                    VTClassList         baseClasses,
                    VTCastList          castToBases,
                    VTSafeCastList      castFromBases,
                    VFunctionData       *constructor = 0,
                    VFunctionData       *duplicator = 0,
                    VFunctionData       *destructor = 0,
                    VFunctionData       *acquire = 0,
                    VFunctionData       *release = 0,
                    VTUsageCode         ucodes = 0,
                    VTVersion           major = 0,
                    VTVersion           minor = 0)
```

| | |
|---|---|
| name | Name of the class. |
| baseClass | The base class (or NULL) for this singly inherited class. |
| baseClasses | The list of base classes for this multiply inherited class. |
| castToBases | The list of functions used to cast to each base class. |
| castFromBases | The list of functions used to cast from each base class. |
| constructor | Description of the class constructor. |
| duplicator | Description of the class copy constructor. |
| destructor | Description of the class destructor (must be a method). |
| acquire | Description of the method used to add a reference to an instance (must be a method). |
| release | Description of the method used to remove a reference to an instance of the class (must be a method). |
| usage | Usage codes for the class. |
| major | Major version number of the class. |
| minor | Minor version number of the class. |

Constructs a description of a class. The class may be a base class, singly inherited, or multiply inherited. To construct a base class the first overload of the constructor should be used with NULL as the base class.

constructor is the primary constructor for the class. constructor may be used, for instance, by an application builder to construct an instance of the object. For a language interpreter, if constructor is not specified then an instance cannot be created but must be introduced by some other means. An instance could be returned by a function for example.

It should be noted that these methods (constructor, copy, destructor, acquire, release) do not necessarily need to be implemented by the object itself, but may be convenience functions designed to ease the integration into the class registry. constructor and copy may have any arguments, but destructor, acquire, and release must have no arguments or all the arguments must have default values.

castToBases and castFromBases must either be zero length or have the same number of entries as there are base classes. This is a list of function pointers. Each function in castToBases takes an object instance as an argument and returns the corresponding pointer for the instance when cast to that base class. Each function in castFromBases takes an object instance and a boolean (specifying whether the cast is to be a type safe cast) as arguments and returns the corresponding pointer for the instance when cast from that base class to this class. If any of the entries are 0 then it is assumed that the object, when cast to/from the base class, retains the same pointer. This list is used by CastToDirectBase and CastFromDirectBase. It is needed specifically when C++ multiple inheritance classes are used. If VcrCodedClass is subclassed by an object system which does not need to do these casts, an empty list can be passed into the constructor.

AddMethod

```
void AddMethod(VFunctionData *method)
``` method   The method to add to the class description.

AddMethod adds a method to the class description. methods can be added for normal methods while other VFunctionData objects can be added to support the concept of static methods of a class. Methods may be added after the class has been installed or referenced in the class registry.

RemoveMethod

```
void RemoveMethod(VFunctionData *method)
``` method   The method to remove from the class description.

RemoveMethod removes a method from the class description. Methods should never be removed from the class description after it is directly or indirectly installed in the class registry. Note that attempting to remove a method which is installed in a superclass of this class description will not produce the desired effect. The method must be removed from the class in which it was defined. The effect of removing a method from a subclass can be produced by adding the same method description to a subclass' class description but with the usage flag kVUsageHidden.

AddProperty

```
void AddProperty(VPropData *prop)
``` prop   The property to add to the class description.

AddProperty adds a property to the class description. Properties may be added after the class has been installed or referenced in the class registry.

RemoveProperty

```
void RemoveProperty(VPropData *prop)
``` prop    The property to remove from the class description.

RemoveProperty removes a property from the class description. Properties should never be removed from the class description after it is directly or indirectly installed in the class registry. Note that attempting to remove a property which is installed in a superclass of this class description will not produce the desired effect. The property must be removed from the class in which it was defined. The effect of removing a property from a subclass can be produced by adding the same property description to the subclass' class description but with the usage flag kVUsageHidden.

AddType

```
void AddType(VTypeData *type)
``` type    The type to add to the class description.

AddType adds a type to the class description. Types may be added after the class has been installed or referenced in the class registry. Note that in a language this type will only be applicable in the context of an object of this particular class. To define a type for general usage add it to a name space instead.

RemoveType

```
void RemoveType(VTypeData *type)
``` type    The type to remove from the class description.

RemoveType removes a type from the class description. Types should never be removed from the class description after it is directly or indirectly installed in the class registry.

AddInstance

```
void AddInstance(VInstanceData *inst)
``` inst    The instance to add to the class description.

AddInstance adds a named instance to the class description. Note that this will typically only be used for named constants. Instances may be added after the class has been installed or referenced in the class registry. Note that in a language this instance will only be applicable in the context of an object of this particular class. To define an instance for general usage add it to a name space instead.

RemoveInstance

```
void RemoveInstance(VInstanceData *inst)
``` inst    The instance to remove from the class description.

RemoveInstance removes a named instance from the class description. Instances should never be removed from the class description after it is directly or indirectly installed in the class registry.

AddException

```
void AddException(VExceptionData *except)
``` except    The exception to add to the class description.

AddException adds an exception to the class description. Exceptions may be added after the class has been installed or referenced in the class registry. Note that in a language this exception will only be applicable in the context of an object of this particular class. To define an exception for general usage add it to a name space instead.

RemoveException

```
void RemoveException(VExceptionData *except)
``` except    The exception to remove from the class description.

RemoveException removes an exception from the class description. Exceptions should never be removed from the class description after it is directly or indirectly installed in the class registry.

PutBaseClass

```
void PutBaseClass(VClassData *base)
``` base    The base class of this class.

PutBaseClass sets the base class for the described class. If the class is multiply inherited PutBaseClasses should be used instead. This method can be used by subclasses to store a dynamically generated base class.

PutBaseClasses

```
void PutBaseClass(VTClassList bases)
``` bases    The base classes of this class.

PutBaseClasses sets the list of base classes for the described class. This method can be used by subclasses to store a dynamically generated base classes.

PutConstructor

```
void PutConstructor(VFunctionData *constructor)
``` constructor    The constructor for the class.

PutConstructor sets the constructor for the described class. This constructor is not identical to the C++ constructor for an object. The class registry defined constructor is responsible for allocating the object and it must return the new object. The class registry description for the constructor will have a generic object return type (type code kVTypeObjectPointer). The VFunctionData stored using this method does not have a hidden first argument for the object instance. Thus, this VFunctionData should not be considered to be a method.

PutDuplicator

```
void PutDuplicator(VFunctionData *duplicator)
``` duplicator   The copy constructor for the class.

PutDuplicator sets the copy constructor for the described class. This constructor is not identical to the C++ copy constructor for an object. The class registry defined copy constructor is responsible for allocating the object and it must return the new duplicate object. The class registry description for the copy constructor will have a generic object return type (type code kVTypeObjectPointer). The VFunctionData stored using this method has a hidden first argument for the object instance which is being copied. Thus, this VFunctionData can be considered to be a method.

PutDestructor

```
void PutDestructor(VFunctionData *destructor)
``` destructor   The constructor for the class.

PutDestructor set the destructor for the described class. This method must have no arguments or have default values for all arguments. This destructor method is not identical to the C++ destructor in that this one is responsible for performing the actual free of the memory allocated for the object instance. destructor must be a method.

PutAcquireMethod

```
void PutAcquireMethod(VFunctionData *acquire)
``` acquire   The acquire method for the class.

PutAcquireMethod sets the method used to add a reference to an instance of the class. This method must have no arguments or all arguments must have default values. acquire must be a method. If an object system does not inherently support reference counting the class registry can provide support for instance based reference counting using utility classes.

PutReleaseMethod

```
void PutReleaseMethod(VFunctionData *release)
``` release   The release method for the class.

PutReleaseMethod sets the method used to remove a reference to an instance of the class. This method must have no arguments or all arguments must have default values. release must be a method. If an object system does not inherently support reference counting the class registry can provide support for instance based reference counting using utility classes.

MyMethods

```
VTFunctionList MyMethods()
```

MyMethods returns the list of methods defined in this described class. This only returns the list of methods which have been added using AddMethod. It does not return any methods of the super classes of this described class. This will typically be used to help a subclass of VcrCodedClass determine which method descriptions have already been dynamically generated for this class description.

MyProperties

```
VTPropList MyProperties()
```

MyProperties returns the list of properties defined in this described class. This only returns the list of properties which have been added using AddProperty. It does not return any properties of the super classes of this described class. This will typically be used to help a subclass of VcrCodedClass determine which property descriptions have already been dynamically generated for this class description.

MyTypes

VTTypeList MyTypes()

MyTypes returns the list of types defined in this described class. This only returns the list of types which have been added using AddType. It does not return any types of the super classes of this described class. This will typically be used to help a subclass of VcrCodedClass determine which type descriptions have already been dynamically generated for this class description.

MyInstances

VTInstanceList MyInstances()

MyInstances returns the list of instances defined in this described class. This only returns the list of instances which have been added using AddInstance. It does not return any instances of the super classes of this described class. This will typically be used to help a subclass of VcrCodedClass determine which instance descriptions have already been dynamically generated for this class description.

MyExceptions

VTExceptionList MyExceptions()

MyExceptions returns the list of exceptions defined in this described class. This only returns the list of exceptions which have been added using AddException. It does not return any exceptions of the super classes of this described class. This will typically be used to help a subclass of VcrCodedClass determine which exception descriptions have already been dynamically generated for this class description.

Class VcrSimpleAdapter

Public subclass of VAdapterNameSpace

VcrSimpleAdapter is an implementation of VAdapterNameSpace which can be used as the base implementation for object system adapters. It provides support all methods of VAdapterNameSpace. Object systems may subclass this and provide dynamic lookup in the different methods but use the caching support provided by VcrSimpleAdapter. Either VAdapterNameSpace or VcrSimpleAdapter can be subclassed when creating name spaces for different object systems.

This provides a simple adapter structure which can be used directly through its Install, Remove methods or which can be subclassed by an object system adapter to provide additional functionality.

Overridable Public Members

| | |
|---|---|
| Install | Installs an item in the adapter. |
| Remove | Removes an item from the adapter. |

Overridable Protected Members

SubSpaces                    Returns the list of sub spaces within this one.

Install

```
void Install(VcrToplevel *item)
``` item         Item to install in the name space.

Install installs a particular item into this code name space. Install only applies to classes, functions, types, instances, and exceptions. Once an object has been created it can be installed in the code adapter so that it may be visible to the different views.

Remove

```
void Remove(VcrToplevel *item)
``` item         Item to remove from the name space.

Remove removes a particular item from the name space. If item is mapped into any views it will be unmapped from them all. Remove applies to code name spaces, classes, functions, types, instances, and exceptions.

SubSpaces

```
VTAdapterList SubSpaces(VTSearchType stype)
``` stype        Type of search to perform.

SubSpaces retrieves the list of adapter name spaces which are contained within this name space. This method is called by base class implementations of other methods to aid in performing recursive searches (i.e. searches with a depth other than 1). Subclasses can reimplement this method to provide support for dynamic lookup of nested name spaces.

Class VcrCodeAdapter

Public subclass of VcrSimpleAdapter

VcrCodeAdapter is an implementation of VcrSimpleAdapter which stores items created directly in C++ code in cache tables inside itself. This provides a simple adapter structure which can be used directly through its Install, Remove, and CreateSubSpace methods. On top of the functionality provided by VcrSimpleAdapter this class provides support for end user creation of nested name spaces. Object system adapters should subclass VcrSimpleAdapter instead since users of the adapter are not typically allowed to created nested name spaces in the adapter (without support from the exposure mixin).

Public Members

CreateSubSpace              Creates a nested name space inside this one.

CreateSubSpace

```
VTAdapterRef CreateSubSpace(VAtomRef name)
``` name        Name of new name space to create.

CreateSubSpace creates a new adapter name space and installs it in the current name space. If a name space of the specified name already exists it should be returned instead.

- 110 -

Class VcrSimpleView
Public subclass of VViewNameSpace

VcrSimpleView is an implementation of VViewNameSpace which provides the base level of functionality needed to cache items from the adapters. It provides a simple policy for mapping adapter name spaces into itself. Each adapter shares the top level name space. As top level name spaces inside adapters are found, they are mapped onto the top level name space. Inside these mapped name spaces, the hierarchies directly represent the hierarchy defined in the adapters themselves. There is no built in support for persistence. This class may be subclassed to provide support for persistence and to provide a different mapping policy. The mapping policy can be changed by overriding AdapterAdded and MapAdapter. Persistence support can be provided by overriding Removed and AdapterRemoved.

Protected Members

| | |
|---|---|
| Install | Installs an item in the view. |
| Remove | Removes an item from the view. |
| CanMap | Returns whether the adapter item can be mapped. |

Overridable Protected Members

| | |
|---|---|
| CreateSubSpace | Creates a nested name space inside this one. |
| SubSpaces | Returns the list of sub spaces within this one. |

Install

```
void Install(VcrToplevel *item)
``` item      Item to install in the name space.

Install installs a particular item into this view name space. Install applies to classes, functions, types, instances, exceptions, adapters, and views. Once an object has been retrieved from an adapter it can be installed in the view so that it may be visible to users of the class registry. Install installs the item directly in this view. This method performs all necessary reference counting operations.

Remove

```
void Remove(VcrToplevel *item)
``` item      Item to remove from the name space.

Remove removes a particular item from the name space. Remove applies to views, adapters, classes, functions, types, instances, and exceptions. This method performs all necessary reference counting operations.

CanMap

```
bool_t CanMap(VcrToplevel *item)
``` item      Item to check.

CanMap returns whether item can be mapped into this view. If the return of this method is FALSE then no other view method should return the item. This is called internally to check whether an item can be returned from the view methods. The default implementation returns the results of calling item->InView(this). This method can be reimplemented in subclasses to provide support for mapping items into multiple locations in the view.

- 111 -

CreateSubSpace

```
VTViewRef CreateSubSpace(VAtomRef name)
``` name      Name of new name space to create.

CreateSubSpace creates a new view name space and installs it in the current name space. If a name space of the specified name already exists it should be returned instead. This method should be overridden in subclasses so that the correct class of nested name space can be constructed.

SubSpaces

```
VTViewList SubSpaces(VTSearchType stype)
``` stype      Type of search to perform.

SubSpaces retrieves the list of view name spaces which are contained within this name space. This method can be overridden in subclasses to provide support for retrieving persistently stored view information.

---

Class VcrFlatView

Public subclass of VcrSimpleView

VcrFlatView is an implementation of VViewNameSpace which provides a flat name space model. As each adapter name space is found, it is mapped onto the top level name space of the view. All items can be found directly in the top level name space of the view. This class can be used by languages such as Basic which have no way of dealing with the concept of multiple name spaces. This class should not be subclassed. To provide different implementations of flat name spaces, VcrSimpleView should instead be subclassed instead.

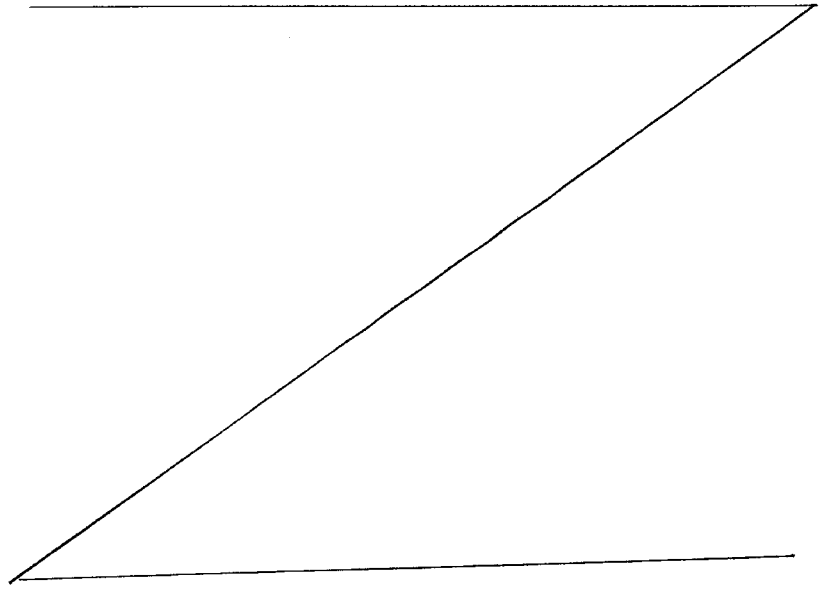

- 112 -

Type Management Classes

Defining Complex Types

If the set of possible types was limited to the fundamental types the class registry would only be useful to describe a small subset of all defined classes. However, the set of possible types is not static. New types can be constructed to describe any complex data type.

Fundamental types and complex types such as structures, unions, and enums can be described using the subclasses of VTypeData. Definitions of types can be nested to create arbitrarily complex data types. The type management system is not intended to map every possible C++ type to a type description. It is intended to be able to describe any standard object system type. The set of types which the type management system can describe includes all types which can be described within CORBA IDL and CORBA TypeCodes. The set of describable types does not include objects. Object descriptions are given by the other class registry VClassData instances.

Types are described by assembling a hierarchy of type description objects. Once a type has been built it can be used in the class registry directly. The type classes provide facilities for casting an instance of one type to that of another type. Types which are similar in structure can be cast to each other. Unlike C and C++, the class registry type system will cast structures which have similar field descriptions to each other even if the data types of the fields differ. This functionality is used to provide object system bridging capabilities.

The class registry function and method calling support code (VcrCall and VcrCompleteCall) employ the type management system to cast arguments and return values to the appropriate types. While the function calling support code does type checking to make sure that type arguments and return types can be cast correctly, it is the responsibility of the user to do strict type checking before calling before calling these functions.

Each type object can have associated with it a type code. These type codes uniquely describe a type inside a running instance of the class registry. The type codes can be used for fast type comparison. The type manager is responsible for managing the type codes. The type manager generates a unique type code for a type if an identical type description is not already in its database. If an identical type already exists, both types will be given the same type code. Thus any instances which have the same type code are identical. This does *not* mean that two instances with different type codes are not the same in layout and structure. Different complex types may have the same layout of fields and subtypes but, if the names of the fields differ, the two types will be given different type codes.

Except for the predefined types, type codes are not persistent. Every different process space will have a different type code for the described types. However, this is not usually a problem since type codes are only used in type comparisons. There is a set of available persistent type codes. These are allocated on an as needed basis by Visual Edge. Persistent type codes will only be assigned to fundamental type descriptions. The type manager is responsible for tracking all persistent types codes. A persistent type can always be looked up in the type manager to find its description object.

Since types are described by objects, these object may have mixins. Mixins on types can be used to provide additional information about a type to a development environment. For instance, a type named "color" may be identical to unsigned long except that it has mixin support for bringing up a specialized color editor.

Predefined Types

The set of predefined types covers the entire range of C++ fundamental types as well as a number of simple composite types such as string and generic object pointer.

Fundamental Types

The set of fundamental types and other predefined types have descriptions stored in the type manager. These type descriptions can be found by querying the type manager given the type code. The currently defined set of type codes is as follows:

| | | |
|---|---|---|
| kVTypeVoid | kVTypeByte | |
| kVTypeSignedChar | kVTypeUnsignedChar | kVTypeChar |
| kVTypeSignedShort | kVTypeUnsignedShort | kVTypeShort |
| kVTypeSignedInt | kVTypeUnsignedInt | kVTypeInt |
| kVTypeSignedLong | kVTypeUnsignedLong | kVTypeLong |
| kVTypeFloat | kVTypeDouble | kVTypeLongDouble |

Other Predefined Types

| | |
|---|---|
| kVTypeVoidPointer | Generic pointer. |
| kVTypeObjectPointer | Generic object pointer. |
| kVTypeFunctionPointer | Generic function pointer. |

The following types differ from other described complex types in that their type codes are persistent across multiple sessions.

| | |
|---|---|
| kVTypeSignedString | Signed string. |
| kVTypeUnsignedString | Unsigned string. |
| kVTypeString | String of default sign for native platform. |
| kVTypeBString | Basic language string. |
| kVTypeVariant | OLE 2.0 VARIANT. |

Class VTypeData

Public subclass of VcrToplevel

VTypeData is the base class for all type description classes. It provides virtual methods for type comparison, casting, creation, and destruction.

Protected Members

| | |
|---|---|
| PutTypeManager | Sets the type manager which owns this instance. |
| PutBaseType | Sets the type that this one is based on. |
| GetActualInstance | Get the real type and pointer to an instance of a type. |

Public Members

| | |
|---|---|
| BaseType | Returns the base type of this type. |
| TypeManager | Returns the type manager associated with this object. |
| ItsClass | Returns the subclass of VTypeData which this is. |
| PutObjectSystem | Sets the object system which constructed this type description. |

Overridable Public Members

| | |
|---|---|
| `ConcreteType` | Returns the physical implementation of this type. |
| `TypeCode` | Returns the type code of this type. |
| `Identical` | Determines whether the specified type is identical to this type. |
| `SameLayoutAs` | Determine whether the specified type has the same layout as this type (although it may have a different name). |
| `CanAlwaysCast` | Determine whether the specified type can always be cast to this type. |
| `CanSometimesCast` | Determine whether the specified type may sometimes be cast to this type. |
| `Alignment` | Returns the alignment required by this type. |
| `SizeOf` | Returns the size of an instance of the type. |
| `Construct` | Constructs a new instance of this type which is a correctly cast copy of the specified type. |
| `Cast` | Cast an instance of the specified type to this type. |
| `Empty` | Empty an instance of this type. |
| `Discard` | Discard an instance of this type. |

Protected Data Members

| | | |
|---|---|---|
| `VTObjectSystem` | `itsObjectSystem` | The object system which constructed this type description. |

Type Definitions

| | |
|---|---|
| `VTTypeRefList` | VrRefList of VTypeData objects. |
| `VTTypeRef` | VrReference to a VTypeData object. |

PutBaseType

```
void PutBaseType(VTypeData *base)
``` base        Type that this is based on.

`PutBaseType` sets the type on which this derived type is based. For instance, if this type is a pointer to unsigned short, `BaseType` should return a type object for `kVTypeUnsignedShort`. If this type is not directly derived from another type then it should return `NULL`. For instance this would be the case for a structure definition. An instance of `VcrAny` should return the type that it actually is when placed in memory (i.e. both a CORBA any and an OLE 2.0 `VARIANT` would be instances of structures with particular field layout. This method can be called by subclasses to store the base type if it is not known on creation.

PutTypeManager

```
void PutTypeManager(VTypeManager *manager)
``` manager     Type manager that owns this type.

`PutTypeManager` sets returns the `VTypeManager` instance which manages this type description. This is used by subclasses to store the type manager in the base class if it is not known after creation.

GetActualInstance

```
void GetActualInstance(   const VcrDataRef   &instance,
```

- 115 -

```
                    VcrDataRef        &final)
```

```
instance    Instance to convert.
final       (Return) Instance after conversion.
```

GetActualInstance takes an instance of a type an resolves it as much as possible. That is, this will resolve VcrAlias and VcrAny types to find the final result. If the instance is a VcrAny then the TypeOf and Value members of VcrAny will be stored in final. Instances of VcrAlias will just have the type resolved using BaseType of the alias. This method performs these operations until all aliases and any's have been resolved. This method is used by subclasses to help perform casting.

BaseType

```
VTypeData *BaseType()
```

BaseType returns the type on which this derived type is based. For instance, if this type is a pointer to unsigned short, BaseType should return a type object for kVTypeUnsignedShort. If this type is not directly derived from another type then it should return NULL. For instance this would be the case for a structure definition.

TypeManager

```
VTypeManager *TypeManager()
```

TypeManager returns the VTypeManager instance which manages this type description.

ItsClass

```
VClass *ItsClass()
```

ItsClass returns the type of this instance. This is used to perform run time type identification of VTypeData subclasses. The methods of VClass can be used to identify which of the subclasses of VTypeData this is. ItsClass is called in type conversion routines to gather information about the type being converted.

PutObjectSystem

```
void PutObjectSystem(VTObjectSystem system)
```

```
system      Object system which owns the type.
```

PutObjectSystem sets the object system which owns this type. This method should only be called by object systems right after creation of the type.

ConcreteType

```
VTypeData *ConcreteType()
```

ConcreteType returns the type which is the physical layout of this type. For instance, a type which is a CORBA sequence has a concrete type which is a structure containing three elements. All types which are themselves concrete should return NULL from this method. The default implementation returns NULL.

TypeCode

```
VTTypeCode TypeCode()
```

TypeCode returns the type code for this type. The type code can be used to compare two different types to determine their equality. The type manager is used to determine the compatibility of types. On the initial call to TypeCode, the type manager is called to find a VTTypeCode for this type. After the initial call the result is stored in the type.

Identical

```
bool_t Identical(VTypeData *type)
``` type       Type to compare to.

Identical determines whether the specified type is identical to the current type. This should be return true if the type is an exact duplicate: all subtypes, sub fields, and names must match. Help information should not be compared. The type manager calls this method to determine if two types can be given the same type code. The base class implementation checks that the two types are of the same subclass of VTypeData. A derived type should make sure that circularities in type definitions do not cause the system to hang when comparing two types.

SameLayoutAs

```
bool_t SameLayoutAs(VTypeData *type) = 0
``` type       Type to compare to.

SameLayoutAs determines whether the specified type is identical in layout to the current type. This should return true if all subtypes, sub fields, and offsets match. Names and help information should not be compared. This method is called to determine casting possibilities.

CanAlwaysCast

```
bool_t CanAlwaysCast(VTypeData *type) = 0
``` type       Type to compare to.

CanAlwaysCast determines whether type can be cast to this type in all situations without loss of information. For instance a short can always be cast to a long, but only certain instances of long can be cast to short. This would return true only for short to long.

CanSometimesCast

```
bool_t CanSometimesCast(VTypeData *type) = 0
``` type       Type to compare to.

CanSometimesCast determines whether type can be cast to this type in some or all situations without loss of information. For instance a short can always be cast to a long, but only certain instances of long can be cast to short. This would return true for casting either short to long or long to short.

Alignment

```
long Alignment() = 0
```

Alignment returns the alignment required for instances of this type. The alignment specified in number of bytes. For example an eight byte double might be able to be aligned on four byte boundaries in which case this method would return four. The lowest possible value is one.

SizeOf

```
long SizeOf(void *instance) = 0
``` instance     Pointer to instance to use for determining size.

SizeOf returns the size of a particular instance of the type in bytes. If the instance pointer is NULL then SizeOf should return the size of all instances of the type if the size is fixed. If the size of instances is variable SizeOf should return 0 or negative.

Construct

```
long Construct(    const VcrDataRef    &original,
                   void                **instance) = 0
``` original     Type of and pointer to original object to copy from.
instance     (Return) new instance of this type.

Construct builds a new instance of this type by casting the input object to this type. Construct should allocate a buffer for the new returned object. The return value should be the size of the new instance. If the original instance could not be cast to this type or memory could not be allocated Construct should return 0.

Cast

```
long Cast(    const VcrDataRef    &original,
              void                *instance) = 0
``` original     Type of and pointer to original object to copy from.
instance     Pointer to where to store the instance.

Cast builds a new instance of this type by casting the input object to this type. Cast should not allocate a buffer for the new type instance but should instead use the supplied buffer which is guaranteed to be large enough to fit the type. The return value should be the size of the new instance. If the original instance could not be cast to this type or memory could not be allocated Cast should return 0. The instance buffer passed into this routine may contain garbage and as such should be fully overwritten.

Empty

```
void Empty(void *instance) = 0
``` instance     Instance of type to be emptied.

Empty empties out the contents of an instance of the type. This should free all memory allocated within the instance but it should not free the instance itself.

Discard

```
void Discard(void *instance) = 0
``` instance     Instance of type to be emptied.

Discard empties out the contents of an instance of this type. This should free all memory allocated within the instance and should free the memory used to store the instance itself.

Class VcrFundamental

Public subclass of VTypeData

VcrFundamental defines a fundamental type. This class is subclassed internally to provide the implementations of all the fundamental types. Users should not normally need to subclass this class unless they are providing another fundamental type.

Public Members

| | |
|---|---|
| VcrFundamental | Constructs a VcrFundamental object. |

VcrFundamental Constructor

```
VcrFundamental(   VTypeManager  *manager,
                  VAtomRef      name,
                  VTTypeCode    type)
```

| | |
|---|---|
| manager | Type manager which is used by this object. |
| name | Name of this pointer type. |
| type | The type code of this fundamental type. |

Constructs a VcrFundamental object which represents a fundamental type such as signed int, etc.

Class VcrAlias

Public subclass of VTypeData

VcrAlias defines an alias of another type. Instances of this class will typically only be created to add additional mixins to special version of fundamental types for use the class registry. For instance, unsigned long could have an alias named "color" which is identical to unsigned long except that it has mixin support for bringing up a specialized color editor.

Public Members

| | |
|---|---|
| VcrAlias | Constructs a VcrAlias object. |

VcrAlias Constructor

```
VcrAlias(   VAtomRef    name,
            VTypeData   *realType)
```

| | |
|---|---|
| name | Name of this alias. |
| realType | Type that this will represent. |

Constructs a VcrAlias object which represents an alias of another type. The implementation of all methods just calls the methods of the realType object. The only methods which are not mapped directly onto realType are the methods for mixin support.

Class VcrPointer

Public subclass of VTypeData

VcrPointer defines a pointer to another type.

Public Members

VcrPointer                    Constructs a VcrPointer object.

VcrPointer Constructor

```
VcrPointer(   VAtomRef     name,
              VTypeData    *baseType)
``` name         Name of this pointer type.
    baseType     Type that this will be a pointer to.

Constructs a VcrPointer object which represents a pointer to another type. This should not be used for pointers to objects; instead use VcrObjectRef. Pointers to functions should be implemented with VcrFunctionPtr.

Class VcrObjectRef

Public subclass of VTypeData

VcrObjectRef defines a reference (pointer) to an instance of a particular object type.

Public Members

VcrObjectRef          Constructs a VcrObjectRef object.
    Class                Returns the class of object to which an instance of
                              this type will refer.

VcrObjectRef Constructor

```
VcrObjectRef(VTypeManager  *manager,
             VAtomRef      name,
             VClassData    *refClass)
``` manager      Type manager which is used by this object.
    name         Name of this reference type.
    refClass     Class of referenced object.

Constructs a VcrObjectRef object which represents a reference (pointer) to an instance of the specified class.

Class

```
VClassData *Class()
```

Class returns the class of object to which an instance of this type will refer.

Class VcrFunctionPtr

Public subclass of VTypeData

VcrFunctionPtr defines a pointer to a function with a specified signature.

Public Members

VcrFunctionPtr         Constructs a VcrFunctionPtr object.
    Function             Returns the function signature description.

VcrFunctionPtr Constructor

```
VcrFunctionPtr(    VTypeManager      *manager,
```

```
                    VAtomRef       name,
                    VFunctionData  *funcSig)
``` manager  Type manager which is used by this object.
name     Name of this function pointer type.
funcSig  Signature description of the function this will point to.

Constructs a VcrFunctionPtr object which represents a pointer to a function with the specified signature. The ownership of the VFunctionData is turned over to this object. This VFunctionData must not be used elsewhere.

Function

```
VFunctionData *Function()
```

Function returns the description of the function to which an instance of this type will point.

Class VcrStructItem

VcrStructItem defines a field in a structure or union. It includes the field name, type, and offset into the structure. An instance of this class cannot be assigned a type code.

Public Members

| | |
|---|---|
| VcrStructItem | Constructs a VcrStructItem object. |
| Name | Returns the name of this field. |
| Type | Returns the type of this field. |
| Offset | Returns the offset into the structure of this field. |

VcrStructItem Constructor

```
VcrStructItem(  VAtomRef    name,
                VTypeData   *theType,
                long        offset)
``` name     Name of this structure field.
theType  Type of this structure field.
offset   Offset of this field within the structure.

Constructs a VcrStructItem object which represents a field within a structure.

Name

```
VAtomRef Name()
```

Name returns the name of this structure or union field.

Type

```
VTypeData *Type()
```

Type returns the type of this structure or union field.

Offset

```
long Offset()
```

Offset returns the offset of this field within the structure.

Class VcrStruct

Public subclass of VTypeData

VcrStruct defines a structure definition. The structure contains a fixed number of fields at fixed offsets from the beginning of the structure.

Public Members

| | |
|---|---|
| VcrStruct | Constructs a VcrStruct object. |
| AddItem | Adds a field to the structure. |
| GetItemByName | Returns the field description of the specified field. |
| GetItemByIndex | Returns the field description of the specified field. |
| GetItemCount | Returns the number of fields in the structure. |

VcrStruct Constructor

```
VcrStruct(   VTypeManager     *manager,
             VAtomRef         name,
             VcrStructItem    *item1 = 0,
             VcrStructItem    *item2 = 0,
             ...
             VcrStructItem    *item6 = 0)
```

| | |
|---|---|
| manager | Type manager which is used by this object. |
| name | Name of this structure. |
| item1-item6 | Optional items to add to structure. |

Constructs a VcrStruct object which represents a structure. After creation, fields can be added to the structure to define its layout. If any of item1 through item6 are specified then these are added to the structure definition as if AddItem were called for each of these in sequence.

AddItem

```
void AddItem(VcrStructItem *item)
```

| | |
|---|---|
| item | Field to add to structure. |

Add a new field to the structure. The order in which fields are added is important since it used to determine type compatibility and castability.

GetItemByName

```
VcrStructItem *GetItemByName(VAtomRef name)
```

| | |
|---|---|
| name | Name of field to retrieve. |

Retrieve a field from the structure given its name.

GetItemByIndex

```
VcrStructItem *GetItemByIndex(long index)
```

| | |
|---|---|
| index | Index of field to retrieve. |

Retrieve a field from the structure given its index in the structure. The index is defined by the order in which fields were added to the structure starting from zero.

GetItemCount
> `long GetItemCount()`
> Returns the number of fields in this structure.

Class VcrEnumItem

`VcrEnumItem` defines an enumeration constant which will be one of the possible values of an enumeration type. An instance of this class cannot be assigned a type code.

Public Members

| | |
|---|---|
| `VcrEnumItem` | Constructs a `VcrEnumItem` object. |
| `Name` | Returns the name of the enumeration constant. |
| `Value` | Returns the value of the enumeration constant. |

VcrEnumItem Constructor

```
VcrEnumItem( VAtomRef      name,
             VValue        value)
```

| | |
|---|---|
| `name` | Name of this enumeration constant. |
| `value` | Value of this enumeration constant. |

Constructs a VcrEnumItem object which represents a enumeration constant within an enum (a set of enumeration constants).

Name

> `VAtomRef Name()`
> `Name` returns the name of the enumeration constant.

Value

> `VValue Value()`
> `Value` returns the value of the enumeration constant.

Class VcrEnum

Public subclass of VTypeData

`VcrEnum` defines an enumeration type. An enumeration type contains a number of enumeration constants each of which has an associated name and value.

Public Members

| | |
|---|---|
| `VcrEnum` | Constructs a `VcrEnum` object. |
| `AddItem` | Adds an enum constant to the enum. |
| `GetItemByName` | Returns the description of the specified enumeration constant |
| `GetItemByIndex` | Returns the description of the specified enumeration constant |
| `GetItemCount` | Returns the number of enumeration constants in this enum. |

- 123 -

VcrEnum Constructor

```
VcrEnum(    VAtomRef      name,
            VTypeData     *enumType,
            VcrEnumItem   *item1 = 0,
            VcrEnumItem   *item2 = 0,
            ...
            VcrEnumItem   *item6 = 0)
``` manager  Type manager which is used by this object.
name  Name of this enumeration.
enumType  Type in which the enumeration will be stored.
item1-item6  Optional items to add to enumeration.

Constructs a VcrEnum object which represents a enumeration. After creation, constants can be added to the enumeration to define its possible values. The type of the enumeration must be an integral fundamental type. If any of item1 through item6 are specified then these are added to the enumeration definition as if AddItem were called for each of these in sequence.

AddItem

```
void AddItem(VcrEnumItem *item)
``` item  Constant to add to enumeration.

Add a new constant to the enumeration. The order in which constants are added is important since it used to determine type compatibility and castability.

GetItemByName

```
VcrEnumItem *GetItemByName(VAtomRef name)
``` name  Name of constant to retrieve.

Retrieve a enumeration constant from the enumeration given its name.

GetItemByIndex

```
VcrEnumItem *GetItemByIndex(long index)
``` index  Index of constant to retrieve.

Retrieve a constant from the enumeration given its index in the enumeration. The index is defined by the order in which constants were added to the enumeration starting from zero.

GetItemCount

```
long GetItemCount()
```

Returns the number of constants in this enumeration.

Class VcrSequence
Public subclass of VTypeData

VcrSequence is an abstract class. It defines a variable length array whose length may be determined on an instance by instance basis. For example, strings would be implemented as VcrSequences. VcrStructSequence is also implemented on top of VcrSequence. Fixed length arrays are also described as subclasses of VcrSequence using VcrArray.

Public Members

| | |
|---|---|
| VcrSequence | Constructs a VcrSequence object. |
| GetLowerBound | Returns the lower bound of the sequence. |

Protected Members

| | |
|---|---|
| PutConcreteType | Sets the concrete type after creation. |

Overridable Public Members

| | |
|---|---|
| GetLength | Returns the length of an instance of the sequence. |
| GetMaxLength | Returns the maximum length of the sequence. |
| GetElement | Returns the specified element of the sequence. |
| IsLinear | Returns whether the sequence data is linear. |

VcrSequence Constructor

```
VcrSequence( VAtomRef    name,
             VTypeData   *concreteType,
             VTypeData   *baseType,
             long        lbound)
```

| | |
|---|---|
| name | Name of this sequence type. |
| concreteType | Type that this sequence is built from. |
| baseType | Type that this will be a sequence of. |
| lbound | Lower bound of the sequence indices. |

Constructs a VcrSequence object which represents a pointer to a variable length array of other instances of another type.

GetLowerBound

```
long GetLowerBound( )
```

Returns the lower bound of the allowed sequence indices.

PutConcreteType

```
void PutConcreteType(VTypeData *concreteType)
``` concreteType   Type that the sequence actually is.

PutConcreteType sets the actual type of the sequence after creation. This type is the actual type which would be stored inside structures, etc. For instance, CORBA sequences have a concrete type being a structure containing three elements.

GetLength

```
long GetLength(void *instance) = 0
``` instance   Instance of this sequence type.

GetLength returns the length of a particular instance of this sequence type. This must be implemented in subclasses of VcrSequence.

GetMaxLength

```
long GetMaxLength(void *instance) = 0
``` instance    Instance of this sequence type.

GetMaxLength returns the maximum length for a particular instance of this sequence type. This returns the maximum allocated length of the data storage for the sequence array. This must be implemented in subclasses of VcrSequence.

GetElement

```
void *GetElement(long index) = 0
``` index    Index of element to retrieve.

Returns a pointer to the specified element of the sequence. If index is outside the valid bounds of the sequence this will return NULL.

IsLinear

```
bool_t IsLinear() = 0
```

Returns whether the sequence is a linear sequence of the specified type. If the return is TRUE then the second element of the sequence will directly follow the first in memory. If IsLinear return FALSE then the sequence may be sparse and can only be accessed through GetElement.

Class VcrArray

Public subclass of VcrSequence

VcrArray describes a fixed length array. A fixed length array must have fixed upper and lower bounds. The lower bound is not restricted to zero.

Public Members

| | |
|---|---|
| VcrArray | Constructs a VcrArray object. |

VcrArray Constructor

```
VcrArray(  VAtomRef    name,
           VTypeData   *elemType,
           long        lbound,
           long        len )
```

| | |
|---|---|
| name | Name of this array type. |
| elemType | Type of the elements in the array. |
| lbound | Lower bound of the array indices. |
| len | Length of the array. |

Constructs a VcrArray object which represents an array. The array is fixed length with a lower bound which is not required to be zero.

Class VcrStructSequence

Public subclass of VcrSequence

VcrStructSequence represents a sequence which is defined as a structure containing members which include a length, a maximum length, and a pointer to the array of elements.

Public Members

VcrStructSequence          Constructs a VcrStructSequence object.

VcrStructSequence Constructor

```
VcrStructSequence( VAtomRef        name,
                   VcrStruct       *concreteType,
                   VcrStructItem   *length,
                   VcrStructItem   *maxLen,
                   VcrStructItem   *array,
                   long            lbound)
```

| | |
|---|---|
| name | Name of this array type. |
| concreteType | Type of the physical layout of the sequence itself. |
| length | Structure field which represents the length of the sequence. |
| maxLen | Field which represents the maximum length of the sequence. |
| array | Structure field which represents a pointer to the sequence data. |
| lbound | Lower bound of the sequence indices. |

Constructs a VcrStructSequence object which represents a sequence described as a structure containing elements for the length, maximum length, and pointer to the data. The base type of this sequence is the base type of array->Type(). array->Type() must be a VcrPointer or VcrReference.

Class VcrString

Public subclass of VcrSequence

VcrString is an abstract class which describes a variable length string of characters. Each subclass can store its data in any suitable format. For instance, the C string subclass stores the string as a NULL terminated linear array of characters. A Basic string would be stored as a length followed by a linear array of characters.

Public Members

VcrString          Constructs a VcrString object.

VcrString Constructor

```
VcrString( VAtomRef    name,
           VTypeData   *concreteType,
           VTypeData   *baseType,
           long        lbound)
```

| | |
|---|---|
| name | Name of this string type. |
| concreteType | Type that this string is built from. |
| baseType | Type that this will be a string of. This must be either signed or unsigned character. |
| lbound | Lower bound of the string indices. |

Constructs a VcrString object used to represent a string. This class is an abstract base class upon which different implementations of strings can be built.

Class VcrAny

Public subclass of VTypeData

VcrAny is an abstract class which defines a data type which can contain a value of one of several types. This type is used to define types such as OLE 2.0 VARIANT and CORBA any. VcrAny types can be transparently converted between each other provided that the type of the value being converted is contained in both types. VcrAny differs from a union in that an instance is not restricted to containing a value from a fixed, predefined, set of different types.

Public Members

| | |
|---|---|
| VcrAny | Constructs a VcrAny object. |

Protected Members

| | |
|---|---|
| PutConcreteType | Sets the concrete type after creation. |

Overridable Public Members

| | |
|---|---|
| Types | Returns list of supported types |
| TypeOf | Returns the type of the specified instance. |
| Value | Returns the actual value from the specified instance. |

VcrAny Constructor

```
VcrAny(    VAtomRef    name,
           VTypeData   *concreteType)
``` name         Name of this type.
concreteType  Concrete type of this any. Used to support passing and returning from functions.

Constructs a VcrAny object which represents a type which can contain any of a set of other types. This is an abstract base class which must be subclassed to define generic types such as any and VARIANT.

PutConcreteType

```
void PutConcreteType(VTypeData *concreteType)
``` concreteType  Type that the any actually is.

PutConcreteType sets the actual type of the any after creation. This type is the actual type which would be stored inside structures, etc. For instance, CORBA any's have a concrete type being a structure containing two elements.

Types

```
VTTypeList Types() = 0
```

Types returns a subset of the list of types which may be contained in this generic type. If the type can contain any other type then this should return an empty list. If the set of types supported is fully dynamic then an empty list should be returned. This list should only be considered as a hint about what types an instance may contain.

TypeOf

```
VTypeData *TypeOf(void *instance) = 0
``` instance    Instance to query.

TypeOf returns the type of the value contained in an instance of this generic type. If the type cannot be described to the type management system then TypeOf should return NULL.

– 128 –

Value

```
void *Value(void *instance) = 0
``` instance     Instance to query.

Value retrieves a pointer to the value contained in this generic type. This may return NULL if the instance does not contain a value.

Class VcrUnionItem

Public subclass of VcrStructItem

VcrUnionItem defines a field in a union. It includes the field name, type, switch value, and offset into the union. The offset will typically be zero for most machine architectures. An instance of this class cannot be assigned a type code.

Public Members

| | |
|---|---|
| VcrUnionItem | Constructs a VcrUnionItem object. |
| Value | Returns the value which specifies that this is the current union field being used. |

VcrUnionItem Constructor

```
VcrUnionItem(   VAtomRef      name,
                VTypeData     *theType,
                VValue        value,
                long          offset = 0)
```

| | |
|---|---|
| name | Name of this union field. |
| theType | Type of this union field. |
| value | Switch value of this field. |
| offset | Offset of this field within the union (if not 0). |

Constructs a VcrUnionItem object which represents a field within a union. If this field is to be the "default" field if no value match is found for another field then value should be of type kVTypeVoid.

Value

```
VValue Value()
```

Value returns the value of the switch value for this field. If the switch item paired with a union is this value then the union will contain a value represented by this field.

Class VcrUnion

Public subclass of VcrAny

VcrUnion defines an abstract union type definition. This serves to allow a common base for all different layouts of unions. For instance VcrStructUnion is a union which is itself defined as a structure. This structure has an embedded structure and a switch field. Another type of union might be one which itself has no switch field. The actual switch field might be outside the union in the containing type for this subclass of VcrUnion.

Public Members

| | |
|---|---|
| VcrUnion | Constructs a VcrUnion object. |

VcrUnion Constructor

```
VcrUnion(    VAtomRef       name,
             VTypeData      *concreteType)
``` name            Name of this union
concreteType    Concrete type of this union.

Constructs a VcrUnion object which represents a union. The concrete type is the structure which defines the actual layout of the union itself.

Class VcrStructUnion

Public subclass of VcrUnion

VcrStructUnion defines a CORBA style union type definition. The union is built by defining a structure containing a switch field, the field which determines which sub field of the union to use, and a nested structure contains the fields of the actual union. These fields must be instances of VcrUnionItem instead of VcrStructItem.

Public Members

| | |
|---|---|
| VcrStructUnion | Constructs a VcrStructUnion object. |

VcrStructUnion Constructor

```
VcrStructUnion(   VAtomRef       name,
                  VTypeData      *concreteType,
                  VcrStructItem  *switchItem,
                  VcrStructItem  *unionItem)
``` name            Name of this union
concreteType    Concrete type of this union.
switchItem      Item in struct which determines which field the union currently contains.
unionItem       Item in struct which is the nested structure containing the union elements.

Constructs a VcrStructUnion object which represents a union. The concrete type is the structure which defines the actual layout of the union itself.

Class VcrOpaque

Public subclass of VTypeData

VcrOpaque is an abstract class which defines a type of unknown definition. This class provides methods which allow it to cast instances to known types and also to cast known types to this opaque type. VcrOpaque subclasses are used to introduce types into the type manager which are indescribable in terms of the set of possible fundamental and derived types. A subclass of VcrOpaque must be able to cast other types to and from its internal representation.

Public Members

| | |
|---|---|
| VcrOpaque | Constructs a VcrOpaque object. |

Protected Members

| | |
|---|---|
| PutConcreteTYpe | Sets the concrete type after creation. |

Overridable Public Members

| | |
|---|---|
| CastToList | Returns the list of type to which this can be cast. |
| CastFromList | Return the list of types which can be cast to this type. |
| CanAlwaysReverseCast | Determines whether this type can always be cast to the specified type. |
| CanSometimesReverseCast | Determines whether this type may sometimes be cast to the specified type. |
| ReverseConstruct | Constructs an instance of the specified type which is a correctly cast copy of the instance of this type. |
| ReverseCast | Casts an instance of this type to the specified type. |

VcrOpaque Constructor

```
VcrOpaque(  VAtomRef    name,
            VTypeData   *concreteType)
``` name      Name of this type.
concreteType    Concrete type of this opaque type. Used to support passing and returning from functions.

Constructs a VcrOpaque object. The subclass of this type will provide implementations for all the virtual methods. This abstract class just defines a framework for integrating opaque types into the type management system.

PutConcreteType

```
void PutConcreteType(VTypeData *concreteType)
``` concreteType   Type that the opaque actually is.

PutConcreteType sets the actual type of the opaque after creation. This type is the actual type which would be stored inside structures, or passed to functions as arguments. This type is needed to manage putting these opaque objects on the stack correctly for passing them as arguments and receiving them as returns.

CastToList

```
VTTypeRefList CastToList() = 0
```

CastToList returns a partial list of types which any instance of this type can be cast to without loss of information. This list of types can be used as a hint to a language interpreter to decide what to do with an instance of this type.

CastFromList

```
VTTypeRefList CastFromList() = 0
```

CastFromList returns a partial list of types which can be cast to an instance of this type without loss of information. This list of types can be used as a hint to a language interpreter to decide what to do with an instance of this type.

CanAlwaysReverseCast

```
bool_t CanAlwaysReverseCast(VTypeData *type) = 0
``` type     Type to compare to.

CanAlwaysReverseCast determines whether the specified type can be cast to the current type in all situations without loss of information. This is the reverse direction of CanAlwaysCast. For instance a short can always be cast to a long, but only certain instances of long can be cast to short. This would return true only for short to long.

CanSometimesReverseCast

```
bool_t CanSometimesReverseCast(VTypeData *type) = 0
``` type     Type to compare to.

CanSometimesReverseCast determines whether the specified type can be cast to the current type in some or all situations without loss of information. This is the reverse direction of CanSometimesCast. For instance a short can always be cast to a long, but only certain instances of long can be cast to short. This would return true for casting either short to long or long to short.

ReverseConstruct

```
long ReverseConstruct(   void        *instance,
                         VcrDataRef  &to) = 0
``` instance     Instance of this type.
to     (Input & Return) Type of final object to be constructed and pointer to newly constructed item on return.

ReverseConstruct builds a new instance of the specified type by casting the input object of this type to the requested type. This performs the opposite direction of construction when compared to Construct. ReverseConstruct should allocate a buffer for the new returned object. The return value should be the size of the new instance. If the original instance could not be cast to this type or memory could not be allocated ReverseConstruct should return 0.

ReverseCast

```
long ReverseCast(   void        *instance,
                    VcrDataRef  &to) = 0
``` instance     Instance of this type.
to     Type of and pointer to instance to fill.

ReverseCast builds a new instance of the specified type by casting the input object of this type to the specified type. ReverseCast performs the opposite direction cast when compared to Cast. ReverseCast should not allocate a buffer for the new type instance but should instead use the supplied buffer which is guaranteed to be large enough to fit the type. The return value should be the size of the new instance. If the original instance could not be cast to this type or memory could not be allocated ReverseCast should return 0. The instance buffer passed into this routine may contain garbage and as such should be fully overwritten.

Class VTypeManager
Public subclass of VPrimary

`VTypeManager` manages type descriptions. This class can store type descriptions and provide unique id's (`VTTypeCodes`) for each unique type definition. There will typically only be one type manager per process.

Public Members

| | |
|---|---|
| `VTypeManager` | Constructs a `VTypeManager` object. |
| `Register` | Registers a new type and returns its `VTTypeCode`. |
| `TypeDestroyed` | Notifies the type manager that a type object has been deleted. |
| `RegisterPersistent` | Registers a type with a persistent type code. |
| `Lookup` | Returns the description of a type given its `VTTypeCode`. |
| `SameLayout` | Determines whether the two types are equivalent (although the names of sub-elements may differ) |
| `CanAlwaysCast` | Determines whether the first type can always to cast to the second type. |
| `CanSometimesCast` | Determines whether the first type may sometimes be cast to the second type. |
| `SizeOf` | Determines the size of an instance of the specified type. |
| `Construct` | Constructs a copy of one type as another type. |
| `Cast` | Casts an instance of one type to another type. |
| `Empty` | Empties an instance of the specified type. |
| `Discard` | Discards an instance of the specified type. |
| `TypeName` | Returns the name of the specified type. |
| `TypeHelp` | Returns the help information of the specified type. |

VTypeManager Constructor

`VTypeManger()`

Constructs a `VTypeManager` object. After creation the type manager is ready to perform casting and to receive and store type descriptions.

Register

`VTTypeCode Register(VTypeData *type)` type      Type to register.

`Register` will register a new type with the type manager. If it is determined that this type is identical to an existing type (using `VTypeData::Identical`) then this type description will be given the same `VTTypeCode` as the existing type which is equivalent. This will automatically be called by instances of types on the first request for their type code. There is no reason to call it directly.

TypeDestroyed

`void TypeDestroyed(VTypeData *type)` type      Type being destroyed.

`TypeDestroyed` notifies the type manager that a type has been destroyed. This allows the type manager to clean up and remove stored information used in determining type equality. This should have been called before the type object is actually freed since the type manager may need to reference fields of the type. `VTypeData` automatically calls this after all references to the type disappear but before deleting the type.

RegisterPersistent

```
RegisterPersistent( VTTypeCode   tcode,
                    VTypeData    *type)
``` tcode     Persistent type code for this type
type      Type description to register.

RegisterPersistent will register a type description with the type manager. The type description is given the specified type code. These type codes must be allocated by Visual Edge. This method is used instead of Register so that predefined types can be added to the type manager. Once a persistent type object is added to the type manager it will exist as long as the type manager exists. The fundamental type objects automatically call this method on creation so there is no need to call it directly.

Lookup

```
VTypeData *Lookup(VTTypeCode type)
``` type      Type to lookup.

Lookup returns the type definition for the specified type code and return it. If this type is a fundamental type or is currently undefined in this type manager NULL will be returned.

SameLayout

```
bool_t SameLayout(  VTTypeCode   type1,
                    VTTypeCode   type2)
``` type1     First type to use for comparison.
type2     Second type to use for comparison.

SameLayout determines whether the specified types are identical in layout. This should return true if all subtypes, sub fields, and offsets match. Names and help information should not be compared. This method is called to determine casting possibilities.

CanAlwaysCast

```
bool_t CanAlwaysCast(   VTTypeCode   type1,
                        VTTypeCode   type2)
``` type1     First type to use for comparison.
type2     Second type to use for comparison.

CanAlwaysCast determines whether the first type can be cast to the second type in all situations without loss of information. For instance a short can always be cast to a long, but only certain instances of long can be cast to short. This would return true only for short to long.

CanSometimesCast

```
bool_t CanSometimesCast(   VTTypeCode   type1,
                           VTTypeCode   type2)
```

| | |
|---|---|
| type1 | First type to use for comparison. |
| type2 | Second type to use for comparison. |

CanSometimesCast determines whether the first type can be cast to the second type in some or all situations without loss of information. For instance a short can always be cast to a long, but only certain instances of long can be cast to short. This would return true for casting either short to long or long to short.

Alignment

```
long Alignment(VTTypeCode type)
```

| | |
|---|---|
| type | Type to get alignment for. |

Alignment returns the alignment required for instances of this type. The alignment specified in number of bytes. For example an eight byte double might be able to be aligned on four byte boundaries in which case this method would return four. The lowest possible value is one.

SizeOf

```
long SizeOf( VTTypeCode    type,
             void          *instance = 0)
```

| | |
|---|---|
| type | Type of the instance. |
| instance | Pointer to instance to use for determining size. |

SizeOf returns the size of a particular instance of the type. If the instance pointer is NULL then SizeOf should return the size of all instances of the type if the size is fixed. If the size of instances is variable SizeOf should return 0 or negative.

Construct

```
long Construct(   VTTypeCode    origtype,
                  void          *original,
                  VTTypeCode    newtype,
                  void          **instance)
```

| | |
|---|---|
| origtype | Type of original object to use for copying. |
| original | Pointer to original object to copy from. |
| newtype | Type of target object. |
| instance | (Return) new instance of target type. |

Construct builds a new instance of the target type by casting the input object to the target type. Construct should allocate a buffer for the new returned object. The return value should be the size of the new instance. If the original instance could not be cast to the target type or memory could not be allocated Construct should return 0.

Cast

```
long Cast(   VTTypeCode    origtype,
             void          *original,
             VTTypeCode    totype,
             void          *instance)
``` origtype    Type of original object to use for copying.
original    Pointer to original object to copy from.
totype      Type of target object.
instance    Pointer to where to store the instance.

Cast builds a new instance of the target type by casting the input object to the target type. Cast should not allocate a buffer for the new type instance but should instead use the supplied buffer which is guaranteed to be large enough to fit the type. The return value should be the size of the new instance. If the original instance could not be cast to the target type or memory could not be allocated Cast should return 0. The instance buffer passed into this routine may contain garbage and as such should be fully overwritten.

Empty

```
void Empty(  VTTypeCode  type,
             void        *instance)
``` type        Type of the instance.
instance    Instance of type to be emptied.

Empty empties out the contents of an instance of the type. This should free all memory allocated within the instance but it should not free the instance itself. To free the instance itself Discard should be called instead.

Discard

```
void Discard(VTTypeCode  type,
             void        *instance)
``` type        Type of the instance.
instance    Instance of type to be discarded.

Discard empties out the contents of an instance of the type. This will free all memory allocated within the instance and will free the instance itself.

TypeName

```
VAtomRef TypeName(VTTypeCode type)
``` type        Type to get information about.

TypeName retrieves the name of the specified type. If the type is a derived type, the name is retrieved from the VTypeData object which defines the type.

TypeHelp

```
VcrHelp *TypeHelp(VTTypeCode)
``` type        Type to get information about.

TypeHelp retrieves the help information for the specified type. If the type is a derived type, the help object is retrieved from the VTypeData object which defines the type. NULL is returned for the fundamental types.

Mixins

Class registry elements are all able to support mixins. These mixins can provide additional functionality not defined in the base class registry. For example, mixins can be defined to support specialized editing tools on types, for example a color editor on an integer type. Visual Edge will be working with its partners to define standard suites for mixins (analogous to Apple Event Suites) — increasing application interoperability. Mixins each have a unique ID. Any vendor can define there own mixins for class registry entries and publish the definition and ID so that other vendors can implement the functionality in their systems. Vendors who want to define standard mixin suites can request blocks of ID's from Visual Edge.

Class VcrQueryMixin

Public subclass of VMixin

VcrQueryMixin is an abstract class which is used to query the class registry about the entries it "sees" — including objects in the class registry structure itself. The details of this mixin have not yet been determined. The query mixin definition is intended to provide enough detail to allow queries as complex as OQL (ODMG '93 Object Query Language) select...where queries while still providing the capability to perform the queries independent of any particular query language. Another goal of the query extension is to allow the queries to be easily translated into any specific query language (such as SQL, OQL, AppleEvent object specifier records, etc.). This capability would allow each object system to implement the query mixin in such a way as to use their native mechanism to perform queries. A default implementation will exist to enumerate items in collections and match them to a query (albeit slowly).

The query mixin can be found on VClassData, VAdapterNameSpace, VViewNameSpace, and VClassRegistry objects.

For class registry queries, when implementing an object system adapter, if the object system does not support complex queries inherently, a default query mixin can be created for views and adapters. This default mixin enumerates all the classes in a name space or object system. It then matches the query to the individual item. Although this produces slow queries it returns correct results.

For object class instances (described in the class registry) which support some form of queries, a version of this mixin can be attached to the VClassData. This allows code to query instance hierarchies in a system independent way. A default version of this mixin will be provided which can be used as long there is a mechanism to enumerate the contents of an instance's collection properties.

Class VcrExposureMixin

Public subclass of VMixin

VcrExposureMixin is an abstract class which is the mixin used to explicitly expose class definitions and implementation information from another object system to this object system (i.e. the object system the mixin is designed for).

The exposure mixin is available on the VAdapterNameSpace, and VClassRegistry objects. The VClassRegistry implementation cycles through all adapters performing the same operation on each adapter.

The exposure mixin also provides support for creating native proxy objects (i.e. objects in this object system) around foreign objects (i.e. objects in another object system). This enables objects in another object system to appear to objects in this object system completely as if they are "native" to this object system. The proxy simply maps calls to/from this object system onto the actual object using the class registry support in VcrCall and VcrCompleteCall to call the actual object's methods and properties.

The exposure mixin provides a means to expose implementation information to this object system. That is, information about what program to run, etc. to create an instance of a particular class. Included in this functionality is the ability to explicitly identify an instance as the "one" which was created to satisfy a "run implementation" request.

An object system adapter can support some, all, or none of the exposure mixin. If the object system does not provide the capability to do any of this functionality then the mixin should simply not be provided on the adapter.

In addition to supporting the exposure mixin, object system adapters may provide the capability to transparently expose objects. That is, if an object from another object system is passed into a method or property of this object system, the adapter may choose to automatically build a proxy object around the foreign object and pass that to the method or property. To the user of the class registry transparent exposing allows object systems to appear seemlessly integrated. Using transparent exposure and the class registry allows instances from one object system to be passed to another object system without any special conversions in between.

Overridable Public Members

| | |
|---|---|
| `ExposeDefinition` | Exposes a class registry definition to this object system. |
| `ExposeSubclass` | Exposes a class registry definition to this object system as if it is a subclass of one of this system's classes. |
| `ExposeApplication` | Exposes an application as a source for constructing instances of a particular class. |
| `ExposeFactory` | Exposes a class at runtime so that instances can be build from this object system. |
| `ExposeInstance` | Exposes an object instance at runtime to be callable from this object system. |
| `HideDefinition` | Hides an exposed class registry definition from this object system. |
| `HideApplication` | Hides an application as a source for constructing instances of a particular class. |
| `HideFactory` | Hides an exposed class factory so that instances can no longer be build from this object system. |
| `HideInstance` | Hides an exposed object instance so that it is no longer callable from this object system. |
| `IsDefinitionExposed` | Returns whether a foreign class has already been exposed to this adapter. |
| `IsApplicationExposed` | Returns whether a particular application has already been exposed to this adapter. |
| `AcquireProxy` | Builds a proxy object in this object system for this instance which is from another object system. |
| `ReleaseProxy` | Releases an existing proxy object. |
| `ConstructNameSpace` | Builds a name space in this object system. |
| `InstanceDeleted` | Notifies the adapter that an object instance has been deleted. |

| | |
|---|---|
| UnmapForeign | Remove all references to an external item which may be used in exposure caching. |
| UnmapAllForeign | Remove all references to external items which were used in exposure caching. |

ExposeDefinition

```
status_t ExposeDefinition(VcrToplevel      *item,
                          VTToplevelRef    *exposed) = 0
``` item      Item to expose to this object system.
exposed   (return) Item as found in this object system.

ExposeDefinition exposes item to this object system. Once it is exposed, the return argument exposed should be filled with a reference to the exposed definition as if it is from this object system. For instance, if item was an OLE class description, VOleClassData, and this object system is DSOM, exposed should be a VSOMClassData which represents the class as a DSOM class. If item has already been exposed this method should succeed and return the exposed item. If exposing a definition is not supported this method should return NotSupportedStatus. If the exposure succeeded then OkStatus should be returned.

ExposeSubclass

```
status_t ExposeSubclass( VClassData      *cls,
                         VClassData      *super,
                         VTClassRef      *exposed) = 0
``` cls       Class to expose to this object system.
super    Superclass to use as superclass of cls.
exposed  (return) class as found in this object system.

ExposeSubclass exposes cls to this object system as if it were a subclass of super. super must be a class from this object system. cls must have reimplemented all the methods of super with its own version otherwise this call can fail. Exposing a foreign class as a subclass of a native class allows a class from another object system to appear as if it is a simple subclass of an class from this object system. This functionality can be used in application or mixin frameworks to allow abstract classes and mixins to be implemented in any object system. If cls has already been exposed this method should succeed and return the exposed item. If exposing a foreign class as a subclass is not supported this method should return NotSupportedStatus. If the exposure succeeded then OkStatus should be returned.

ExposeApplication

```
status_t ExposeApplication(  VClassData    *exposed,
                             const char    *appName,
                             const char    *appFile,
                             const char    *hostName,
                             bool_t        multiple) = 0
```

| | |
|---|---|
| exposed | Class of object to be exposed to this object system. |
| appName | Name of the application. |
| appFile | Filename of the application executable. |
| hostName | Host on which application should run. |
| multiple | Allow this application to be exposed for running on multiple specifically named hosts at the same time. |

ExposeApplication exposes an application to this object system. This call specifies that this application can be run to create instances of exposed. exposed should not be a VClassData returned by ExposeDefinition or ExposeSubclass but should instead be the original VClassData. appName specifies the readable name of the application to be used in this systems registration facility. Different values of the hostName variable can result in three different behaviors:

- If the application should be run by this object system on a particular host the host name should be specified in hostName.

- If the application should be run locally on whatever host makes the request hostName should be NULL. multiple is ignored in this case.

- If the application should always be run on the current host even if the object is requested from another host then hostName should be a string containing a single period (i.e. ".").

If the application is registered with multiple as TRUE then ExposeApplication can be called with multiple different host names. If this is allowed then the application can be run on any one of the specifies hosts. If multiple is FALSE then each call to this method with a different host name replaces the last definition so that there is only one specifically named host on which the application can run.

If the application has already been exposed this method should update the definition to set the correct host and filename and then it should return OkStatus. If the adapter does not support the request made by a call to this method then it should return NotSupportedStatus. If the exposure succeeded then OkStatus should be returned.

ExposeFactory

```
status_t ExposeFactory(    VClassData      *exposed,
                           void            **factory) = 0
```

| | |
|---|---|
| exposed | Class to expose a factory for. |
| factory | (return) Factory object. from this object system |

ExposeFactory exposes the current process as being a source of objects of class exposed. This factory only exists for the lifetime of the process. exposed should not be a VClassData returned by ExposeDefinition or ExposeSubclass but should instead be the real one. If the factory has already been exposed then this method should store the currently exposed factory in factory and return OkStatus. If the adapter does not support the request made by a call to this method then it should return NotSupportedStatus. If the exposure succeeded then OkStatus should be returned.

ExposeInstance

```
status_t ExposeInstance(   VClassData      *exposed,
                           void            *instance,
                           bool_t          multiUse) = 0
``` exposed     Class to expose an instance of.
instance     Instance of exposed to expose to this object system.
multiUse     Whether this instance can be used by multiple requesters or not.

ExposeInstance exposes a particular instance of exposed to this object system. The instance can be used as the one "running instance" of the class for the application. exposed should not be a VClassData returned by ExposeDefinition or ExposeSubclass. exposed and instance should be the actual original values. If the adapter does not support the request made by a call to this method then it should return NotSupportedStatus. If the exposure succeeded or the instance had already been exposed then OkStatus should be returned. There should only be one instance of this class exposed using ExposeInstance. If multiUse is FALSE then only one client should be allowed to use the object. If multiUse is TRUE then multiple clients can all use the object.

HideDefinition

```
status_t HideDefinition(VcrToplevel *exposed) = 0
``` exposed     Item previously exposed to this object system.

HideDefinition hides a previously exposed item from this object system. HideDefinition can be applied to items returned by ExposeDefinition and ExposeSubclass. If the adapter does not support the request made by a call to this method then it should return NotSupportedStatus. If the hide succeeded then OkStatus should be returned.

HideApplication

```
status_t HideApplication( VClassData    *exposed,
                          const char    *appName,
                          const char    *appFile,
                          const char    *hostName) = 0
``` exposed     Class of object previously exposed to this object system.
appName     Name of the application.
appFile     Filename of the application executable.
hostName     Host on which application was specified to run.

HideApplication hides a previously exposed application from this object system. appName specifies the readable name of the application as previously passed to ExposeApplication. Different values of the hostName variable can result in four different behaviors:

- If hostName is a specific host name then the application definition for running on that host should be removed.

- If hostName is NULL then the locally runable definition of the application should be hidden.

- If hostName is "." then the application definition for running on the current host should be removed.

- If hostName is "*" then the application definition for running on all defined hosts should be removed.

If the adapter does not support the request made by a call to this method then it should return NotSupportedStatus. If the hide succeeded then OkStatus should be returned.

HideFactory

```
status_t HideFactory(VClassData *exposed) = 0
``` exposed    Class of previously exposed factory.

HideFactory hides a previously exposed factory object. exposed should be as specified in a call to ExposeFactory. If the adapter does not support the request made by a call to this method then it should return NotSupportedStatus. If the hide succeeded then OkStatus should be returned.

HideInstance

```
status_t HideInstance(void *instance) = 0
``` instance    Instance as previously exposed to the native object system.

HideInstance hides a previously exposed instance from the native object system. instance should be the item passed into ExposeInstance. If the adapter does not support the request made by a call to this method then it should return NotSupportedStatus. If the hide succeeded then OkStatus should be returned.

IsDefinitionExposed

```
bool_t IsDefinitionExposed(VcrToplevel *item) = 0
``` item    Item to check for exposure to this object system.

IsDefinitionExposed checks whether this item has been exposed to this object system before. This call allows code to check if its exposures have been done before. If the item exposures have previously been done then they do not need to be repeated.

IsApplicationExposed

```
bool_t IsApplicationExposed(    VClassData      *exposed,
                                const char      *appName,
                                const char      *appFile) = 0
``` exposed    Class of object to check.
appName    Name of the application.
appFile    Filename of the application executable.

IsApplicationExposed checks whether this class and application has been exposed to this object system before. This call allows code to check if its exposures have been done before. If the application exposures have previously been done then they do not need to be repeated.

AcquireProxy

```
status_t AcquireProxy(    VClassData    *exposed,
                          void          *instance,
                          void          **proxy) = 0
``` exposed    Class to build a proxy for.
instance   Instance of exposed to build the proxy for.
proxy      (return) Proxy object which represents instance.

AcquireProxy builds a proxy as an object of this object system. This proxy represents the particular instance of exposed to this object system. If the adapter does not support the request made by a call to this method then it should return NotSupportedStatus. If the proxy construction succeeded or the instance had a preexisting proxy then OkStatus should be returned. The proxy must be disposed of with ReleaseProxy.

ReleaseProxy

```
status_t ReleaseProxy(void *proxy) = 0
``` proxy    Proxy object which represents an instance of another class.

ReleaseProxy releases a proxy previously retrieved with AcquireProxy. If the adapter does not support the request made by a call to this method then it should return NotSupportedStatus. If the proxy release succeeded then OkStatus should be returned.

ConstructNameSpace

```
status_t ConstructNameSpace(
                    const char      *spaceName,
                    VTAdapterRef    *nameSpace) = 0
``` spaceName   Name of the new name space.
nameSpace   (Return) Newly constructed name space.

ConstructNameSpace constructs a new name space inside the current one. This name space can be used as the location to store explicitly exposed classes. If the adapter does not support the request made by a call to this method then it should return NotSupportedStatus. If the name space creation succeeds or the name space already existed then OkStatus should be returned.

InstanceDeleted

```
void InstanceDeleted(void *instance) = 0
``` instance    Instance which is being deleted.

InstanceDeleted notifies the adapter that instance has been deleted. This allows the adapter to destroy all associated proxy objects which were created through transparent exposure.

UnmapForeign

```
void UnmapForeign(VcrToplevel *item) = 0
``` item    Item which may have been exposed to this object system.

UnmapForeign removes all references that the adapter may have to item. This method is provided to allow periodic adapter cache purges to limit memory consumption in long running server processes.

UnmapAllForeign

```
void UnmapAllForeign(
            VTObjectSystem    system = kVAnyObjectSystem) = 0
```

- 143 - system      Object system to remove references to.
UnmapAllForeign removes all references that the adapter may have to items from the specified object system. This method is provided to allow periodic adapter cache purges to limit memory consumption in long running server processes.
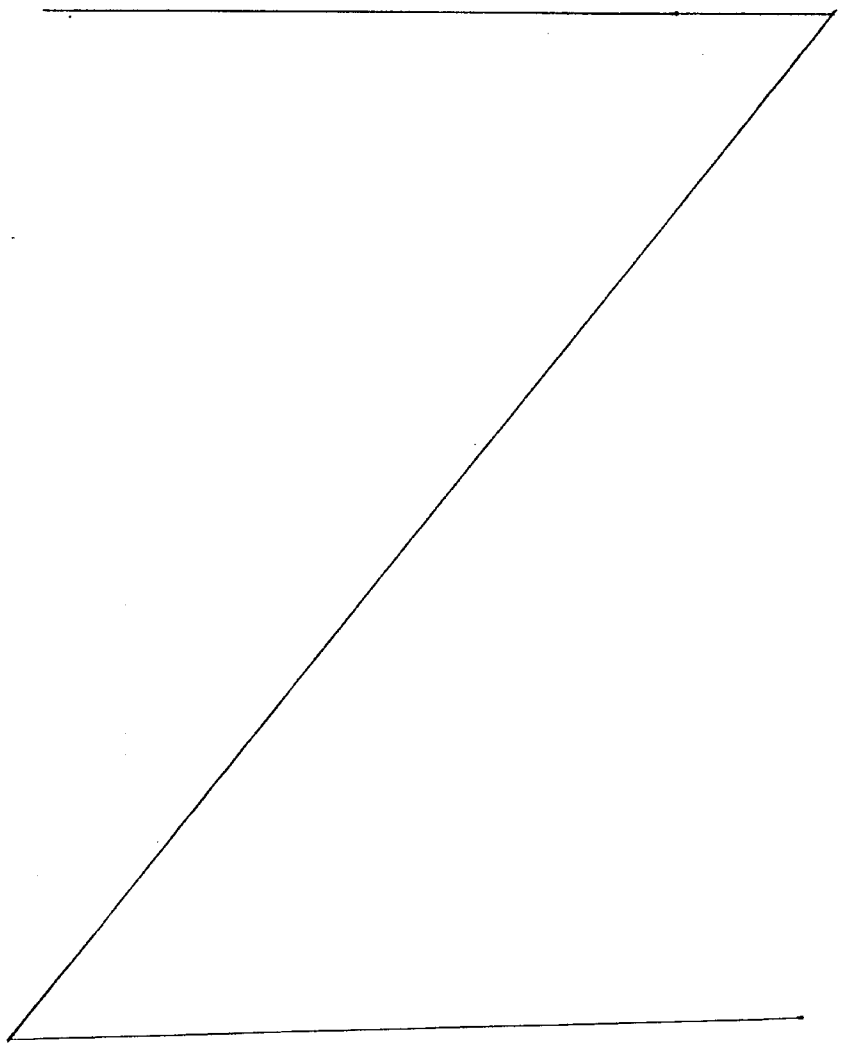

We claim:

1. Computer-executable process steps, stored on a computer-readable medium for use in a digital computer system, which involves objects of first and second object models and corresponding first and second object systems using respective first and second implementations to implement, respectively, the first and second object models, and steps to enable the first object system to use objects of at least the second object model, comprising:

a providing step to provide a description of an object of the second object model;

a creating step to create a proxy object that is an object of the first object system and that corresponds to the object of the second object model;

a receiving step to receive a manipulation of the proxy object, the manipulation conforming to the first implementation; and a forwarding step to forward a manipulation of at least one of the proxy objects to the corresponding object of the second object model by utilizing the description from said providing step.

2. Computer-executable process steps according to claim 1, wherein the steps enable the first object system to use objects of a plurality of object models and:

(a) the creating step further comprises a step to create a plurality of proxy objects, each proxy object being an object of the first object system and corresponding with an object of one of the plurality of object models; and (b) the forwarding step further comprises a step to forward manipulations of at least one of the proxy objects to the corresponding object.

3. Computer-executable process steps according to claim 1, the steps to enable the second object system to use objects of at least the first object model further comprising:

a description step to provide a description of an object of the first object model;

a proxy step to create a proxy object that is an object of the second object system and that corresponds to the object of the first object model;

a receiving step to receive a manipulation of the proxy object, the manipulation conforming to the second implementation; and a forwarding step to forward the manipulation of the proxy object to the corresponding object of the first object model by utilizing the description from said description step.

4. Computer-executable process steps according to claim 1, wherein the steps enable the first object system to use a plurality of objects of a plurality of object models, and:

the creating step further comprises a step to create a proxy object, the proxy object being an object of the first object system and corresponding to a plurality of objects; and the forwarding step further comprises a step to forward manipulations of the proxy object to the corresponding objects.

5. Computer-executable process steps according to claim 1, further comprising a creating step which manipulates an object of the second object model using a proxy object of the second object model via one or more different object models.

6. Computer-executable process steps according to claim 1 further comprising a creating step which utilizes a description of a class of the first object model, and wherein the proxy object has a same signature as the class of the first object model.

7. Computer-executable process steps according to claim 1, with a forwarding step further comprising at least one of:

a step to map between differences in language types;

a step to dynamically construct proxy objects when required;

a step to map between differences in errors and exceptions;

a step to map between differences in querying for object information;

a step to map between fundamental calling mechanisms;

a step to map between differences in threading;

a step to map between differences in semantic information;

a step to map between differences in lifecycle management;

a step to map between differences in location and enumeration mechanisms;

a step to map between differences in class description mechanisms;

a step to map between differences in event notification mechanisms;

a step to map between differences in repository mechanisms.

8. Computer-executable process steps according to claim 1, wherein the forwarding step further comprises a step to retrieve semantically meaningful types, semantically meaningful aspects, or semantically meaningful objects inherent in the manipulation and a further step to map between corresponding semantic types, corresponding semantic aspects, or corresponding semantic objects in accordance with the proxy object of the second object model.

9. Computer-executable process steps according to claim 3, wherein the steps enable a plurality of object systems to use objects of the first object model and:

the proxy step further comprises a creating step to create a plurality of proxy objects, each proxy object being an object of one of the plurality of object systems; and the forwarding step further comprises a forwarding step to forward manipulations of one of the proxy objects to the corresponding object.

10. Computer-executable process steps according to claim 1, 2, 3, 4 or 9 wherein the steps do not include generation of computer language source code.

11. Computer-executable process steps according to claim 4, further comprising a step to utilize a description of a class of the first object model, and wherein the proxy object has a same signature as the class of the first object model.

12. Computer-executable process steps according to claim 4, further comprising a providing step to create descriptions using library-based or interactive construction software.

13. Computer-executable process steps according to claim, 12, wherein:

the providing step further provides steps to describe semantic types, semantic information, and semantic aspects of the plurality of objects; and the forwarding step further comprises a mapping step to map the first semantic types, semantic information, and semantic aspects of the proxy object to the semantic types, semantic information, and semantic aspects of the plurality of objects.

14. Computer-executable process steps according to claim 13, wherein the mapping step further comprises a specialized editor. library-based or interactive, to specify the map.

15. Computer-executable process steps according to claim 4, wherein the forwarding step further comprises a step to retrieve one or more of semantically meaningful types, semantically meaningful information, and semantically meaningful aspects of the plurality of objects, and further comprises a step to map between corresponding semantically meaningful types, semantically meaningful information and semantically meaningful aspects in accordance with the proxy object.

16. Computer-executable process steps according to claim 15, further comprising at least one of:

a step to parse a semantic entity represented by a single data or argument value into a corresponding plurality of data or plurality of argument values;

a step to consolidate a semantic entity represented by a plurality of data or argument values into a corresponding single data or argument value; and a step to transform a semantic entity represented by a plurality of data or argument values into a corresponding plurality of data or argument values a step to parse a semantic entity represented by a single object into a corresponding plurality of objects;

a step to consolidate a semantic entity represented by a plurality of objects into a corresponding single object;

a step to transform a semantic entity represented by a plurality of objects into a corresponding plurality of objects;

a step to forward a semantically meaningful function or method call to a plurality of function or method calls;

a step to consolidate semantically meaningful function or method calls into a single function or method call; or a step to transform a plurality of semantically meaningful function or method calls into a corresponding plurality of function or method calls.

17. Computer-executable process steps according to claim 5, wherein the proxy object has a signature which is identical to a signature of the object of the second object model.

18. Computer-executable process steps according to claim 5, further comprising a creating step which utilizes the proxy object in place of the object of the second object model.

19. Computer-executable process steps according to claim 7, further comprising a forwarding step which enables the first object system to use features that are provided by the second object system, but that are not provided by the first object system.

20. Computer-executable process steps according to claim 7, further comprising a forwarding step which uses features provided by the first object system which require functionality of the proxy object, wherein such functionality is not implemented by the second object system.

21. Computer-executable process steps according to claim 20, wherein the creating or forwarding step further comprises:

a step to associate an object with one or more elements of the description; and a step to delegate execution of a feature by the proxy object to the associated object either before responding to a manipulation, instead of responding to a manipulation, or after responding to a manipulation.

22. Computer-executable process steps according to claim 8, the forwarding step further comprising at least one of:

a step to parse a semantic entity represented by a single data or argument value into a corresponding plurality of data or plurality of argument values;

a step to consolidate a semantic entity represented by a plurality of data or argument values into a corresponding single data or argument value;

a step to transform a semantic entity represented by a plurality of data or argument values into a corresponding plurality of data or argument values;

a step to parse a semantic entity represented by a single object into a corresponding plurality of objects;

a step to consolidate a semantic entity represented by a plurality of objects into a corresponding single object;

a step to transform a semantic entity represented by a plurality of objects into a corresponding plurality of objects;

a step to forward a semantically meaningful function or method call to a plurality of function or method calls;

a step to consolidate semantically meaningful function or method calls into a single function or method call; and a step to transform a plurality of semantically meaningful function or method calls into a corresponding plurality of function or method calls.

23. Computer-executable process steps according to claim 2, 4, or 9 further comprising a step which either adds or removes support for object systems and object models without compiling.

24. Computer-executable process steps according to claim 2, 4 or 9, for use with either a traditional interactive application, an object class, or computer-executable process construction environment, said steps comprising at least one of:

a step to subclass from object classes of a plurality of object systems;

a step to utilize or incorporate object classes of a plurality of object systems;

a step to instantiate, utilize or embed object instances of a plurality of object systems;

a step to construct objects which can be used according to implementations of a plurality of object systems;

a step to relocate object classes and objects among application processes, server processes and object systems.

25. Computer-executable process steps stored on a computer-readable medium for use in a digital computer, which involves objects of first and second object models and corresponding first and second object systems using respective first and second implementations to implement, respectively, the first and second object models and steps to enable the first object system to use objects of at least the second object model, comprising:

a description step to provide a description of an object of the second object model;

a proxy step to create a proxy object that is an object of the first object system and that corresponds to the object of the second object model and comprising a manipulation of the object of the second object model;

a receiving step to receive a manipulation of the object of the second object model, the manipulation conforming to the second implementation; and a forwarding step to forward the manipulation of the object of the second object model to the proxy object.

26. Computer-executable process steps according to claim 25, wherein the forwarding step comprises a manipulation of the object of the second object model that is a triggered event.

27. Computer-executable process steps according to claim 26, wherein when an event is triggered in the object of the second object model an event in the proxy object is triggered.

28. Computer-executable process steps according to claim 25, wherein the forwarding step further comprises a step to map the first semantic events and the first implementations into the second semantic events and the second implementations.

29. Computer-executable process steps according to claim 25, wherein the forwarding step comprises a manipulation of the object of the second object model which triggers an event in the proxy object.

30. Computer-executable process steps according to claim 25, further comprising at least one of:
   a step to specify, using a library-bases or interactive tool, the corresponding manipulations; or,
   a step to tag, using a library-bases or interactive tool, which aspects of the object of the second object model have semantic meaning not identified in the description.

31. Computer-executable process steps, stored on a computer-readable medium for use in a digital computer system, which involves objects of first and second object systems using respective first and second implementations which implement respective first and second object models, the steps for enabling the first object system to use an object of the second object system comprising:
   a description step to provide a description of object aspects, object system aspects or object manipulations, said description describing first semantic types, first semantic aspects, or first implementations that are supported by the first object system and not supported in the same manner by the second object system and describing second semantic types, second semantic aspects or second implementations supported by the second object system and not supported in the same manner by the first object system; and
   a forwarding step that comprises a mapping step to forward a manipulation of a first object, the manipulation in accordance with the first implementation, to the second object by utilizing the description,
   wherein the first object corresponds to the second object.

32. Computer-executable process steps according to claim 31, wherein the forwarding step comprises a mapping step to map the first semantic types or aspects and the first implementations to the second semantic types or aspects and the second implementations dynamically during execution of the steps.

33. Computer-executable process steps according to claim 31, wherein the forwarding step comprises a mapping step to build steps for mapping the first semantic types or aspects and first implementations to the second semantic types or aspects and second implementations and an execution step to execute the steps for mapping.

34. Computer-executable process steps, stored on a computer-readable medium for use in a digital computer system, which involves a plurality of processes and object systems, the steps to enable a native object system having a native implementation for implementing a native object model and located in a first process to use an object located in a second process via a foreign object system using a foreign object model comprising:
   a description step to provide a description of the object;
   a proxy step to create a proxy object conforming to the native object system that corresponds with the object located in the second process;
   a receiving step to receive a manipulation of the proxy object, the manipulation conforming to the native implementation; and
   a forwarding step to forward the manipulation of the proxy object to the corresponding object by utilizing the description and the foreign object system, wherein the steps do not include generation of computer language source code and at least one of the object system or a corresponding object model is created from a collection.

35. Two or more sets of computer-executable process steps according to claim 1 together enabling the manipulation of the object of the second object model via one or more different object systems.

36. Computer-executable process steps according to claim 2, 4, or 9, further comprising steps wherein objects or classes from a plurality of object systems may be made available within at least one of:
   a unified namespace;
   a unified viewing space;
   a unified search space;
   a unified directory space;
   a unified browsing space;
   a unified repository space; or
   a unified query space.

37. Computer-executable process steps according to claim 36 further comprising a step to accomplish at least one of:
   searching the search space or the namespace utilizing a search engine;
   browsing the browsing space or the viewing space using a browser; or
   storing the directory space or the repository space using a directory server.

38. Computer-executable process steps according to claim 2, 4, or 9, further comprising the step of graphically displaying the descriptions or programming language signatures of objects of a plurality of object systems in either the standard description format or the programming language signature format of the first object model.

39. Computer-executable process steps according to claim 1 further comprising a generation means to generate descriptions of the proxy object according to the first object system.

40. Computer-executable process steps according to claim 1 or 3, wherein the forwarding step further comprises a step wherein of at least one of:
   a logical grouping of data elements that is provided by the second object model are mapped into properties of the proxy object;
   functions that are provided by the second object model, are mapped into methods of the proxy object; or
   functions that operate on logical groupings of data elements that are provided the second object system are mapped into methods of the proxy object.

41. Computer-executable process steps according to claim 1, 2, 3, 4, 5, 6, 7, 8, 9, 11, 12, 13, 14, 16, 17, 22, 24, 25, 27, 28, 29, 30, 33, 34, or 35, wherein at least one object system and corresponding object model is created from collections comprising at least one of:
   non-object-oriented programming language functions;
   data structures; or data elements non-object-oriented electronic data structures; or data elements
non-object-oriented middleware messages; or events
utilizing at least one of the following means:
- a description step and a forwarding step, the description step enabling the collection to emulate an object of an object system, and the forwarding step enabling manipulations to be forwarded to the corresponding item within the collection;
- an application programming interface to at least one programming language, the application programming interface enabling the collection to emulate an object of the object system; or
- an implicit plurality of functions combined with a description means and the collection to emulate an object of the object system.

* * * * *